United States Patent [19]
Caruso et al.

[11] Patent Number: 5,848,271
[45] Date of Patent: Dec. 8, 1998

[54] PROCESS AND APPARATUS FOR CONTROLLING THE WORK FLOW IN A MULTI-USER COMPUTING SYSTEM

[75] Inventors: David J. Caruso, Concord; Robert S. Diebboll, Lincoln; Steven Clark Ellis, Weymouth; S. Jay Chang, Acton; Sandra B. McAllister, Lancaster; Heidi S. Quinn, Norfolk; Kenneth Dale Arnett, Sudbury; Leonard J. Conte, Northboro; Chauncey E. Wilson, Wayland; Russell M. Lowe, Natick; Jonathan H. Eddy, Shrewsbury, all of Mass.; David M. Anglin, Roswell, Ga.; Vernon J. Adams, Norcross, Ga.; Julia C. Walker, Marietta, Ga.; Kevin P. Kleinfelter, Atlanta, Ga.; Michael T. Nugent, Kennesaw, Ga.

[73] Assignee: Dun & Bradstreet Software Services, Inc., Atlanta, Ga.

[21] Appl. No.: 213,022

[22] Filed: Mar. 14, 1994

[51] Int. Cl.⁶ .............................. G06F 15/163; G06F 9/00
[52] U.S. Cl. .......................................... 395/680; 364/552
[58] Field of Search ..................................... 395/650, 670, 395/672, 680; 364/552

[56] References Cited

U.S. PATENT DOCUMENTS

| | | | |
|---|---|---|---|
| 4,864,559 | 9/1989 | Perlman | 370/236 |
| 5,008,853 | 4/1991 | Bly et al. | 345/331 |
| 5,208,748 | 5/1993 | Flores et al. | 704/1 |
| 5,208,765 | 5/1993 | Turbull | 3643/552 |
| 5,216,603 | 6/1993 | Flores et al. | 704/1 |
| 5,283,856 | 2/1994 | Gross et al. | 395/51 |
| 5,357,439 | 10/1994 | Matsuzaki | 364/468.02 |
| 5,440,739 | 8/1995 | Beck et al. | 395/200.51 |

OTHER PUBLICATIONS

Lawrence Gould, "Groupware is Another Swipe at the CIM Ideal", Managing Automation, Nov. 1993.
Lai et al., "Object Lens: A 'Spreadsheet' for Cooperative Work," *ACM Transactions on Office Information Systems*, Oct. 1988, pp. 332–353.
Crowston et al., "Intelligent Software Agents," *Byte*, Dec. 1988, pp. 267–271.

(List continued on next page.)

*Primary Examiner*—Majid A. Banankhah
*Attorney, Agent, or Firm*—Troutman Sanders LLP; Joel S. Goldman, Esq.; R. Stevan Coursey, Esq.

[57] ABSTRACT

A new computerized information flow technology is provided where information in an organization may be logically and automatically routed through a predefined sequence of activities to users who need the information. A user selects an activity from a list of available activities revealed by the computer system of the present invention. Upon the user completing the activity, the computer system selects an event associated with the activity. The event then performs a decision making process to determine which next steps are to be logically selected based upon predefined conditions set in the computer system and the information input by the user. The next steps determine the subsequent user or users responsible for performing a next activity (task) in the predefined sequence of activities. The computer system of the present invention then adds a message, representative of the next activity, to a subsequent user's or users' To Do List. The subsequent user or users may then perform the next activity by accessing the next activity from their To Do List. Upon completion of the next activity by the subsequent user or users, the process, as described above, is repeated until each piece of information is pushed entirely through the organization's predefined information flow path.

32 Claims, 64 Drawing Sheets

Microfiche Appendix Included
(31 Microfiche, 2968 Pages)

OTHER PUBLICATIONS

Robinson, "Through a Lens Smartly," *Byte*, May 1991, pp. 177–187.

"Client/Server: What, When and How," *Informationweek*, Dec. 16, 1991, pp. 1–3.

Beyond, Inc., "Beyond Mail, Electronic Mail for Productive Workgroups, Rule Book", 1991.

Beyond, Inc., "Beyond Mail, Electronic Mail for Productive Workgroups, User Guide", 1991.

Beyond, Inc., "Beyond Mail, electronic Mail for Productive Workgroups, Administration Guide", 1992.

*The Delphi Workflow Report*, Dec. 1992, published by Delphi Consulting Group.

*The Delphi Workflow Report*, Jan. 1993, published by Delphi Consulting Group.

*The Delphi Workflow Report*, Feb. 1993, published by Delphi Consulting Group.

*The Delphi Workflow Report*, Mar. 1993, published by Delphi Consulting Group.

*The Delphi Workflow Report*, Apr. 1993, published by Delphi Consulting Group.

*The Delphi Workflow Report*, May 1993, published by Delphi Consulting Group.

*The Delphi Workflow Report*, Jun. 1993, published by Delphi Consulting Group.

*The Delphi Workflow Report*, Jul. 1993, published by Delphi Consulting Group.

*The Delphi Workflow Report*, Aug. 1993, published by Delphi Consulting Group.

*The Delphi Workflow Report*, Sep. 1993, published by Delphi Consulting Group.

*The Delphi Workflow Report*, Oct. 1993, published by Delphi Consulting Group.

*The Delphi Workflow Report*, Nov. 1993, published by Delphi Consulting Group.

*The Delphi Workflow Report*, Dec. 1993, published by Delphi Consulting Group.

Beyond, Inc., "Beyond Mail, Release 2.0 for Windows and DOS/MHS, Rule Book," 1993.

Beyond, Inc., "Beyond Mail, Release 2.0 for Windows and DOS/MHS, User Guide," 1993.

Beyond, Inc., "Beyond Mail, Release 2.0 for Windows and DOS/MHS, Administration Guide," 1993.

"The Wonders of Workflow," *The Economist*, Dec. 11–17th 1993, page number unknown.

*The Delphi Workflow Report*, Jan. 1994, published by Delphi Consulting Group.

*The Delphi Workflow Report*, Feb. 1994, published by Delphi Consulting Group.

*The Delphi Workflow Report*, Mar. 1994, published Delphi Consulting Group.

*The Delphi Workflow Report*, Apr. 1994, published by Delphi Consulting Group.

*The Glass Desktop: Client/Server and Workflow*, publication date unknown but prior to Aug. 17, 1994.

ACTIVITY - 210

Class Registration

Possible EVENTS - 220

(1) Add Class (2) Delete Class (3) Change Class

FIG. 5

NEXT STEP - 230

(1) Next Activity/Task (250) to be performed (2) User/Group of Users responsible for performing the Next Activity/Task (250)

(3) Message revealing to the user/group of users the nature of the Next Activity/Task (250)

FIG. 6

TABLE – 1000

| COLUMN 1 | COLUMN 2 | COLUMN 3 |
|----------|----------|----------|
| ROW 1    |          |          |
| ROW 2    |          |          |
| ROW 3    |          |          |
| ⋮        |          |          |

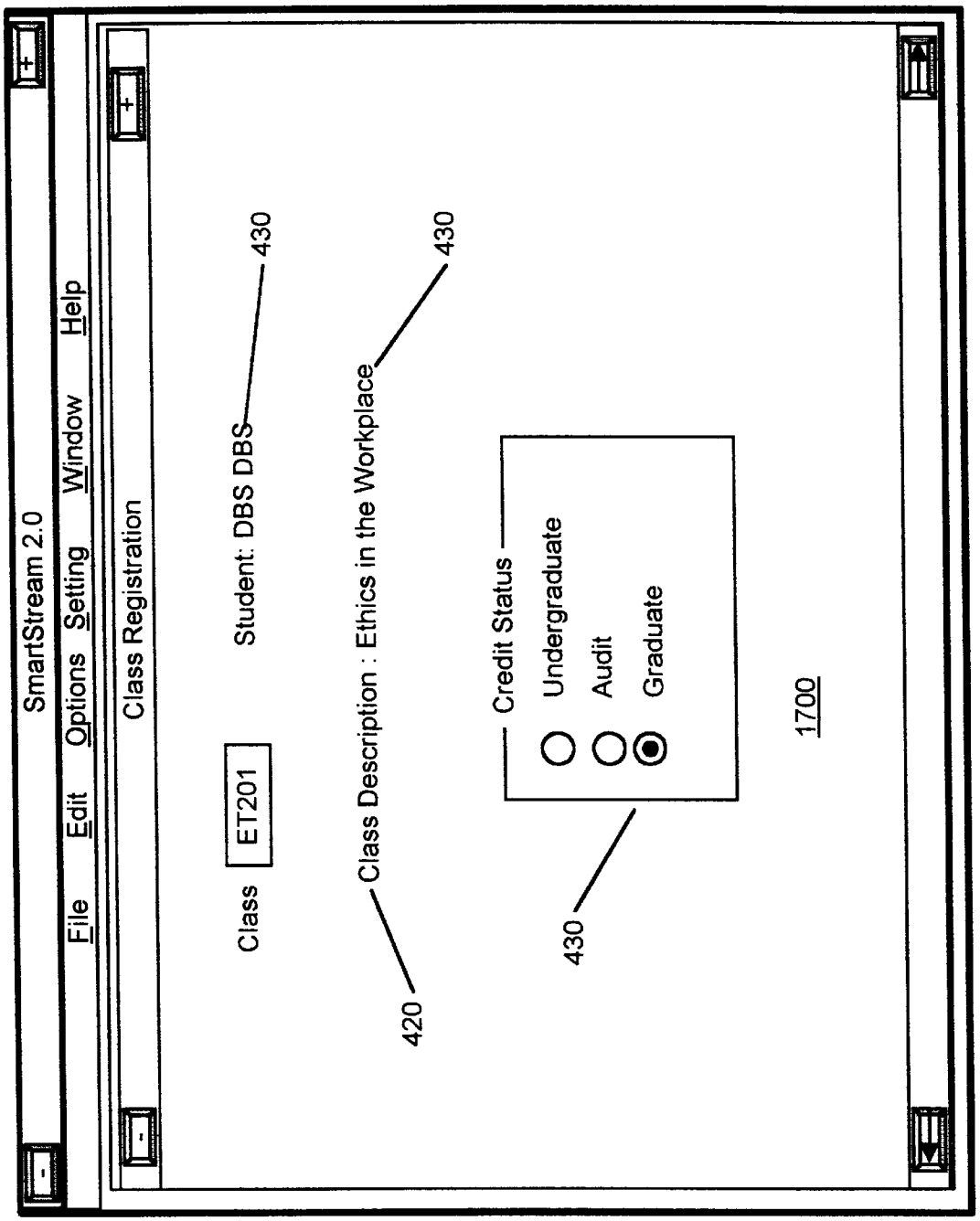

PROCESS AND APPARATUS FOR CONTROLLING THE WORK FLOW IN A MULTI-USER COMPUTING SYSTEM

A microfiche appendix has been filed with this patent application and is considered to be a part of the present specification. The appendix includes, at minimum, the following elements which have been used to implement the best known mode of the present invention as described in the preferred embodiment; (a) a glossary of terms; (b) computer source code listings, including PowerBuilder code and SQL stored procedures;

(c) a director structure listing; (d) GUI data; and, (e) portions of one or more manual(s) pertinent to title present invention. The appendix is included to enable a reader of this patent application to obtain a more complete understanding of various aspects of the present invention. The appendix contains 31 microfiche with 2968 total frames.

BACKGROUND OF THE INVENTION

1. Technical Field

This invention relates generally to automated information flow technology and, in particular, to a system for facilitating the flow of information between a plurality of users.

2. Description of the Prior Art

The use of computer systems as a means of gathering and processing information has become commonplace in modern business organizations. Such computer systems typically allow information to be manipulated in various ways such as to generate reports for use by individuals within the organization. These reports may be used to analyze past activities and to forecast future activities within the organization. Computer systems which are designed to gather and manipulate the information for reports are generally not designed, however, to implement activities which form the basis of the reports or which are instigated by the information in the reports.

In recent years, advancements in computer systems design have been made which facilitate the flow of information between individuals within an organization. In "work flow automation", for example, work-related information flows amongst workers, each of whom may add, delete, or change information. This revised information is in turn disseminated or flowed to other individuals. An example of such a work flow is the routing of a document within an organization for the purpose of obtaining an approval. A first worker may initially draft the document and a second worker may add, delete, or change information in the document prior to giving his approval to it. This type of computerized work flow is known as document sharing and is based on "ad hoc" accessing and processing of documents. In such "ad hoc" accessing and processing, a document may be routed, accessed, or processed whenever one individual recognizes the need to do so.

Generally, prior art information flow computer systems follow the model of manual work flow processes, where paper documents are physically routed from one individual to another. For example, if a purchasing agent wishes to order a specific part, he or she might enter information on a purchase order document and bring or send the physical document to the purchasing manager. The purchasing manager might review the document and add, delete, or change information in the document as he or she approves the purchase of the part. Finally, the purchasing manager might return the document to the purchasing agent so that he or she could telephone a vendor to order the part.

In a computer system for implementing purchase order flow, a purchase order may be created by the purchasing agent on his or her computer. The computerized image of the document or simply all of the information within the document may then be electronically routed, by the purchasing agent, to the purchasing manager for approval and/or revisions.

In a more complex organization, a purchasing agent may need approval from his or her own manager, as well as other managers in departments such as finance and engineering. The following sequence of events would typically occur in a computerized work flow system for such an organization. First, the purchasing agent would create a purchase request document on his or her computer containing pertinent information (e.g., part numbers, descriptions, quantity, etc.). At the command of the purchasing agent, this document would then be electronically routed to the department manager for approval. Next, the department manager could provisionally approve the purchase and/or add information to the document, and then electronically route the document to the other departments (e.g., finance, engineering) for further approvals. Finally, the last manager in the chain would then route the document back to the purchasing agent, who may then act upon it accordingly.

A drawback associated with the above prior art technology is that an entire document image, or at least all the information contained within the document, must be accessed by each individual in the flow. This will occur even if any one of the individuals is only interested in some, but not all, of the information in the document. For example, the purchasing manager might only be interested in information related to the quantity and vendor of the requested part, while the finance manager might only be interested in the quantity and cost of the part. Nonetheless, both the original paper order system and its computerized implementation provide all of the information in the purchase order to everyone, rather than only the information relevant to each individuals specific needs. Where large documents are involved, each individual may be then forced to sift through much information irrelevant to his or her job function.

Moreover, where documents contain sensitive information, which typically is reserved for only for specific individuals, prior art information flow systems require the creation of multiple documents with varying security authorizations and particular routing schemes for each of these documents. Thus, the prior art computerized information flow technologies are riddled with inefficiencies.

Another problem associated with prior art information flow systems relates to their reliance on users of the system to promptly and correctly route documents to other users. For example, where an engineer wishes to modify a component of a printed circuit board, he or she may electronically create a document containing pertinent information about the proposed change (e.g., part description, preferred vendor, location on the circuit board, etc.). Following creation of this document, predefined organizational procedures may require the engineer to electronically route the document to a purchasing agent in order to ensure that the new component may be obtained, a manufacturing department manager in order to ensure the manufacturing department is able to install the new component, and to the quality control department. If the engineer forgets or otherwise does not follow the routing procedure, valuable time may be lost at the end of the procedure in obtaining approvals which should have been obtained earlier. Moreover, if the omissions of the engineer occur, situations, such as the plant switching production without having the proper parts in hand, may occur.

The above example illustrates just one of the problems which may occur in systems which allow access to documents only on an "ad hoc basis." Other problems associated with this prior art technology include the possibility of individuals losing, misplacing, or misdirecting documents. Moreover, this prior art technology may result in time lags, procedural steps being missed, and people being left out of the process. Accountability is also a problem since many prior art systems provide no effective way to determine who is responsible for the problems caused with improper routing of a document.

The above-described shortcomings, and other shortcomings of prior art techniques for facilitating the flow of information are effectively overcome by the present invention, as described in further detail below.

SUMMARY OF THE INVENTION

In accordance with the teachings of the present invention, a new computerized information flow technology is provided. The present invention is particularly useful for implementing work flow procedures.

The present invention introduces a process and apparatus for facilitating the flow of information to complete predefined procedures within an organization. The invention facilitates the flow of information by providing a novel method for logically and automatically routing information through a predefined sequence of activities to users who need the information.

Applied to a work flow, the present invention disseminates information from a first user to a second user to allow the second user to perform a work-related activity associated with the first user's information. The present invention also notifies the second user that information needs to be acted upon.

In a preferred embodiment of the invention, a list of available activities is displayed to the user. After an activity is chosen by the user from the activity list, the computer system provides an activity screen, which may take the form of a standard Microsoft Windows user interface. The window typically reveals information and contains blank fields for the addition, deletion, or modification of information by the user. The user may then add, delete, or modify information in the window in response to predefined prompts stored in the computer system and displayed in the window.

An example of an activity might be the creation of a document by a purchasing agent in order to purchase a part. In this example, the computer screen could contain a list of available activities that the purchasing agent is able to undertake (e.g., purchase a part, check inventory levels on existing parts, etc.). Next, the purchasing agent selects one activity (e.g., "purchase a part") and views an associated activity window which prompts the purchasing agent to provide information (e.g., part number, quantity, etc.). The purchasing agent then inputs information into the computer system in response to the prompts in the window. As a result, the computer system of the present invention would collect the information to complete the "purchase a part" activity.

After an activity is completed by the user, logic within the present invention selects an "event" associated with the information supplied by the user. The "event" is a stored computer procedure which logically decides which next steps should be taken in order to facilitate the flow of information through the sequence of activities. That "event" performs the decision making process by applying the information previously input into the computer system by the user to one or more predefined conditions. Therefore, when an event occurs, the stored procedure within the present invention logically determines all possible next steps which are associated with the event, and which next step(s) are to be selected based upon the previously input information.

The next step(s) that are selected determine the next user or group of users who are responsible for performing a next activity in the predefined sequence. Each step is associated with information regarding a next activity to be performed; a user or group of users responsible for performing the next activity; and a message that reveals to the user or group of users the nature of the activity to be acted upon.

Based on the information associated with the selected next step(s), the system sends the previously described message along with relevant information, to the next user or group of users who need the information to perform the next activity. Particularly, the message is added as a next activity, (also referred to as a "task"), to a "To Do" list for the next user or group of users. The "To Do" list is simply a list of tasks which a user may view and select for further execution. Therefore, similar to the first user selecting an activity from the user's predefined activity list, a second user may select a task from his or her "To Do" list. After a task (activity) is selected by a second user, information may be entered in his or her activity window to complete the task (activity).

As an illustration, after a purchasing agent enters his or her pertinent information to purchase a part, the event associated with the "purchase a part" activity determines that the next steps require that the purchasing agent's manager and the finance manager approve the purchase. Therefore, both managers receive a message, representative of a task, in their respective "To Do" lists on the screen of their computers. This message could correspond to an "approve part purchase" task (activity). Each manager then selects the "approve part purchase" task (activity) from his or her "To Do" list.

The screen of each manager's computer then reveals pertinent information related to that manager's decision to approve the purchase. For instance, the purchasing manager could view information related to the quantity and vendor of the part, while the finance manager could view information related to the quantity and cost of the part. Each manager then completes his task by entering relevant information into the computer system pertaining to the approval or disapproval of the purchase.

After a second user (such as the purchasing manager or finance manager in the above example) completes his or her task (activity), the same process as described above with respect to the first user takes place. This process includes the occurrence of an event, one or more next steps associated with the event, and a message corresponding to each subsequent next step for each associated user. Also, as described above, the message(s) generated by each of the next step(s) are to be added to an appropriate user's or group of users' "To Do" list(s). Finally, the process of the present invention, as described above, is repeated for further subsequent users as they perform their tasks (activities) in the predefined sequence of activities, until each piece of information is pushed entirely through the organization's predefined information work flow path.

A particularly important aspect of the present invention as described above is its ability to assure that the information associated with an activity will be promptly, accurately, and sequentially routed through the entire information flow process predefined by the organization. The predefined information flow path is typically defined by an administrative user of the computer system, who can easily modify the flow of information based on the changing requirements in the organization's environment. For example, in a work flow, the information flow may be modified based on changes in procedures, changes in responsibility, changes in personnel, and the like. These flow changes may be accomplished by means of disabling, enabling, or defining new next steps.

Another important aspect of the present invention is that it automatically updates a user's "To Do" List with a message from the preceding next step. The present invention's ability to automatically update a user's To Do List enhances the efficiency of the information flow process within an organization because a user can always quickly and easily determine which tasks (activities) need to be acted upon.

A further important aspect of the present invention is that it allows the user to select any activity in the activity list or any task in the "To Do" list. Therefore, the user may perform any activity or task that is available in the list at any time.

A yet further important aspect of the present invention is that it disseminates only pertinent information from a first user to second user. This improves on the prior art technology which is only able to disseminate all the information entered by the first user to the second user.

In a related aspect of the present invention, the computer system of the present invention prioritizes the user's list of available tasks based on predefined requirements entered by a user of the computer system. This might prove to be extremely beneficial for a user who is constantly being inundated with new tasks to be completed and who rarely has the time to scan all of them to determine which one should be undertaken first.

According to a further aspect of the present invention, the computer system of the present invention as described above also automatically archives any or all of the information in the flow. This information may be particularly beneficial for accountability purposes to determine who received certain information, when they received the information, etc.

According to another aspect of the present invention, the computer system of the present invention as described above also defines and maintains security privileges based on predefined requirements entered by a user of the computer system. This enables certain users of the present invention to access only certain types of information.

According to yet another aspect of the present invention, the computer system as described above also translates information into various languages (e.g., English, Spanish, etc.). These translations are then typically viewed by the user in the list of available activities, during the performance of an activity and/or task, and within any other screen of the computer system of the present invention that the user accesses.

The aforementioned and other aspects of the present invention are described in the detailed description and attached illustrations which follow.

BRIEF DESCRIPTION OF THE DRAWINGS

FIG. 5 depicts an example of an activity and associated events.

FIG. 6 depicts the primary information contained in a next step according to a preferred embodiment of the present invention.

FIG. 10 depicts the structure of a table according to a preferred embodiment of the present invention.

FIG. 17B depicts a computer screen, according to a preferred embodiment of the present invention, displaying an illustrative example of a Class Registration activity window.

DETAILED DESCRIPTION OF THE INVENTION

Figure 1:
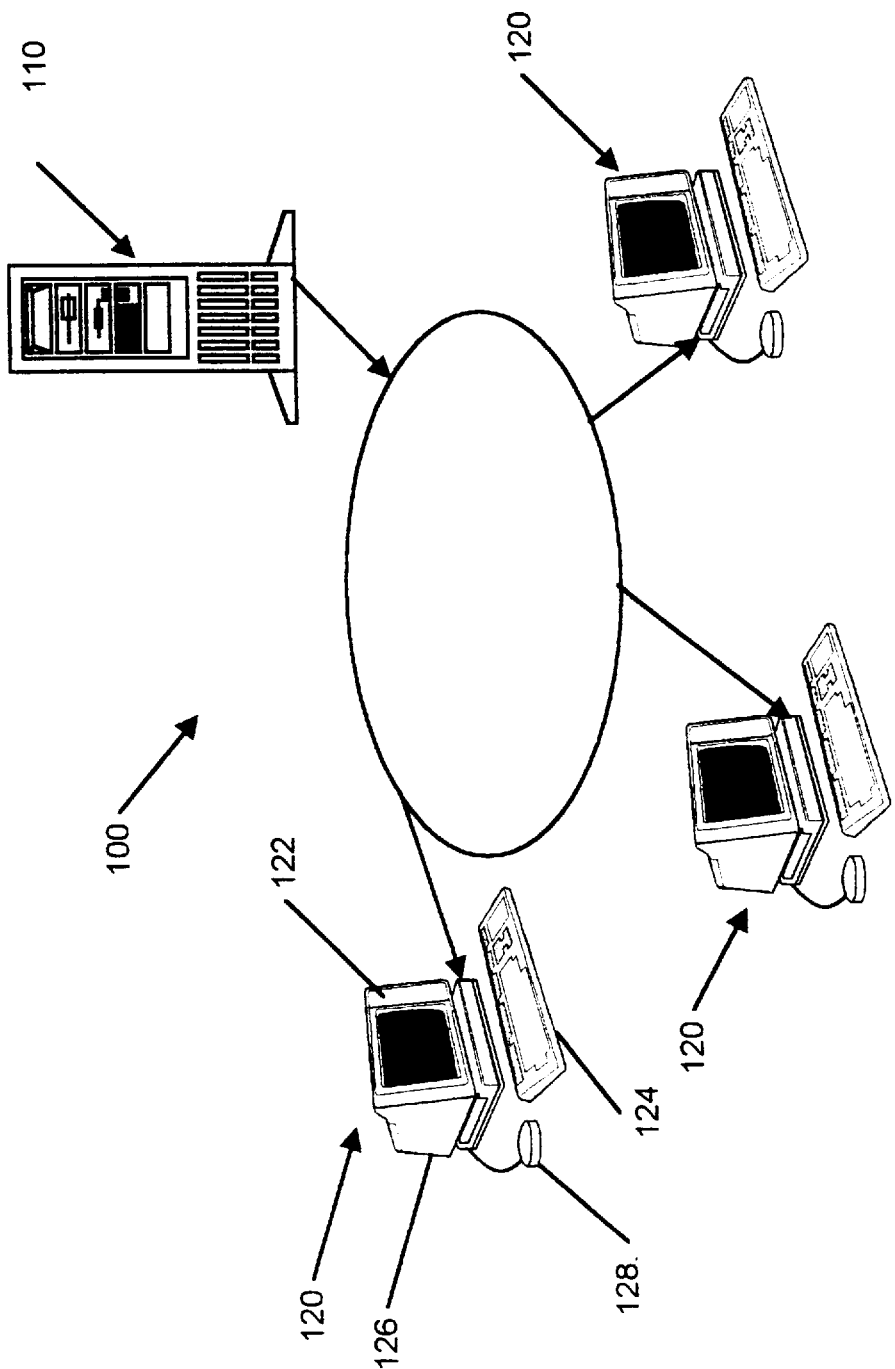
FIG. 1 depicts a diagram of a client/server network.

The computer system 100 of the present invention is preferably implemented on a client/server network 100 as shown in FIG. 1. The client/server network 100 includes a server 110, such as an HP/UX, Data General DG-UX, Microsoft NT, IBM RS/6000, or an OS/2 server, connected to a plurality of clients 120, also known as enduser workstations. Each enduser workstation preferably includes a terminal 126 which has a screen 122, a keyboard 124, a mouse 128, and a memory device. The enduser workstations 120 may be an IBM compatible PC running MS-DOS and Microsoft Windows or their equivalent. The preferred client/server network of the present invention is a Novell Netware or a PC LAN. Though these are the preferred clients, servers, and client/server networks, as may be appreciated by one of ordinary skill in the art, suitable equivalents may be used.

Figure 2:
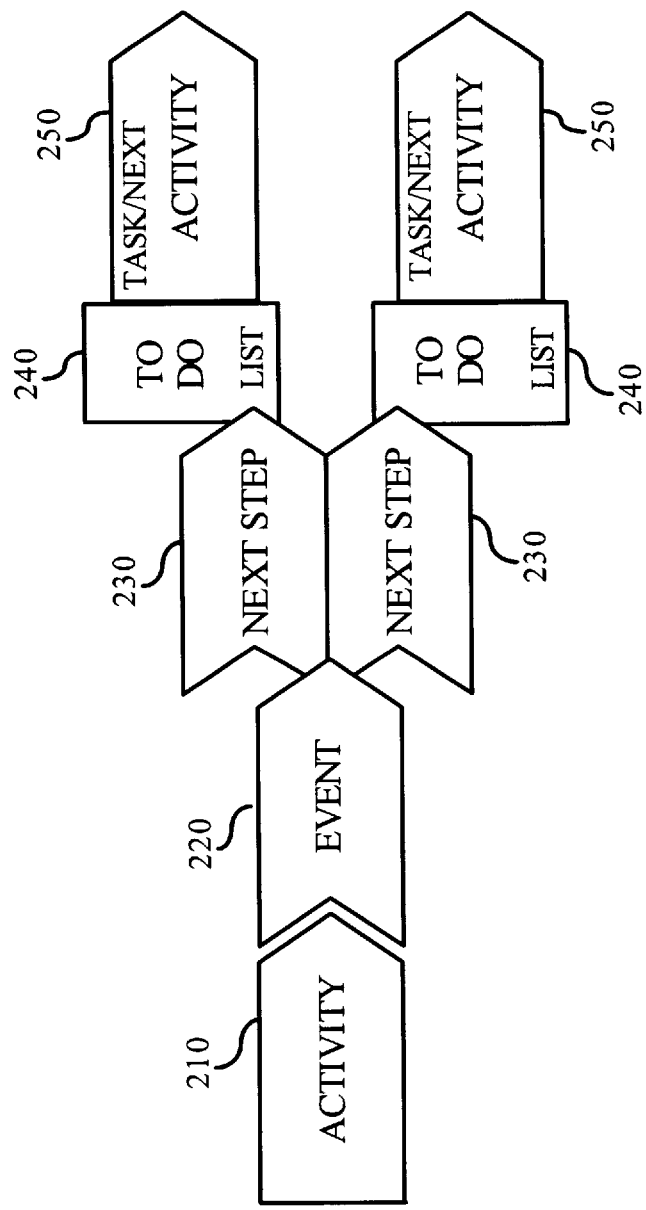
FIG. 2 depicts a flow diagram of the basic information flow process according to the present invention.

Referring to FIG. 2, a flow chart is shown which depicts the basic flow process for the present invention. This flow process assures that information is routed through the organization's predefined information flow path to the users who need it.

Figure 3:
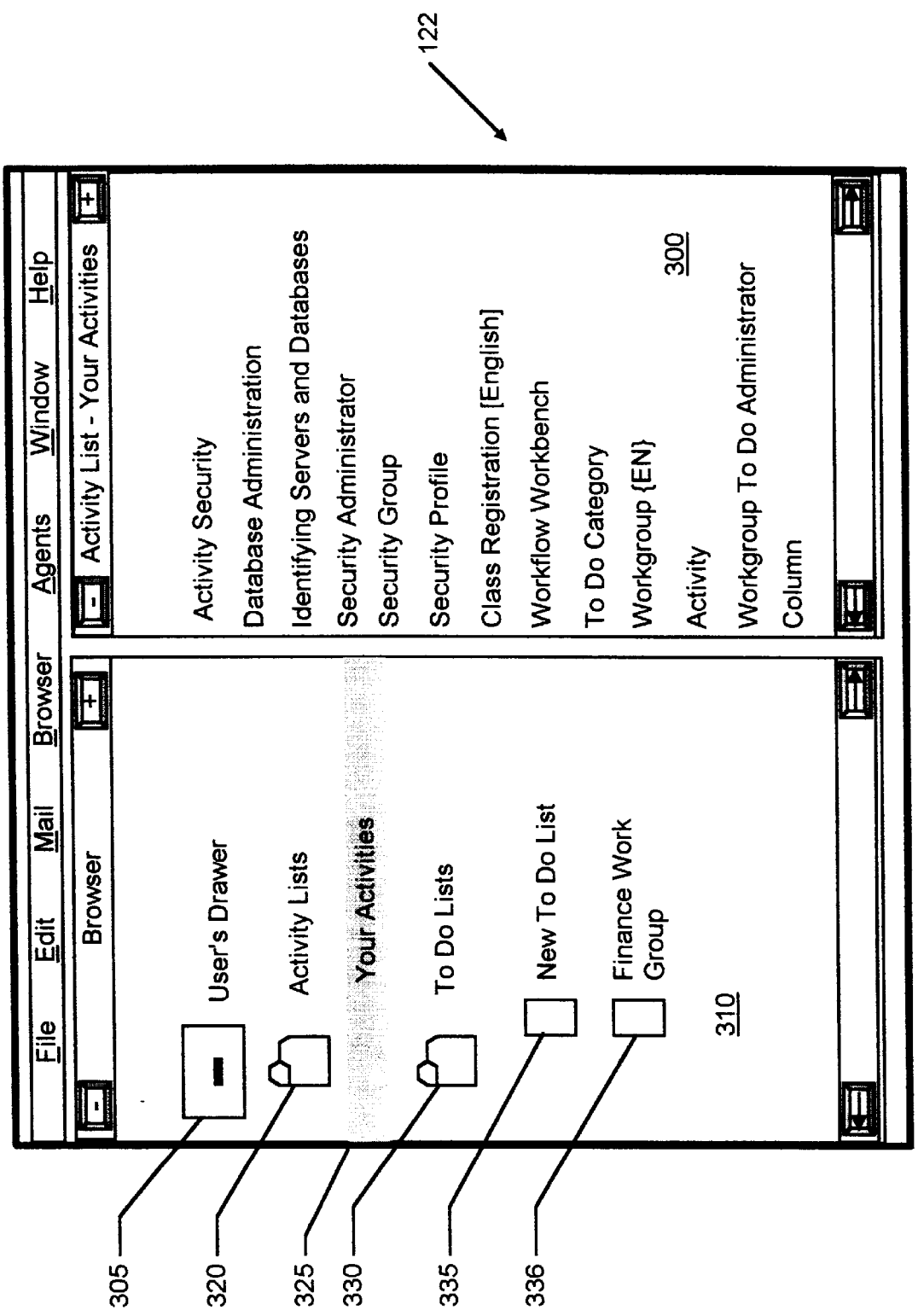
FIG. 3 depicts a computer screen, according to a preferred embodiment of the present invention, displaying a user's drawer, folders and lists.

In a preferred embodiment, a user may access the computer system 100 of the present invention from an enduser workstation 120 (see FIG. 1). As shown in FIG. 3, the computer system of the present invention searches the user's drawer 305 to provide an Activity Lists folder 320 and a To Do List folder 330 on the user's computer terminal screen 122. These are preferably displayed in a Browser mode window 310.

The Activity Lists folder 320 may contain one or more lists of activities that the user may select and act upon. In this example, the Activity Lists folder 320 contains a "Your Activities" To Do List 325. The To Do Lists folder 330 may contain one or more lists of tasks to be completed by the user or the user's work group. In this example, the To Do List folder 330 contains a "New To Do List" To Do List 335 and a "Finance Workgroup" To Do List 336. The Activity Lists folder 320, To Do Lists folder 330 and the contents of both folders may be displayed using a commercially available graphic user interface such as Microsoft Windows.

In this example, the user selects a list from either the Activity Lists folder 320 or To Do Lists folder 330. If the user selects the "Your Activities" list 325, the system provides a list of available activities 300 for the "Your Activities" list 325. This selection may be made, for example, by clicking over the chosen activity 210 with the mouse 128 or by cursoring over the chosen activity 210 with the tab key and hitting the return key on the keyboard 124.

In response to the user's selection of a list, the system displays a list 300 of available activities or tasks. For this example, the user's "Your Activities" list 325 contains such activities as Activity Security, Database Administration and Class Registration [English]. The user may then select an activity 210 from the list 300. The system responds to the selection by displaying a screen relating to the activity 210 to be acted upon.

Figure 4:
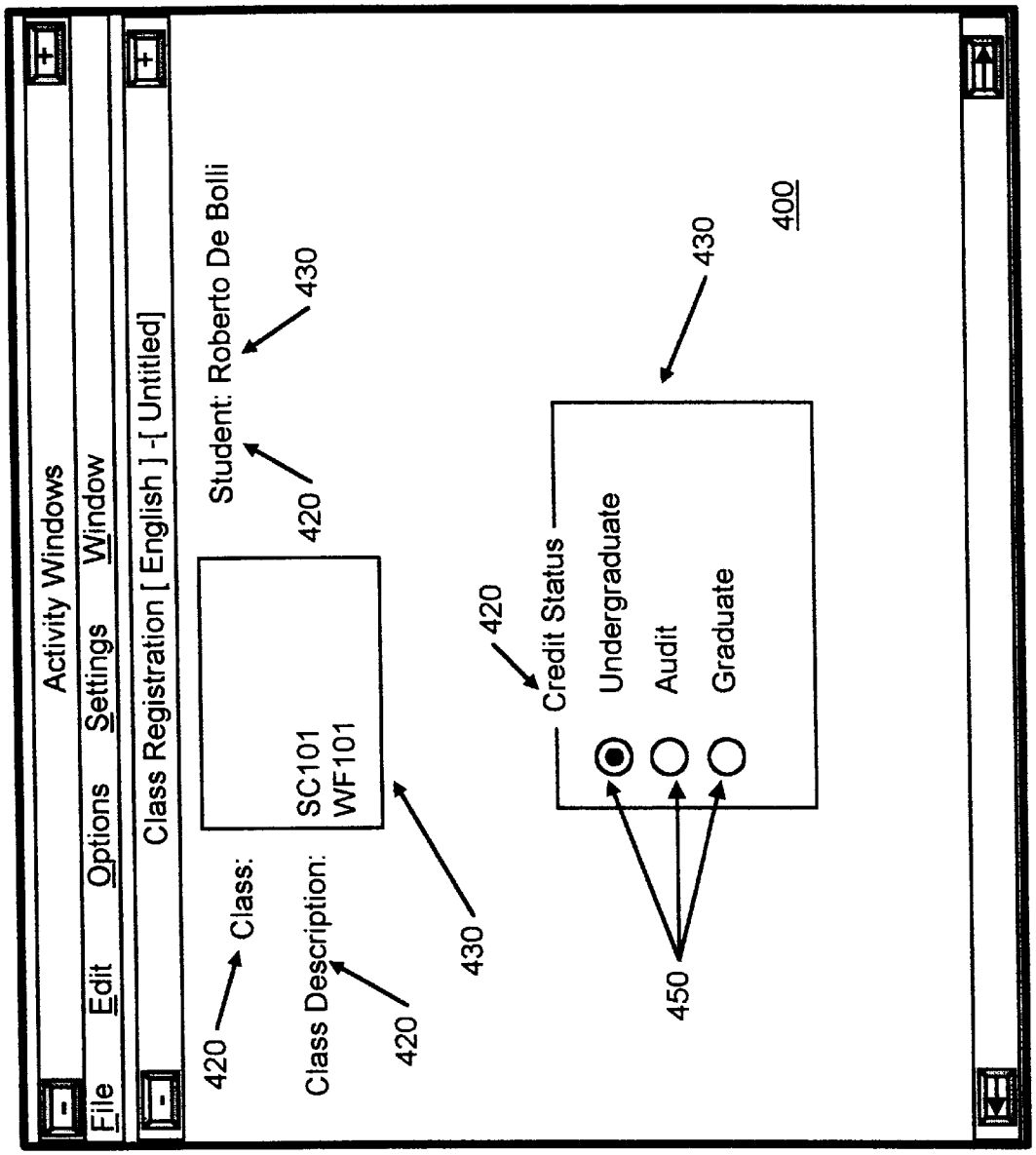
FIG. 4 depicts a computer screen, according to a preferred embodiment of the present invention, displaying an activity window.

FIG. 4 illustrates a screen which the system displays in response to the user choosing the Class Registration [English] activity 210 from his or her "Your Activities" list 325 (see FIG. 3). The Class Registration activity is displayed in an activity window 400, which preferably reveals information in the form of headings 420 and values 430.

To illustrate, the activity window 400 for a user attempting to register for a class may reveal the headings 420 as class, student, class description and credit status. Examples of values 430 associated with the credit status heading 420 are undergraduate, graduate, and audit. The activity window 400 also typically includes prompts, also referred to as blank fields, 450. Examples of prompts 450 in the activity window 400 are shown to the left of the undergraduate, graduate, and audit values 430 under the credit status heading 420. These prompts 450 may be filled in to represent information input by the user. In this example, the student/user has filled in the prompt 450 to the left of the undergraduate value 430. In a preferred embodiment of the present invention, other information may be entered by the student/user by simply clicking over the chosen value 430 with the mouse 128 (see FIG. 1) or cursoring over the chosen value 430 with the tab key on the keyboard 124 (see FIG. 1).

Referring back to FIG. 2, after all of the information or data required for activity 210 has been entered by the user, the user acts to indicate to the system that the chosen activity 210 has been completed and the data supplied by the user during performance of activity 210 should be saved. In a preferred embodiment, the user may make their indication using the mouse 128 to "click over" a "save file" icon on the computer screen 122 which, in a preferred embodiment, resembles a floppy disk (not shown). Alternatively, the user may depress the keyboard "Control" and "S" keys simultaneously (see FIG. 1). After the data relating to activity 210 has been saved and the user indicates that the activity 210 has been completed, the system triggers one of the events 220 associated with the activity 210.

An event 220 is a representation of a set of conditions stored in the computer system in accordance with the present invention. Whenever the set of conditions for an event is satisfied, the corresponding event is triggered. Each activity 210 has one or more events 220 associated with it. Additional software stored in the computer system, which, for example, may be written in Power Builder, COBOL, or C programming languages, chooses an appropriate one of the events 220 for execution. Three events that may be executed during the course of the performance of an activity are, for example, "add," "delete" and "change." As illustrated in FIG. 5, three events identified when a user has selected the class registration activity may be "add class," "delete class," or "change class." Each of these events may be chosen for execution in response to a corresponding action by the user.

Referring back to FIG. 2, when an event 220 is chosen, a stored procedure makes a determination of all possible next steps 230 which are associated with that event 220. After the event 220 determines which next steps 230 are associated with it, the event makes a further determination as to which next steps 230 are to be chosen. This determination assures that a next user or group of users is able to perform a next activity 250, also referred to as a task 250, associated with the information entered by the user and/or data input from an automated process, such as an MRP system.

As shown in FIG. 6, a next step 230 may include the following information: (1) the next activity/task 250 to be performed; (2) the user/group of users responsible for performing the next activity/task 250; and (3) a message revealing to the user/group of users the nature of the next activity/task 250 to be acted upon. The next step 230 may also contain information or data disclosing the name of the entity within the organization in which the user/group of users fall under, which is ultimately responsible for performing the next activity/task 250. The list of information shown in FIG. 6, as described, is merely exemplary of the types of information that may be included in the next step 230.

Referring back to FIG. 2, based on the information contained in the chosen next steps 230, the computer system sends a message, representative of an associated category of next activity/task 250, to the To Do List 240 of the user or the group of users responsible for performing the next activity/task 250. Once the message is added to the To Do List 240 for the user or the group of users, the next activity/task 250 may be selected, viewed, and acted upon by the user associated with the To Do List 240 in a similar fashion as described for selecting the initial activity 210 which started the flow of the current information.

Figure 7:
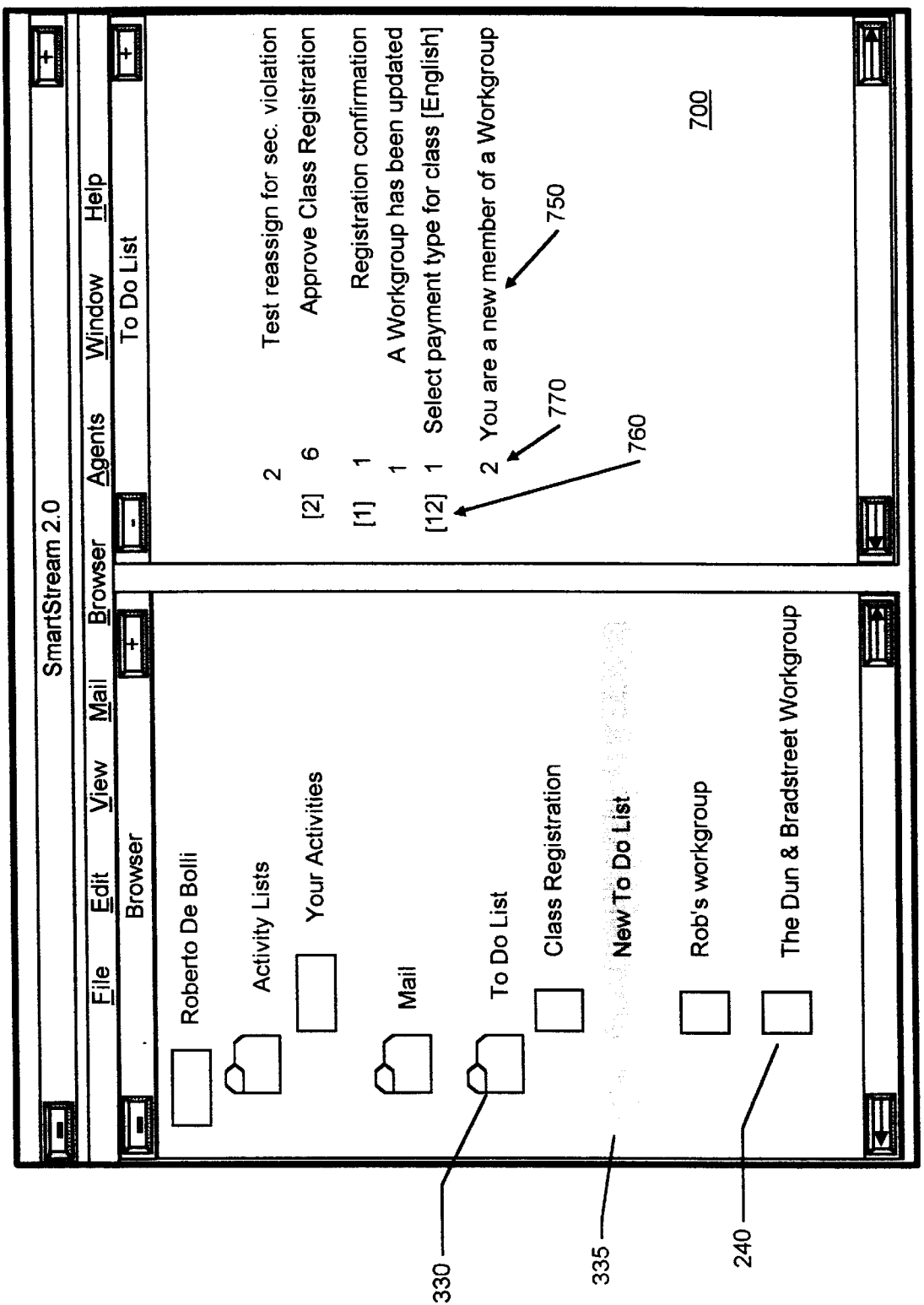
FIG. 7 depicts a computer screen, according to a preferred embodiment of the present invention, displaying a user's To Do Lists in the user's To Do List folder and an exemplary user's personalized To Do list containing next activities.

As shown in FIG. 7, a user may select a next activity/task 250 (see FIG. 2) from one or more To Do lists 240 located in the user's To Do List folder 330. In a preferred embodiment, a user may select a message 750 from a user's To Do List 700 personalized for the user. Alternatively, he or she may select a message 750 from the work group's To Do List 800 (see FIG. 8). In this example, the user selects the "New To Do List" 335 from the To Do Lists Folder 330.

To illustrate, the "New To Do List" 335 represents the user's personalized To Do List 700 set up for the user. Types of next activities/tasks 250 represented as messages 750 available to this user in his or her "New To Do List" To Do List window 700 are "Approve class registrations", "Registration confirmation," and "Select payment type for class [English]". These messages 750 represent next activities/tasks 250 categories subsequent to the initial activity 210 of class registration. In a preferred embodiment, the To Do list window 700 also displays the number of done/completed 760 and new 770 next activities/tasks 250 to the left of each message 750. In this example, the To Do list window 700, to the left of the "Approve class registrations" message 750, reveals that there are eight next activities/tasks 250 for this category, where six are new 770 and two are done 760.

Figure 8:
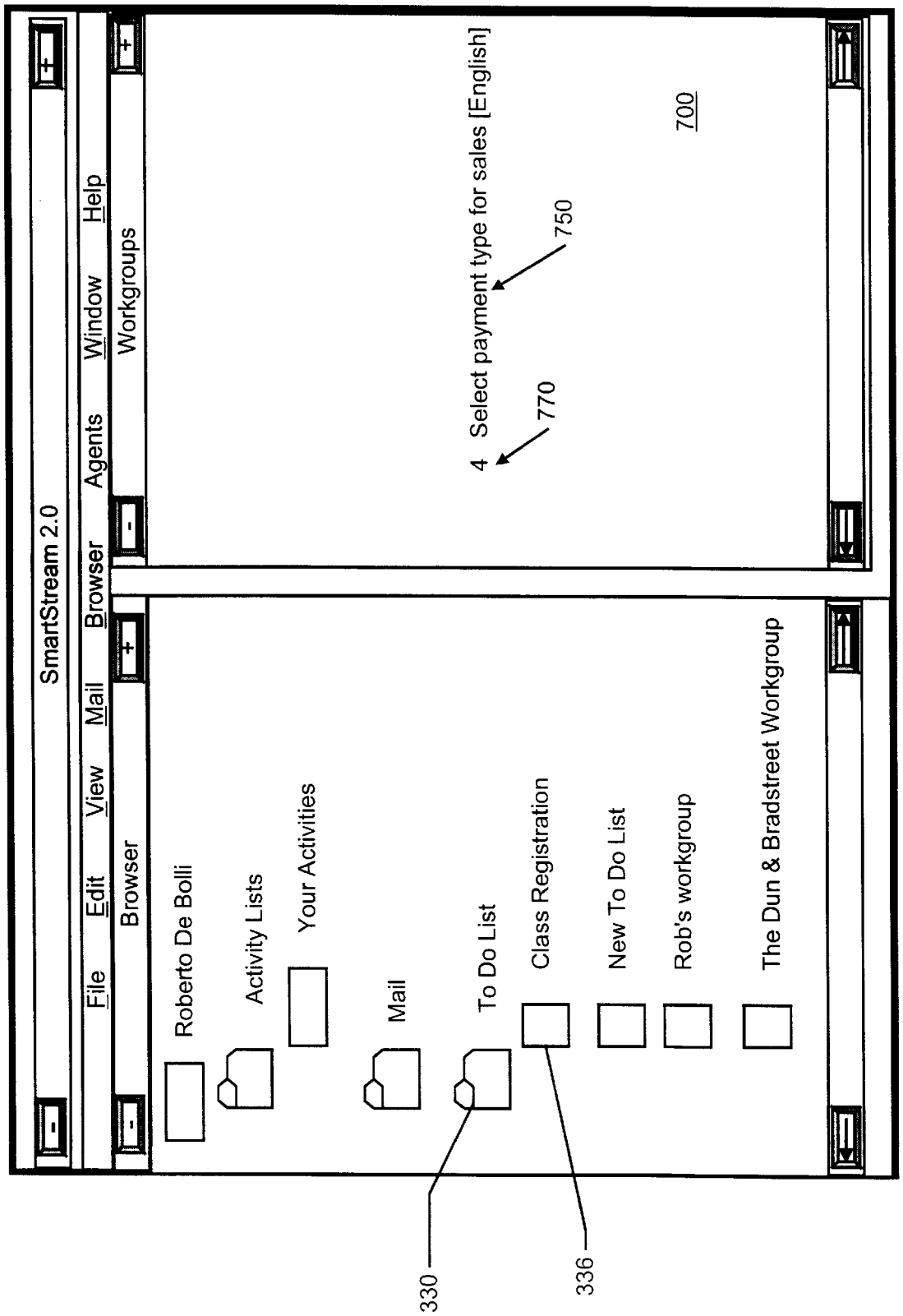
FIG. 8 depicts a computer screen, according to a preferred embodiment of the present invention, displaying a user's To Do Lists in the user's To Do list folder and an exemplary work group To Do list containing next activities.

Referring to FIG. 8, the user may also select a next activity/task 250 from a work group To Do List 700. This work group To Do List may be used when it does not matter which user among a group of users completes the next activity/task 250. For this example, the user has selected the Class Registration work group To Do List 336 from the To Do Lists folder 330. The message 750 revealed in the Class Registration work group To Do List is "Select payment type for class." This message 750 represents a next activity/task 250 subsequent to a prior user registering for a class. The user has four new 770 next activity/tasks 250 associated with this message 750.

Once the user selects the next activity/task 250 from the user's personalized To Do List 700 (see FIG. 7) or the user's work group To Do List 700 (see FIG. 8), referring to FIG. 2, the process for the flow of information which occurred after the initial activity 210 was selected may be repeated. As described above, the process would include the user entering relevant information into the activity window 400 (see FIG. 4) for the next activity/task 250, the user triggering an event 220, one or more next steps 230 being determined, and a corresponding message 750 (see FIG. 7) being added to the To Do List 240 of the user or work group responsible for performing the next activity/task 250. This cycle, inclusive of the user accessing the next activity/task 250 from the relevant To Do List 240, may continue until each piece of information is pushed entirely through the organization's predefined information flow path.

Figure 9:
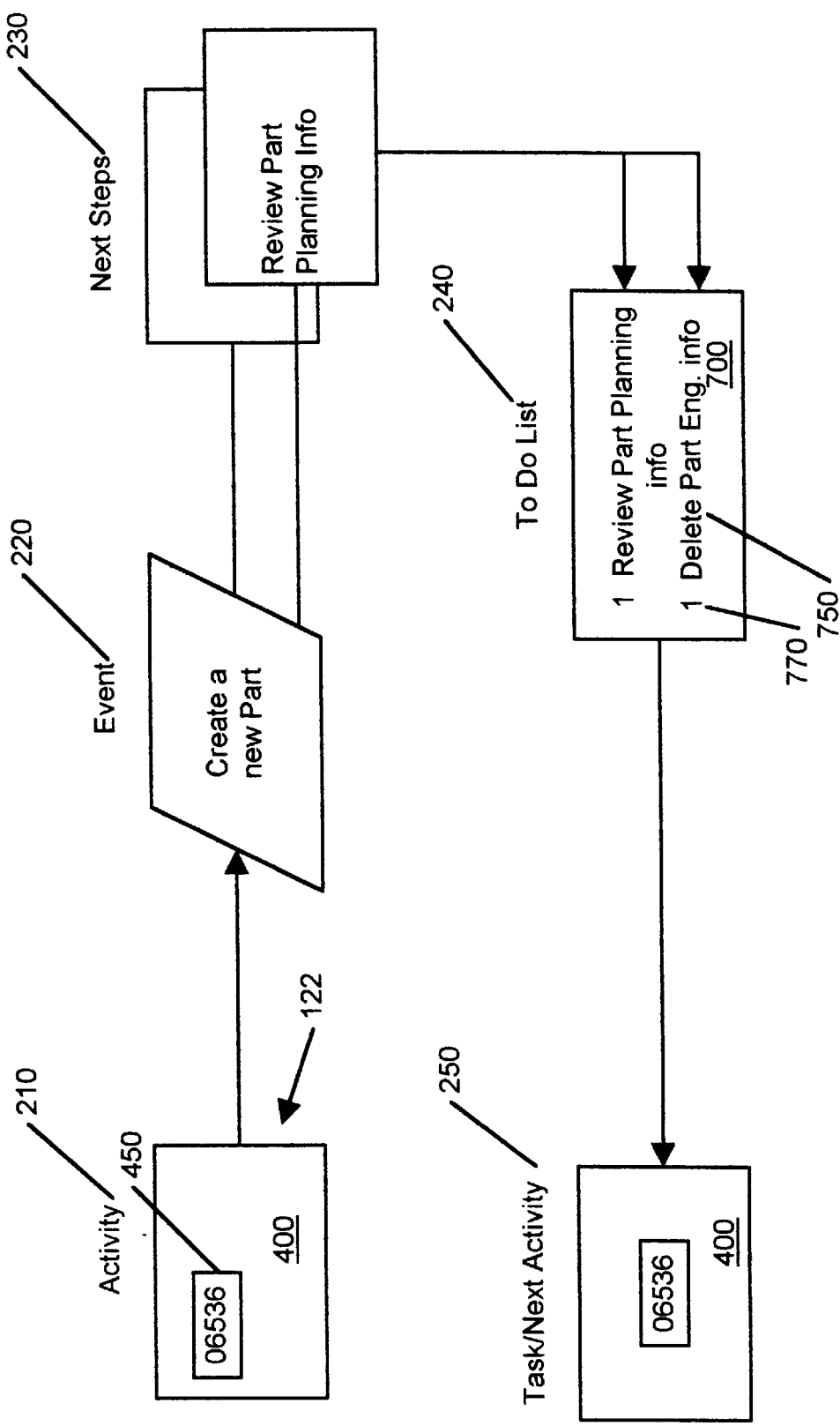
FIG. 9 depicts an illustrative example of the basic information flow process depicted in FIG. 2.

An example of the information flow process of the present invention is illustrated in FIG. 9. This example shows how the information flow process of the present invention is implemented, where the activity to be performed is to add a new part to a system for controlling a manufacturing operation.

In this example, the user (e.g., an engineer) chooses the "Part" activity 210 from his or her activity list (not shown) in order to create a new part for a manufacturing process within the organization. In response to this choice, the system displays a "Part" activity screen on the engineer's terminal screen 122 within activity window 400. This window 400 includes a prompt area 450, in which the engineer enters the number of the part (i.e., "06536").

When the engineer appropriately signals the system that the activity 210 is complete, the system responds by triggering execution of one of the events 220 associated with the activity 210. In this example, the event 220 triggered is the "Create a new Part" event 220.

The software "create a new part" event 220 then makes decisions based upon the addition of the part number to determine the next steps 230 to be undertaken in this flow process. For this example, the next steps 230 are "Review Part Planning information" to be done by the manufacturing manager and "approve part planning" (not shown) to be done by the quality department manager.

The "review part planning information" message 750, representative of a next activity/task 250 category, is then displayed by the system in the manufacturing manager's To Do List 240. In this example, the manufacturing manager has two messages 750, "Review part planning info" and "Define Part Eng. info.", listed in his personalized ("Things to do") To Do List window 700. The manufacturing manager may then select the "Review Part Planning info." message from his To Do List window 700, and the next activity/task 250 associated with this message is displayed in the manager's next activity/task window 400. Finally, this process for the flow of information through the organization is repeated as the manager enters relevant information into the window 400 for the next activity/task 250. The present invention then triggers an event 220 for determining the next steps 230 in the organizations procedure, and a message 750 representative of a next activity/task 250 category is added to another user's or work group's To Do List 240. As discussed above, this cycle continues until each piece of information is routed entirely through the organization's predefined information flow path (i.e., appropriately acted upon by all appropriate personnel in the organization in the proper sequence).

Set forth below is a description of the computer software for implementing a presently preferred embodiment of the present invention. As one of ordinary skill in the art would understand and appreciate, the following is merely one way of implementing the invention and many equivalent ways exist to achieve the same functions and results of the invention.

Referring to FIG. 1, application programs are created using PowerBuilder code (application development software available from Powersoft, of Burlington, Mass.) and are stored on the client side 120 of the client/server network 100. Tables and stored procedures are created using SQL (Structured Query Language) code and are stored on the server side 110. Though PowerBuilder and SQL are the preferred software tools for the present invention, one of ordinary skill in the art would appreciate that the present invention could be implemented with many other equivalent types of software and/or development tools.

In a preferred embodiment, the PowerBuilder software is the preferred tool for creating the main application program of the present invention and the specific application programs to execute the windows 400 (see FIG.4) for each activity 210 and next activity/task 250 (see FIG. 2). On the other hand, the SQL software is used primarily to create tables and stored procedures which interact with the tables and the PowerBuilder application programs to send information (e.g., data) back and forth on the network 100 (see FIG. 1). In a preferred embodiment, the stored procedures are compiled and then interpreted by SQL engines.

Figure 10:
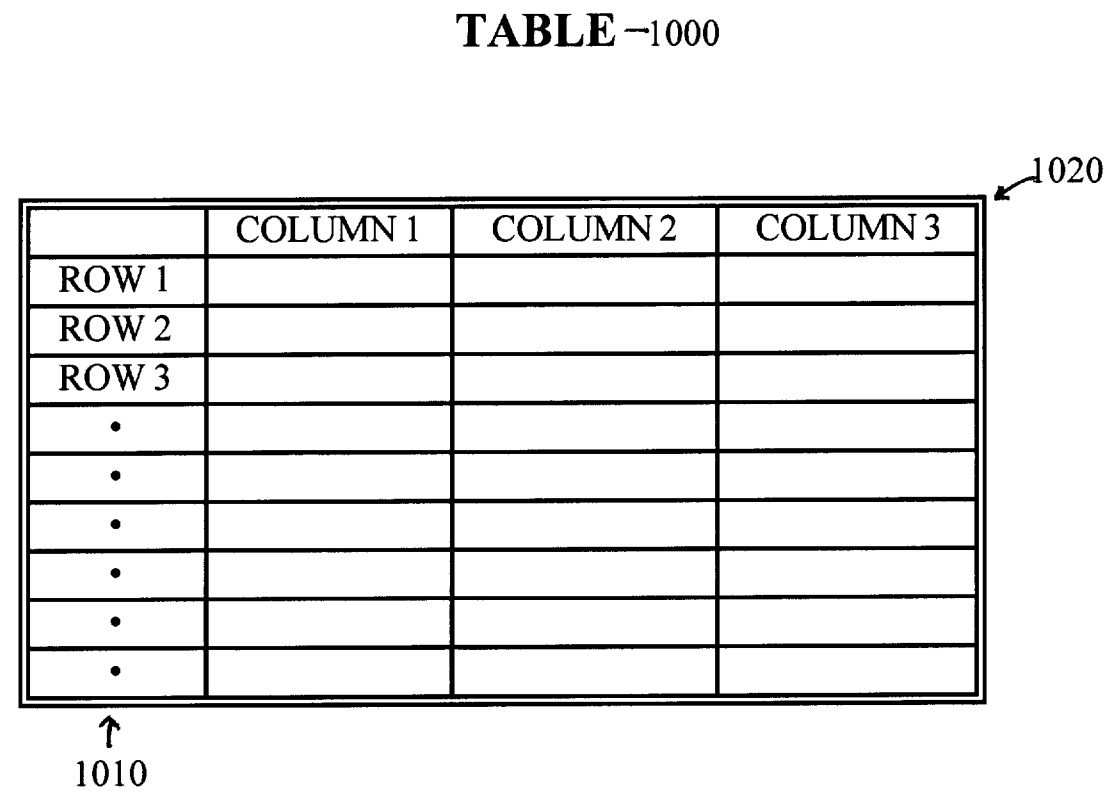

Referring to FIG. 10, data may be stored in a table 1000, also known as a database structure, in rows 1010, also referred to as records, and columns 1020, also referred to as fields. Examples of tables utilized by the present invention and the relationships of these tables with one another are illustrated by FIGS. 11–15.

The COLUMN_MASTER table 1330 (see FIG. 13) is used for mapping most of the columns in the tables by having certain information related to the columns in each table stored in this table. In a preferred embodiment, information on the column includes the column identifier (COL_ID), which is a numerical value representative of the position for that column in the COLUMN_MASTER table 1330; the column name (COL_NAME), which is the name the column is referred to in the other tables; the column label (COL_LABEL), which is the label used for viewing in the various windows; the column type (COL_TYPE), such as database datatype (i.e., character, integer, datetime, etc.); the column length (COL_LENGTH), which represents the size of the column; and the event column number (EVENT_COL_NBR), which is used to correlate an event identifier (EVENT_ID) in the EVENT_MASTER table 1220 with its particular column identifiers (COL_Ids).

Figure 15:
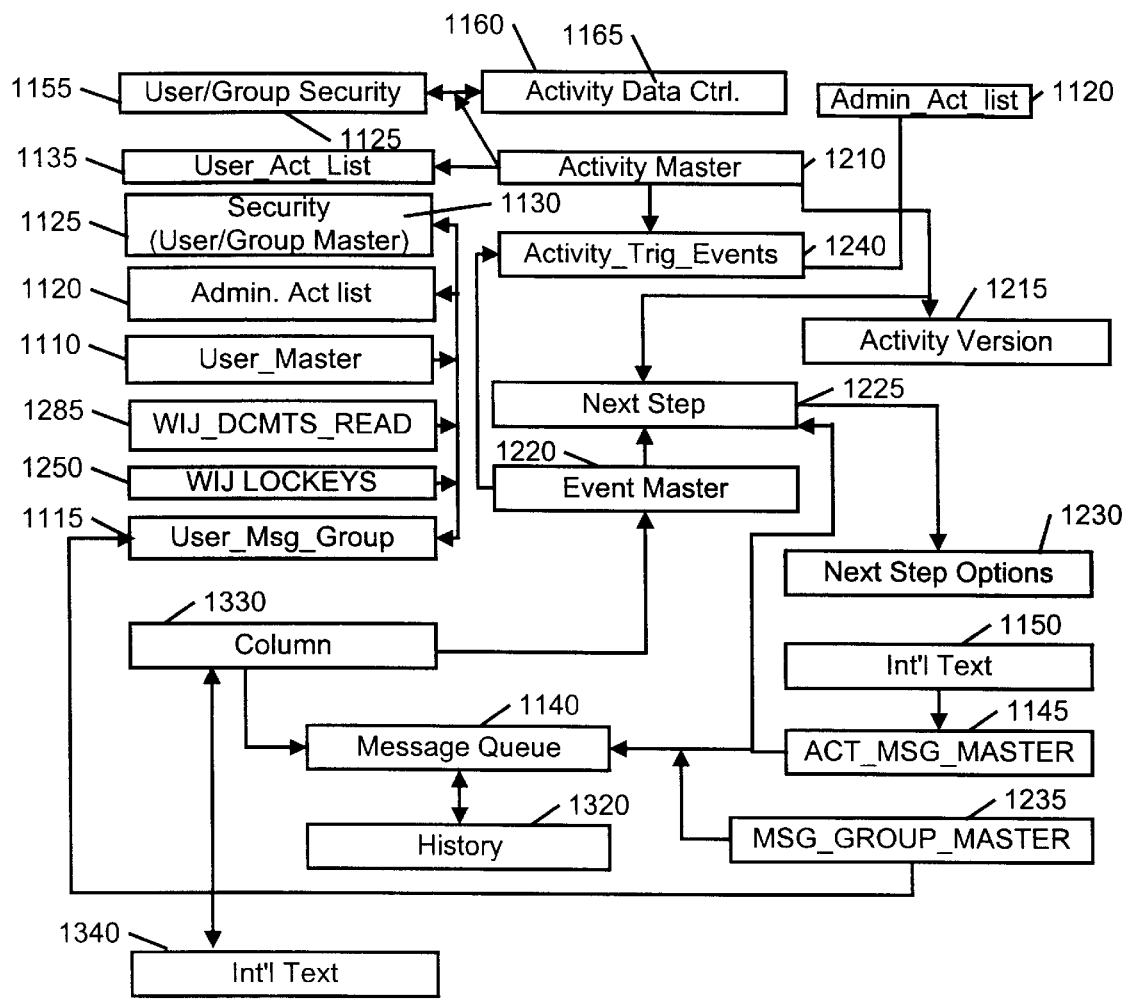

FIG. 15 shows some of the primary tables 1000 used in a preferred embodiment of the present invention. Each line between two tables indicates that information (e.g., data) between these tables 1000 is shared in a one-to-many relationship. The head of the arrow (black dots in FIGS. 11–14) at one end of each line positioned next to one of the tables 1000 indicates that the table may have many rows (records) which are associated with one row (record) of the table 1000 positioned at the other end of the line.

Set forth below is a description of how, in a preferred embodiment, the applications programs, stored procedures, and tables 1000 interact to implement the information flow process of the present invention.

The software of the present invention is activated to begin executing when a user logs onto the computer system (e.g., client/server network) 100 from his or her enduser workstation (e.g., an IBM compatible PC) 120 as described for FIG. 1. After the user logs onto the system, the screen 122 on the user's terminal 126, as shown in FIG. 3, reveals the Browser mode window 310 which is preferably created with Power-Builder software.

Figure 16A:
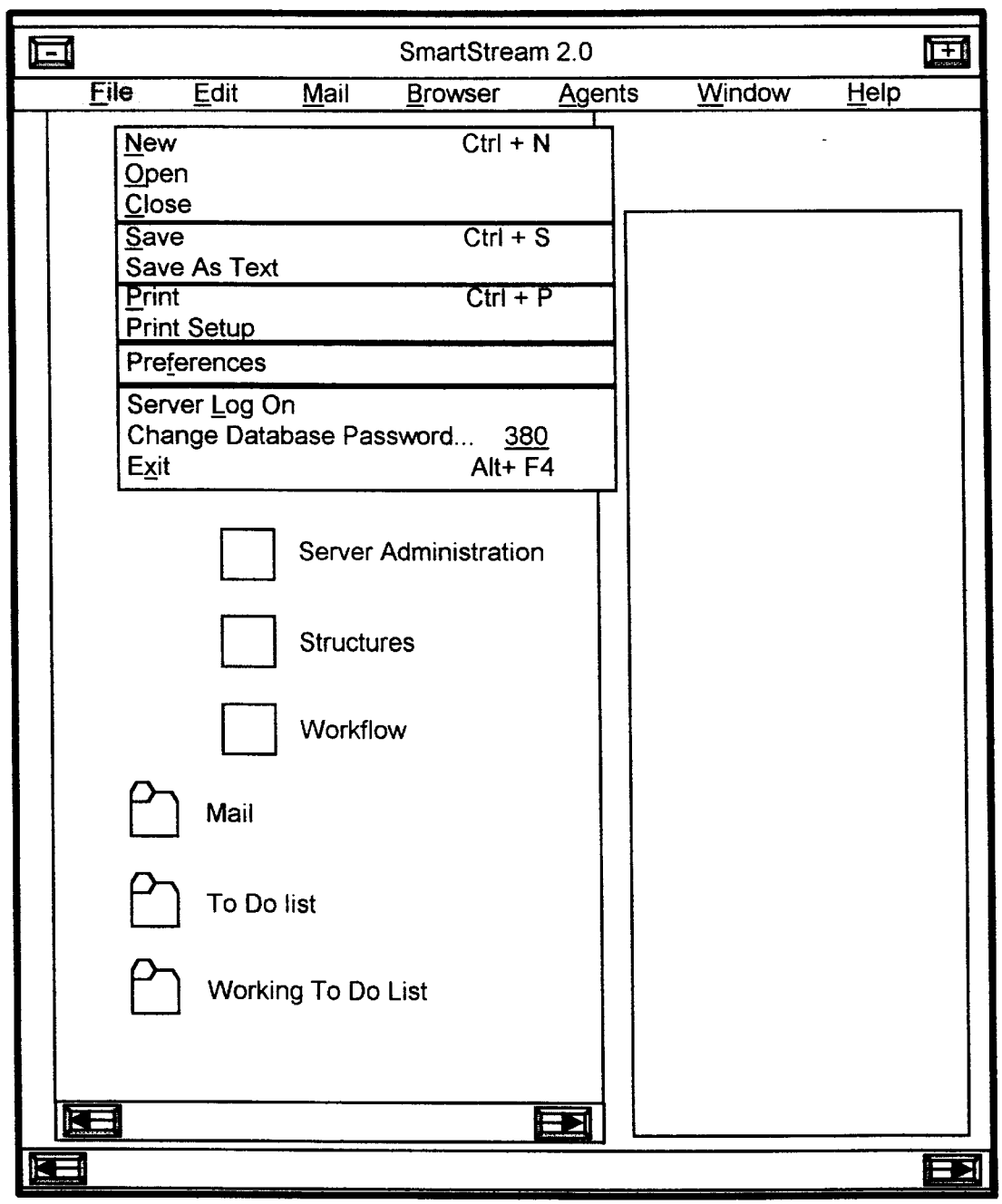
FIG. 16A depicts a computer screen, according to a preferred embodiment of the present invention, displaying the File mode where the user may select the New command to create an activity list.
Figure 16B:
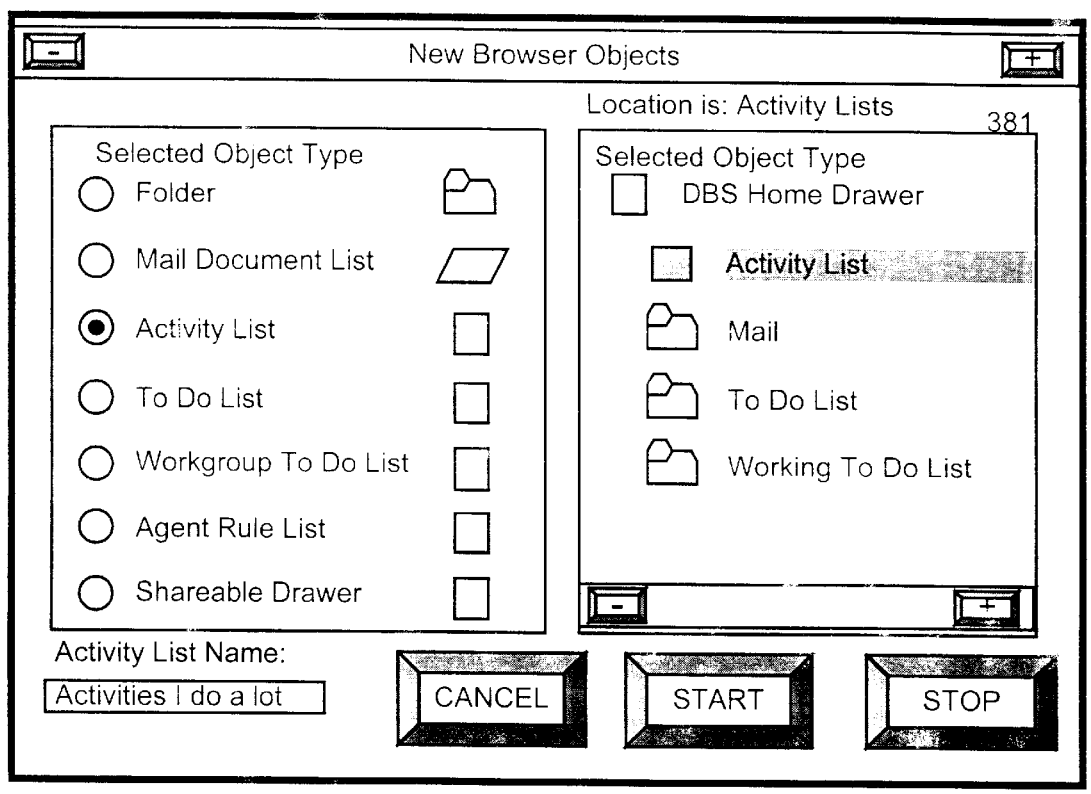
FIG. 16B depicts a computer screen, according to a preferred embodiment of the present invention, displaying the New Browser Objects window, where the user may name an activity list and select the location for the activity list.

Referring to FIG. 16A, a user may create an activity list for his or her Activity Lists folder 320 by accessing the File mode and choosing the New (Ctrl+N) selection from the File list window 380. As shown in FIG. 16B, a "New Browser Objects" window 381 is displayed by the system in response to the above action by the user. The user then selects the "Activity List" as the new object type and enters the new activity list name (e.g., "Activities I do a lot") in the bottom left hand corner of the window. Finally, the user chooses which drawer (e.g., "DBS Home Drawer") and folder (e.g., "Activity List Folder") in which to put the activity list. The user also has the option to put the activity list in a drawer without putting the activity list into a folder.

In response to the above user inputs, the main application program sends the user's drawer number (referred to as the DRAWERNO in the tables), the folder number (FOLDERNO) assigned to the activity list, the description (DESCR) of the list (e.g., Activity List), and the location of the list (PARENTFOLDERNO) (e.g., the number assigned to the Activity List folder) from the client to a stored procedure at the server. In one embodiment, the name of the stored procedure is FOLDER$insert_1. The stored procedure then stores this information in the WIJ_FOLDER table 1255 (see FIG. 12) and sends a message to the main application program that the information has been stored.

Each activity list is identified and stored under a corresponding folder number (FOLDERNO). The WIJ_FOLDERS table 1255 (see FIG. 12) is used to keep track of all FOLDERNOs. The CONTAINSIND column in the WIJ_FOLDERS table 1255 indicates whether the FOLDERNO refers to a folder or to a list. More details on the WIJ_FOLDERS table 1255 are provided below.

Figure 16C:
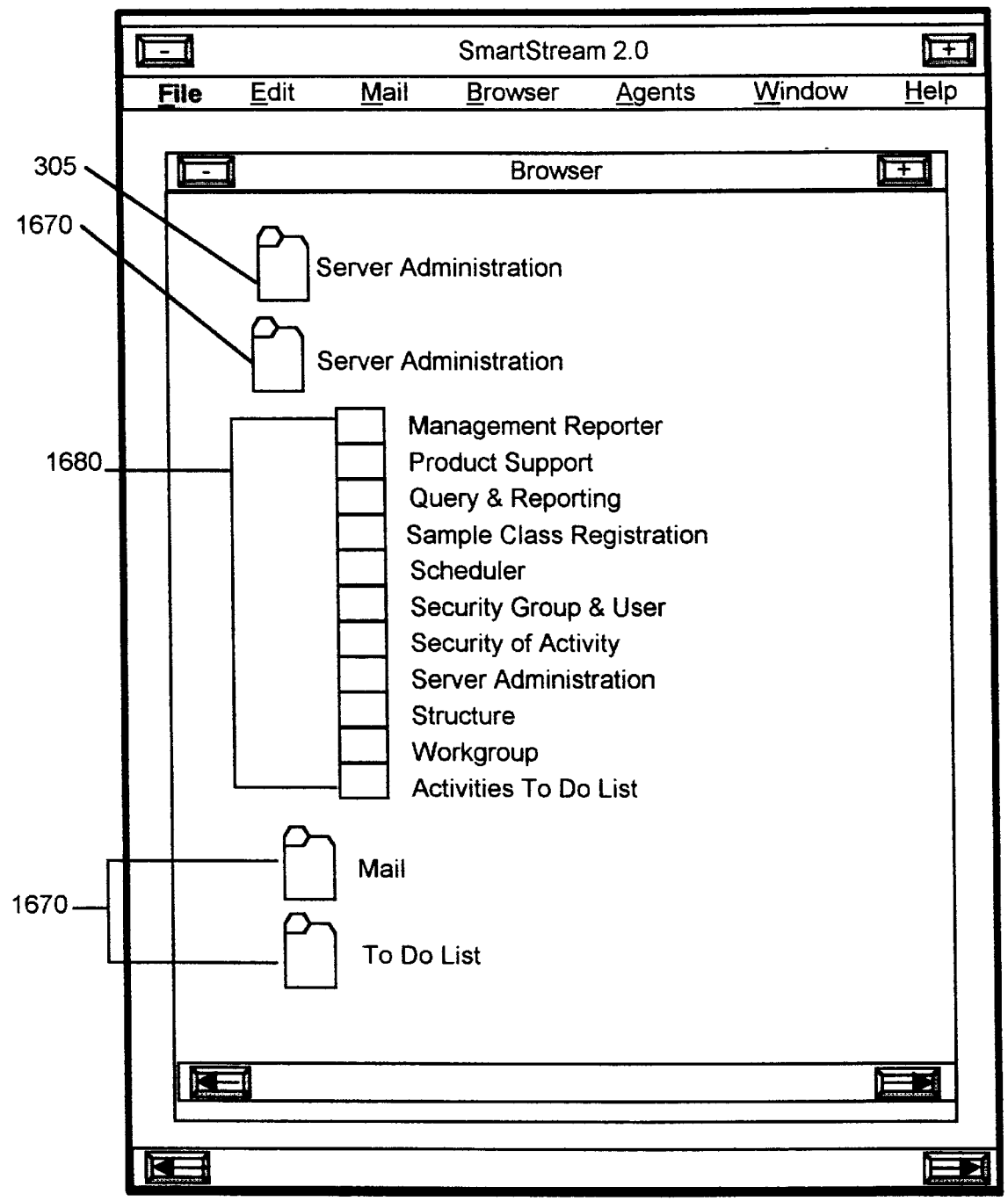
FIG. 16C depicts a computer screen, according to a preferred embodiment of the present invention, displaying the Browser mode which reveals all folders and lists for a user's drawer, where a user may select to add lists to folders.

Referring to FIG. 16C, the user may add activities to an activity list by accessing, the Browser mode. The Browser mode window 310 reveals all folders 1670 and the activity lists 1680 or To Do Lists (not shown) contained within the folders 1670 for a particular drawer 305 of the user. The user may then select an activity list 1680 in which to add activities.

If an activity list 1600 is empty, as is the "Activities I do a lot" list 1680, then the activity list representation will be blank. However, if the activity list 1680 contains one or more activities or next activities/tasks, then the activity list representation will contain horizontal lines.

Figure 16D:
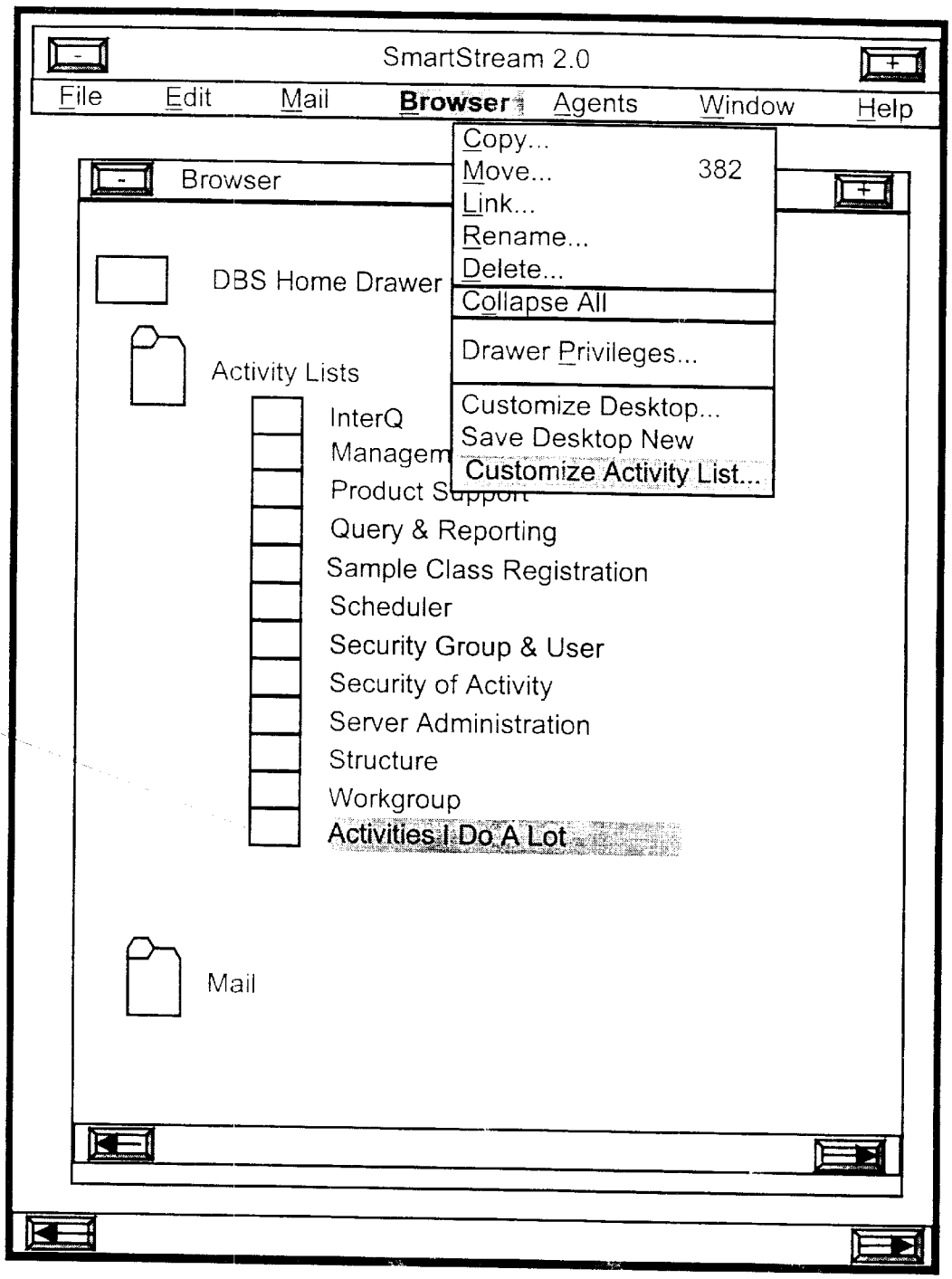
FIG. 16D depicts a computer screen, according to a preferred embodiment of the present invention, displaying the Browser list window, where the user may select the Customize Activity List command to add an activity to an activity list.

A user may add activities to an activity list by selecting, for example, the "Activities I do a lot" list 1680 in which to add one or more activities. Next, referring to FIG. 16D, the user selects the Browser list window 382 and chooses the Customize Activity List command from the Browser list window 382.

Figure 16E:
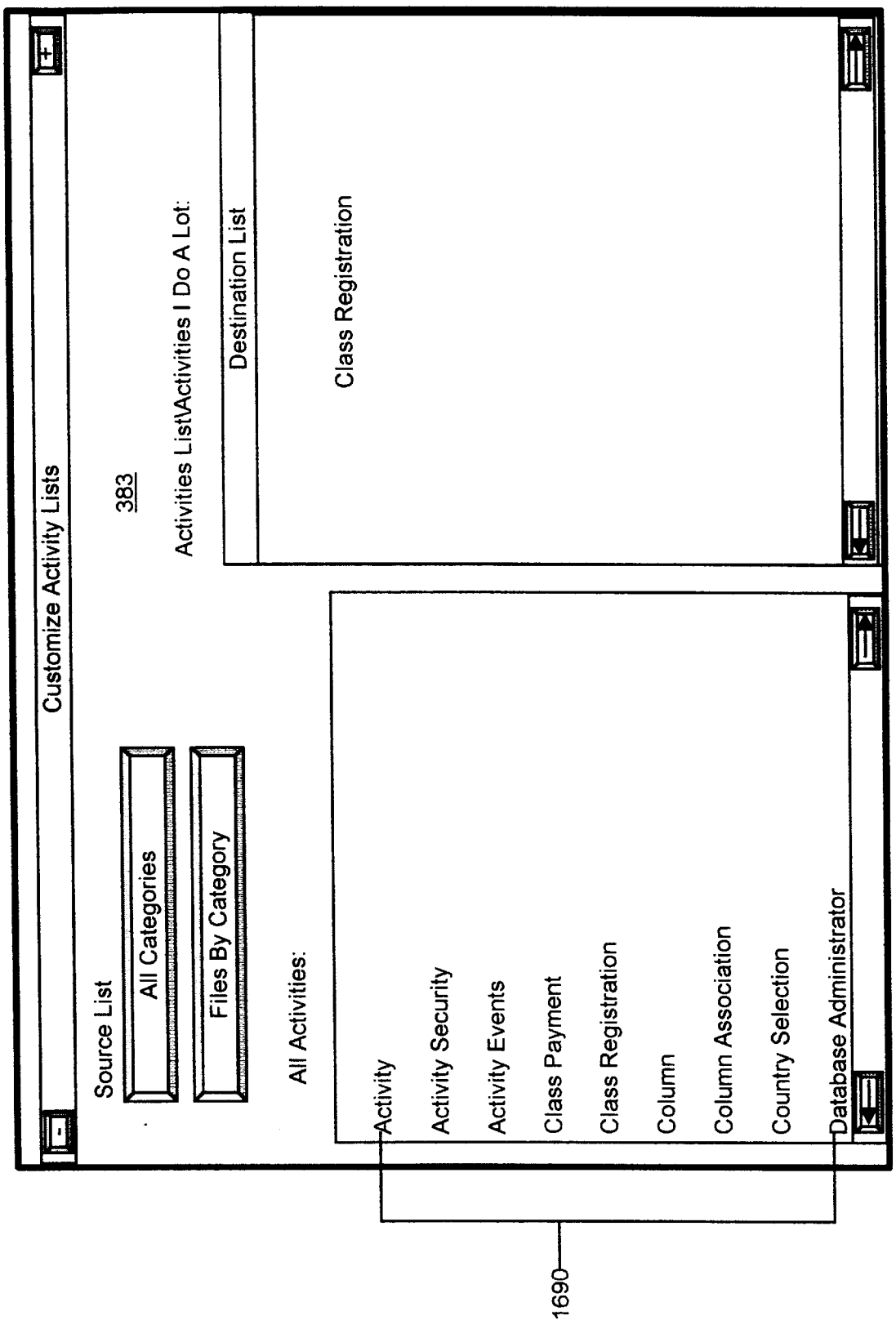
FIG. 16E depicts a computer screen, according to a preferred embodiment of the present invention, displaying the Customize Activity List window, where the window reveals a list of activities the user may access.

Referring to FIG. 16E, in response to the above actions of the user, the main application program displays a list of activities that the user may access in a Customize Activity List window 383. (The access is preferably based on security privileges predefined by an administrator of the system which is discussed further below). In determining which activities the user may access, the main application program sends the user's identifier (USER_ID) to a stored procedure. In one embodiment, the name of the stored procedure is psp_sel_avail_user_acts_1. This stored procedure then accesses the USER_SECURITY table 1125 (see FIG. 11) to determine which user specific activities, represented as activity identifiers (ACTIVITY_Ids), the user has security privileges.

Next, the stored procedure accesses the USER_MASTER table 1110 (see FIG. 11) to obtain group security identifiers (SEC_GROUP_Ids) associated with the user's USER_ID. The stored procedure then accesses the GROUP_SECURITY table 1155 (see FIG. 11) to determine which activities (ACTIVITY_Ids) the user, as a member of a group of users (work group), may access. Next, the stored procedure accesses the ACTIVITY_MASTER table 1210 (see FIG. 12) and uses the ACTIVITY_Ids to obtain a description of each activity (ACTIVITY_DESC) that the user may access. Finally, the stored procedure sends the ACTIVITY_Ids and each activity's corresponding activity description (ACTIVITY_DESC) back to the main application program at the client.

The main application program then displays each of the activities 1690 in the Customized Activity List window 383. The user may then decide which activities he or she will choose to put in an activity list by selecting specific activities from the display. In this way, a list may be created, where the list may include user specific and/or work group specific activities.

After the user has selected the activities to store in an activity list, such as "YOUR ACTIVITIES" list, the main application program sends the USER_ID, FOLDERNO, ACTIVITY_Ids and any sequencing of activities for the list (SEQ_NBR) to a stored procedure at the server. In one embodiment, the name of the stored procedure is psp_ins_usal_1. This stored procedure then accesses the USER_ACT_LIST table 1135 (see FIG. 11), where the stored procedure creates a row for each ACTIVITY_ID. The USER_ID and FOLDERNO are both stored in each row created for each ACTIVITY_ID. Moreover, the SEQ_NBR, if any, for each activity is also stored in the row for each ACTIVITY_ID. In a preferred embodiment of the invention, if no sequencing information is selected for the activity by the user, then all non-sequence specific activities will be listed in alphabetical order in the activity list.

After the stored procedure stores the activity information for a particular activity list in the USER_ACT_LIST table 1135, the stored procedure sends a message to the main application program at the client to this effect. The main application program then waits for the user to decide which action he or she wants to perform next.

Figure 16F:
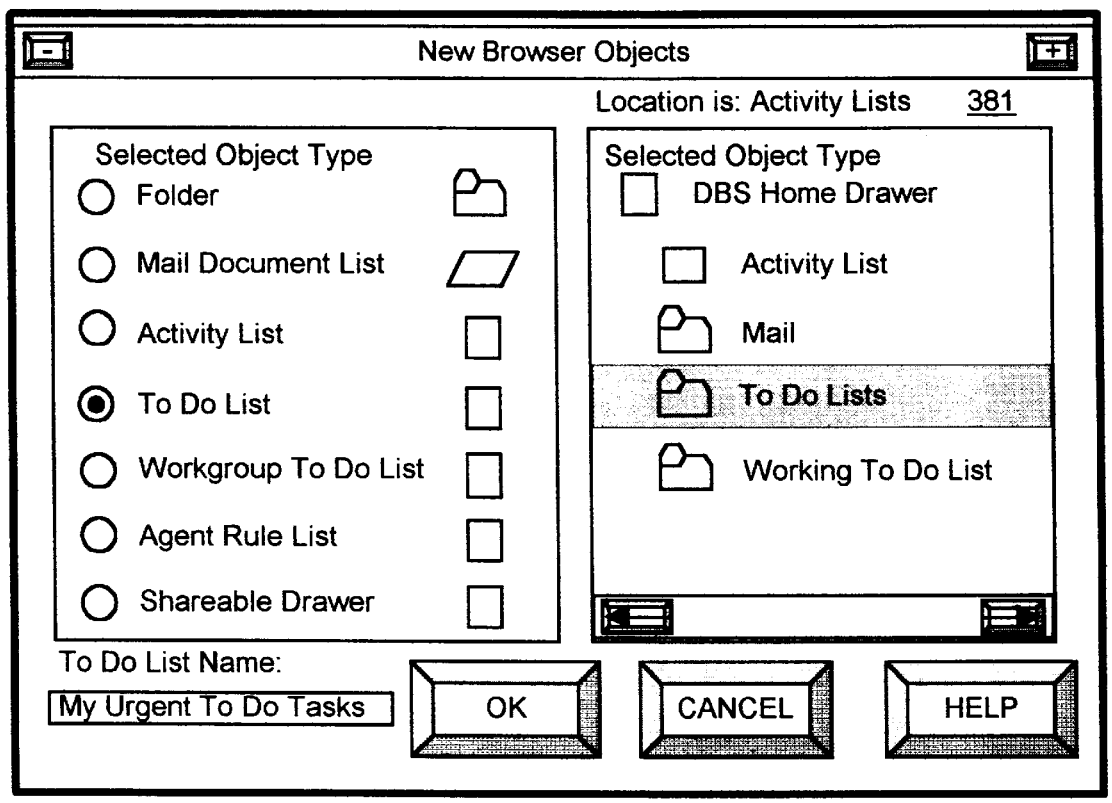
FIG. 16F depicts a computer screen, according to a preferred embodiment of the present invention, displaying the New Browser Objects window where the user may name a To Do List and Select the location for the To Do list.

A user may also create a To Do List for his or her To Do List folder 330 (see FIG. 3) by accessing, in a preferred embodiment, the File mode and choosing the New (Ctrl +N) selection from the File List window 380 (see FIG. 16A). As shown in FIG. 16F, the user then selects the "To Do List" as the object type and enters the new To Do List name (e.g., "My Urgent To Do Tasks") in the bottom left hand corner of the "New Browser Objects" window 381. Finally, the user chooses which drawer (e.g., "DBS Home Drawer") and folder (e.g., "To Do Folder") to put the To Do List. The main application program then sends the user's drawer number (DRAWERNO), the folder number (FOLDERNO) assigned to the To Do List, the description (DESCR) of the list (e.g., the To Do List), and the location of the list (PARENTFOLDERNO) (e.g., the number assigned to the To Do List folder) to a stored procedure. In one embodiment, the name of the stored procedure is FOLDER$insert_1. This stored procedure then stores this information in the WIJ_FOLDERS table 1255 (see FIG. 12) and sends a message to the main application program that the information has been stored.

Figure 16G:
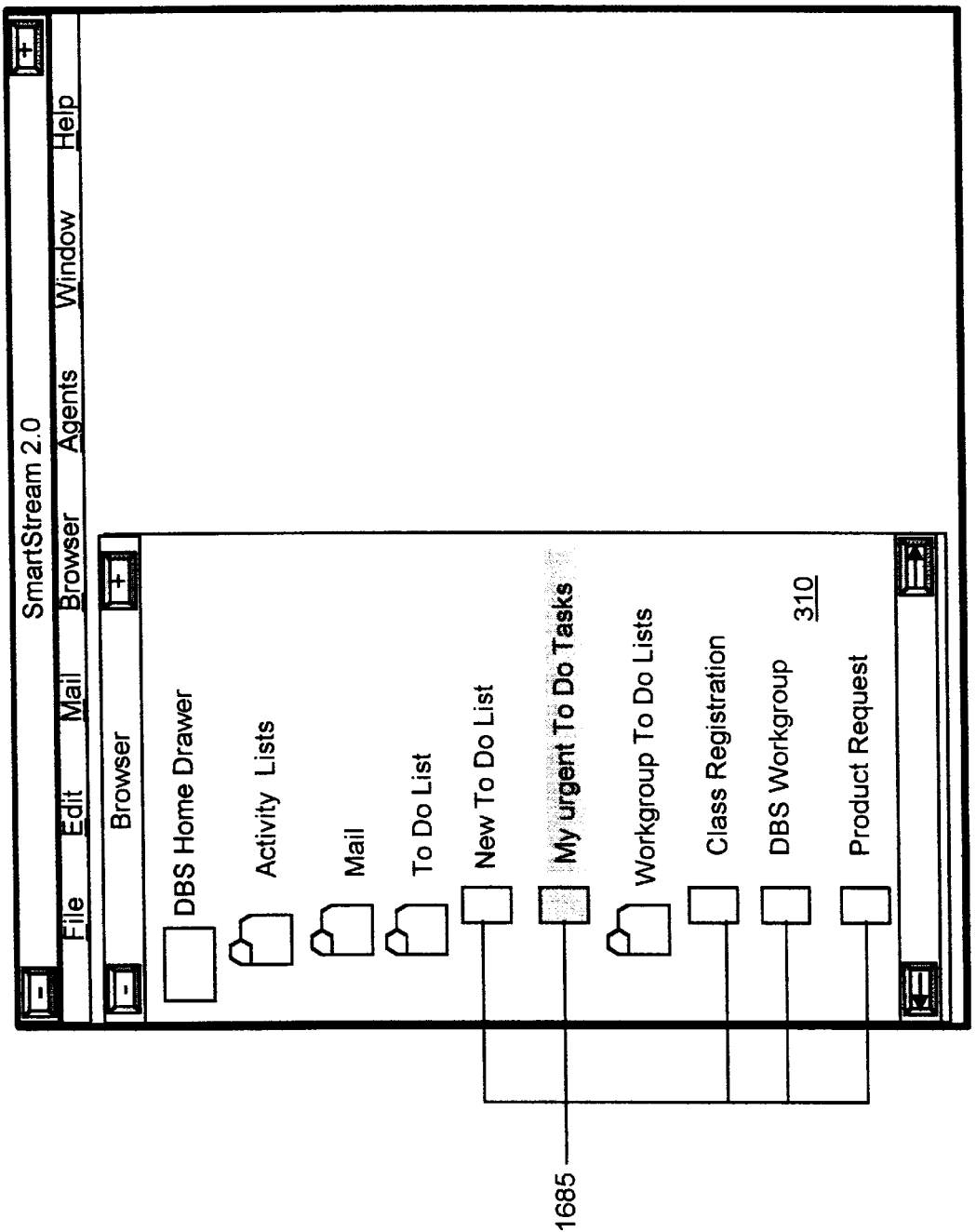
FIG. 16G depicts a computer screen, according to a preferred embodiment of the present invention, displaying the Browser mode which reveals all folders and lists for a user's drawer, where the user may select a To Do List in which to add a next activity category.

Referring to FIG. 16G, the user may move next activities/tasks categories from one To Do List 1685 to another To Do List 1685 by accessing the Browser mode. The user may then select a To Do List 1685 in which to add a next activity/task category. Like the activity lists 1680 (see FIG. 16C), the representations for the To Do Lists are blank when empty and contain horizontal lines when they contain one or more next activities/tasks.

The user moves a next activity/task category from one To Do List 1685 to another To Do List 1685 by selecting a To Do List 1685 which contains one or more next activity/task categories.

Figure 16H:
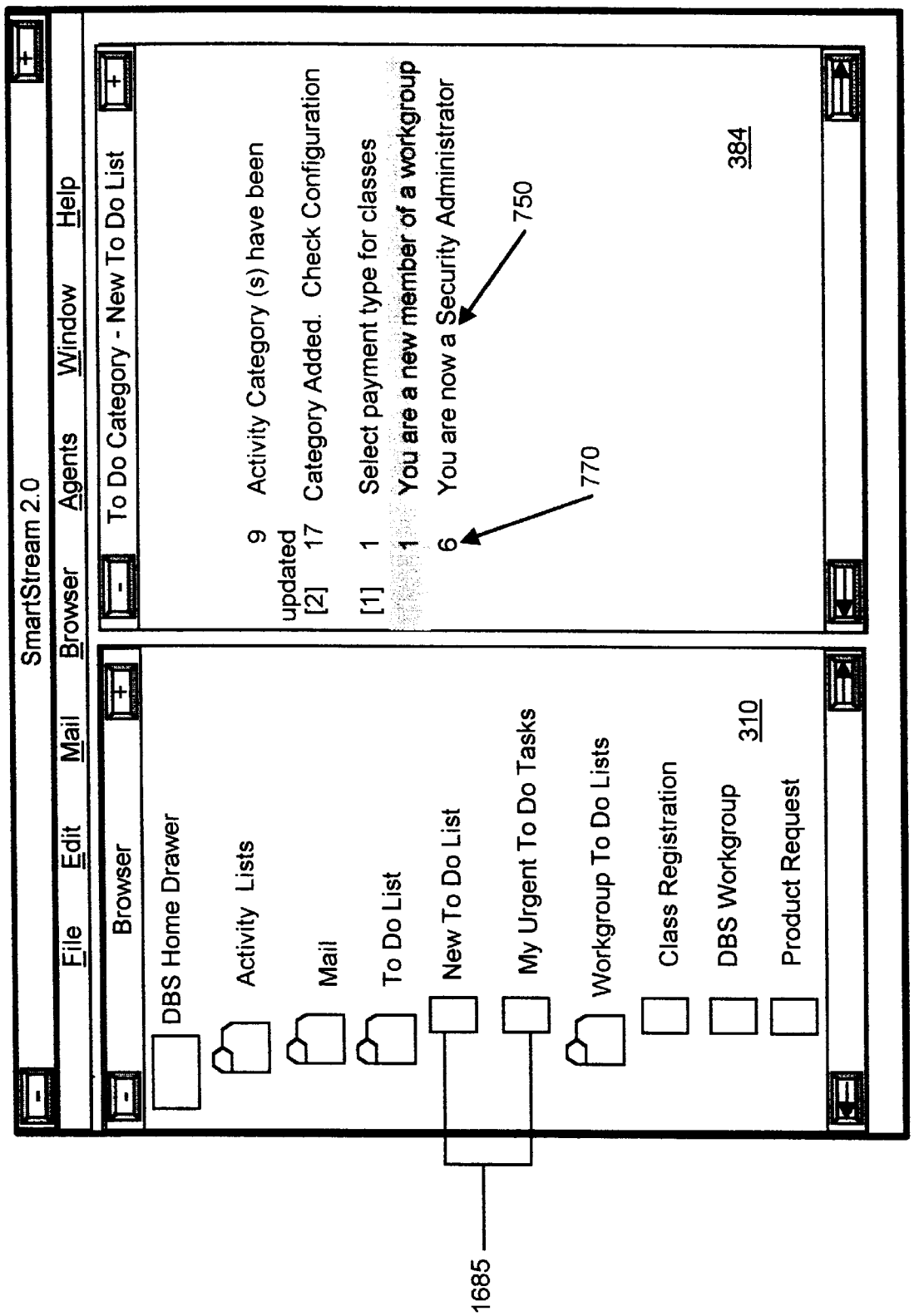
FIG. 16H depicts a computer screen, according to a preferred embodiment of the present invention, displaying a To Do List containing a plurality of next activity categories.

As shown in FIG. 16H, the user selects the "New To Do List" To Do List 1685 from the Browser mode list window 310. The main application program then accesses a stored procedure to determine all next activities/tasks currently stored in the "New To Do List" To Do List 1685. Details on how the main application program and the stored procedure work together to compile the list of currently stored next activities/tasks is described below.

Next, the main application program displays these next activities/tasks organized by the message 750 representative of the next activity/task category in a Summary To Do Category window 384. The user then selects a next activity/task category to move to another To Do List 1685. For this example, the user selects the "You are a new member of a Workgroup" next activity/task category, which contains one uncompleted 770 next activity/task to be moved to another To Do List 1685.

Figure 16I:
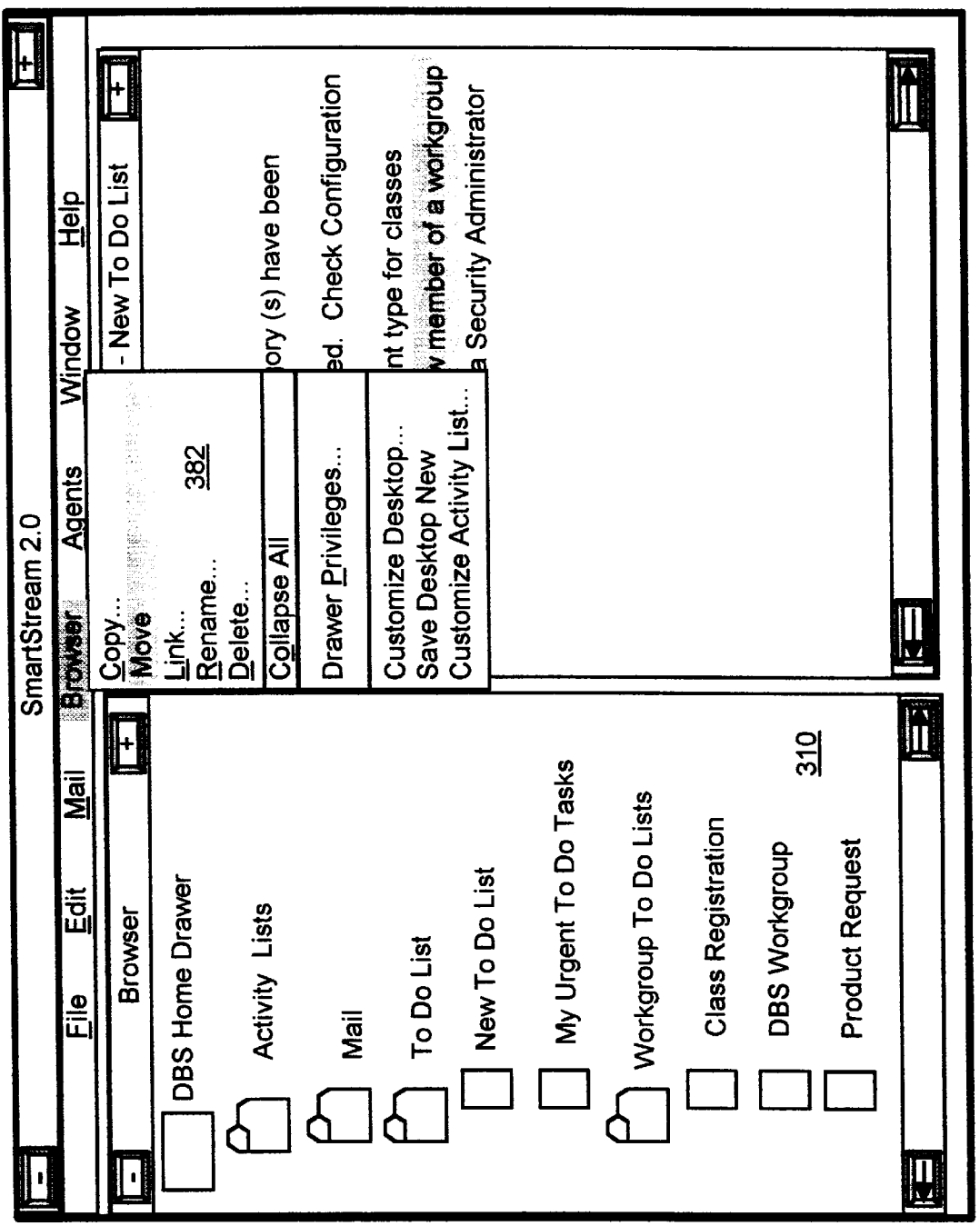
FIG. 16I depicts a computer screen, according to a preferred embodiment of the present invention, displaying the Browser list window, where the user may select the Move command to move a next activity category from the current To Do List to another To Do List.
Figure 16J:
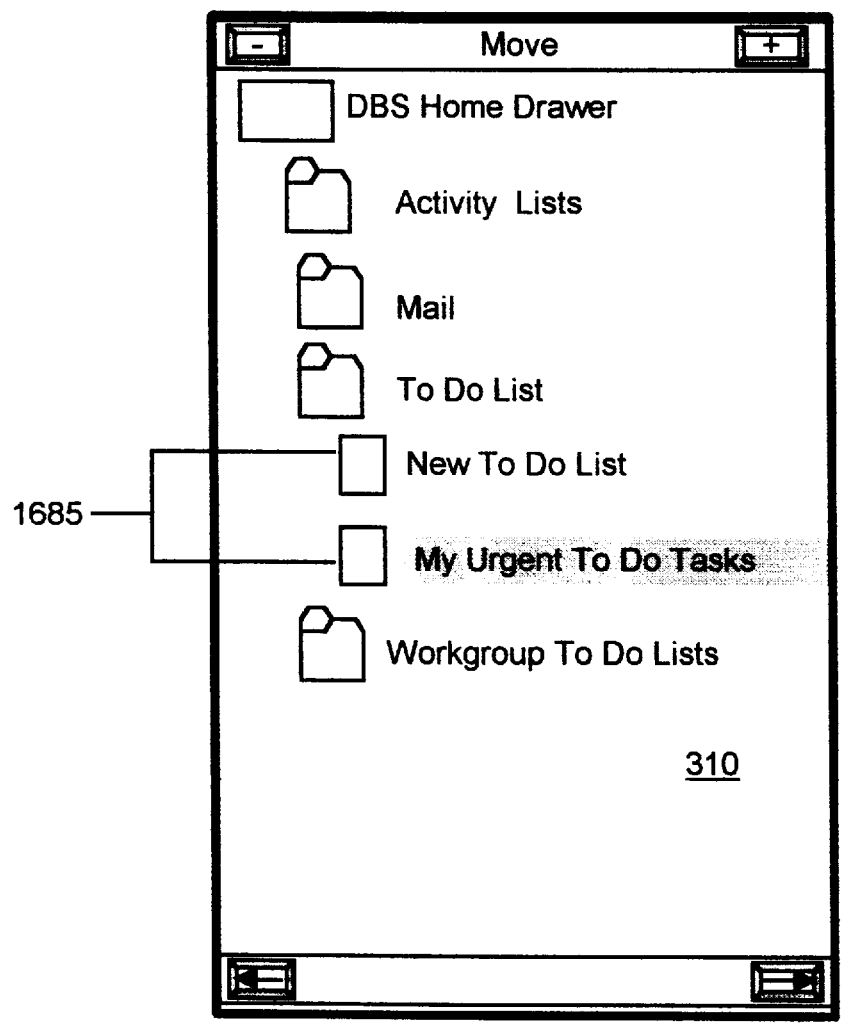
FIG. 16J depicts a computer screen, according to a preferred embodiment of the present invention, displaying the Move mode list window which reveals a list of possible To Do Lists for the user to choose to move a next activity category.
Figure 16K:
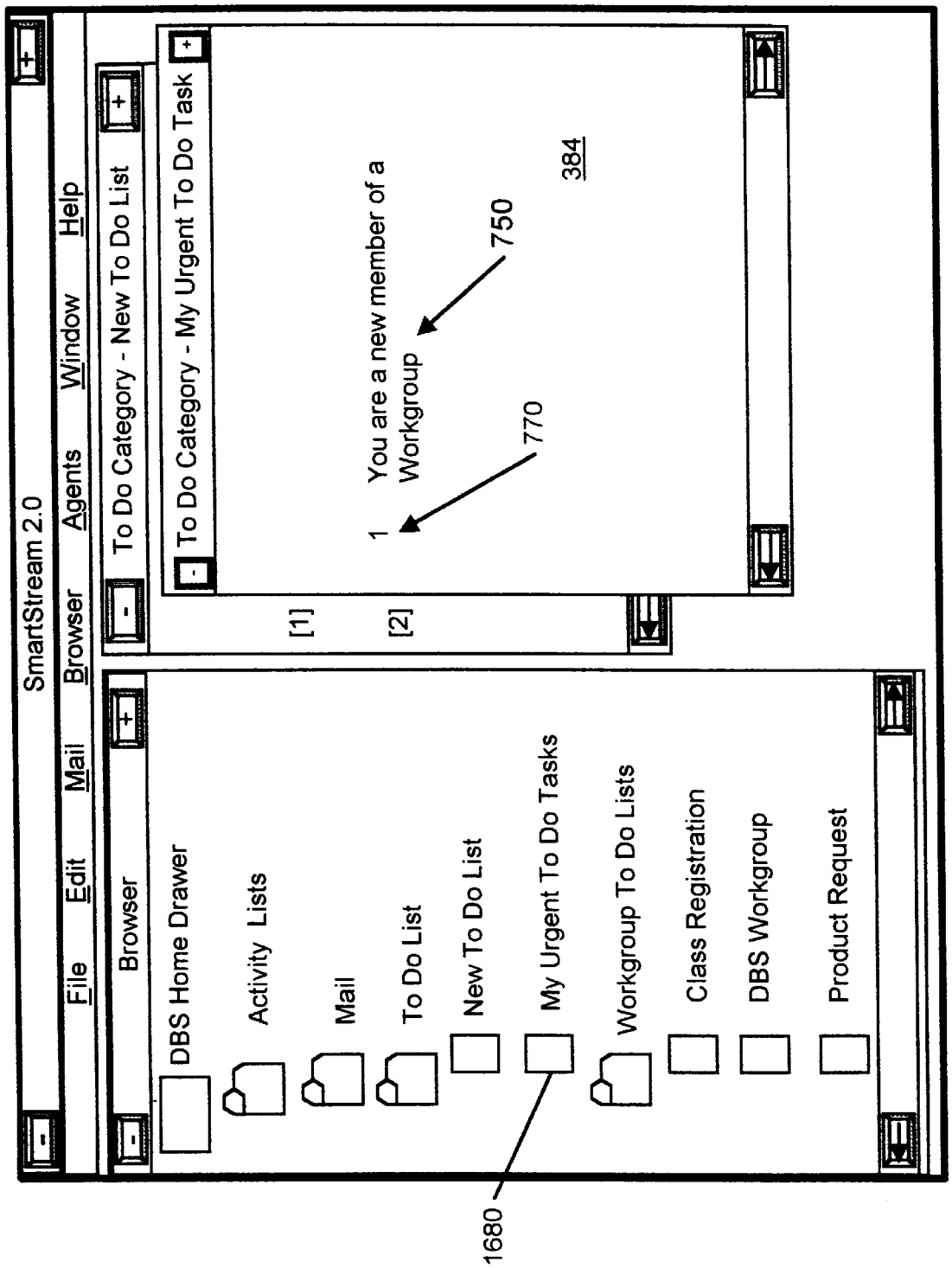
FIG. 16K depicts a computer screen, according to a preferred embodiment of the present invention, displaying a To Do List containing a next activity which has been moved by the user to this To Do List.

Finally, as shown in FIG. 16I, the user selects the Browser list 382 and chooses the Move command from the Browser list 382. As shown in FIG. 16J, the main application program then reveals a list of possible To Do Lists 1685 in the Move mode list window 310 for the user to choose to move the next activity/task category. For this example, the user selects the "My urgent To Do Tasks" To Do List 1685. Therefore, as shown in FIG. 16K, when the user accesses the "My urgent To Do Tasks" To Do List in the Summary To Do List window 384, the "You are a new member of a Workgroup" message 750 next activity/task category with its one uncompleted next activity/task is revealed.

Figure 16L:
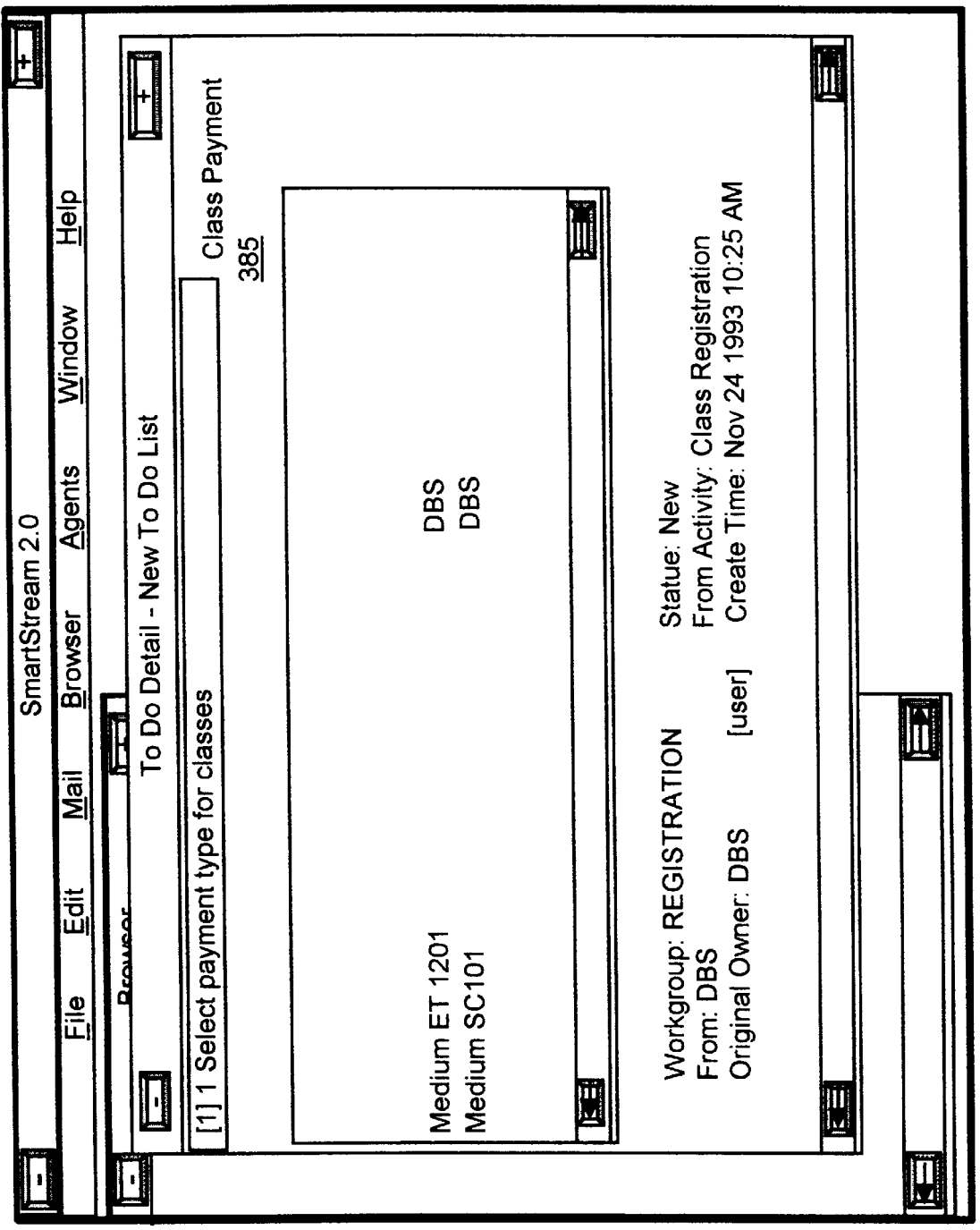
FIG. 16L depicts a computer screen, according to a preferred embodiment of the present invention, displaying a To Do List containing individual next activities, where the user may select to move an individual next activity to another To Do List.

Referring to FIG. 16L, the user may also move individual next activities/tasks from one To Do List 1685 to another To Do List 1685. The user accomplishes this by selecting a To Do List containing next activities/task while in the Browser mode (not shown). The user then accesses the Detail To Do Category window 385 and a list of each individual next activity/task is revealed for a particular next activity/task category within the To Do List.

Figure 16M:
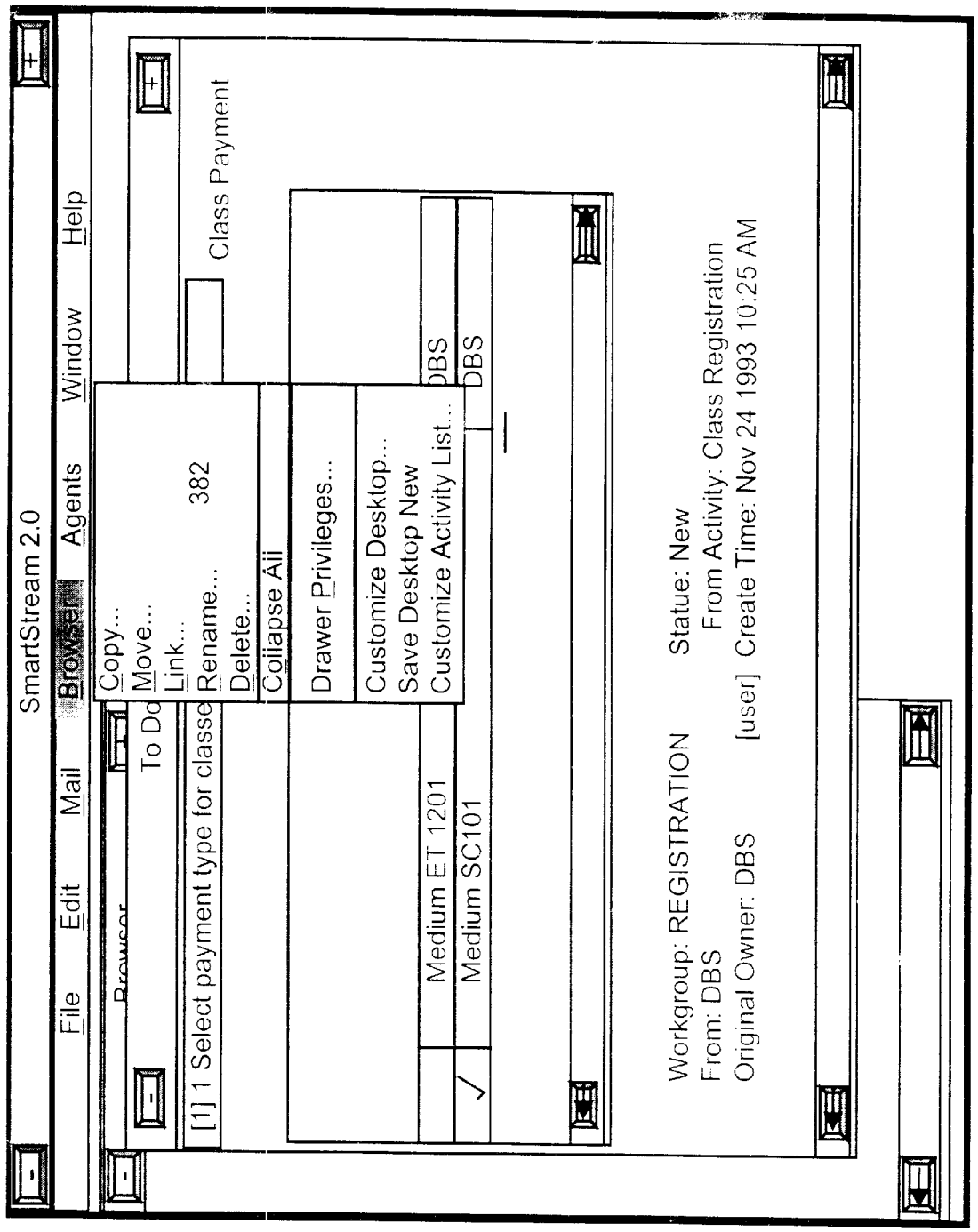
FIG. 16M depicts a computer screen, according to a preferred embodiment of the present invention, displaying the Browser list window, where the user may select the Move command to move an individual next activity from the current To Do List to another To Do List.
Figure 16N:
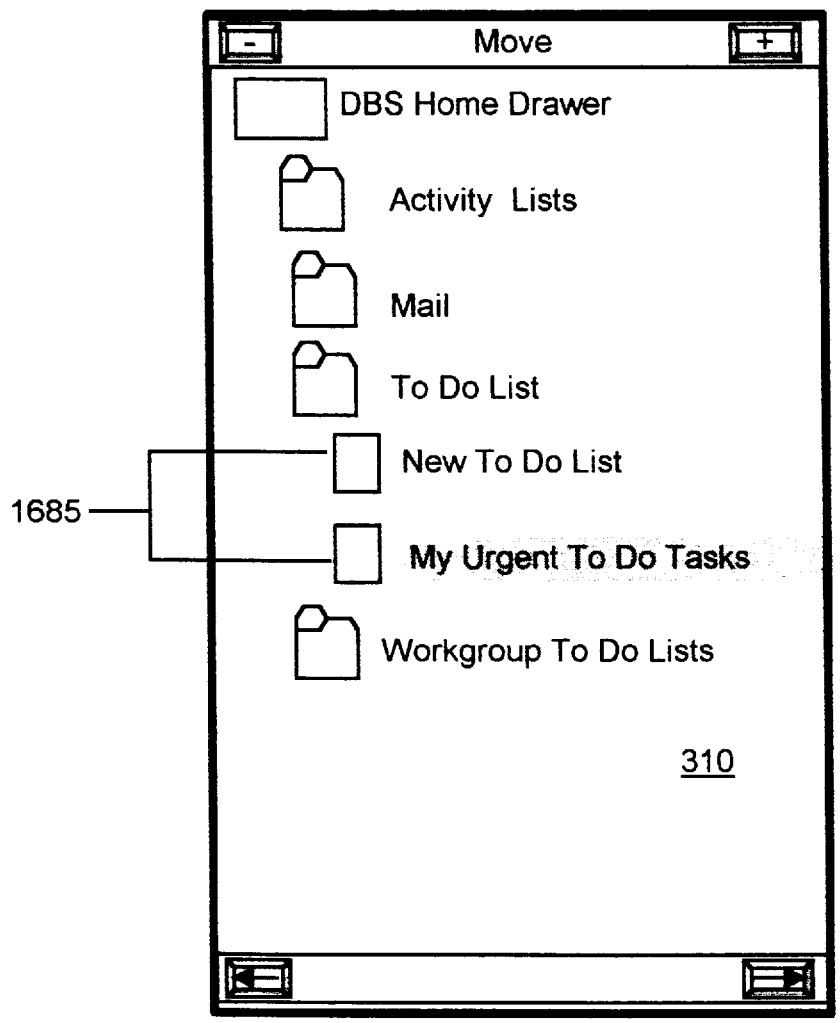
FIG. 16N depicts a computer screen, according to a preferred embodiment of the present invention, displaying the Move mode list window which reveals a list of possible To Do Lists for the user to choose to move an individual next activity.

For this example, the user selects the "New To Do List" To Do List and details on two next activities/tasks are revealed for the "Select payment type for class" next activity/task category. The user then chooses a next activity task which, for this example, is ET201, to move to another To Do List. Next, referring to FIG. 16M, the user selects the Browser list 382 and chooses the Move command from the Browser list 382. As shown in FIG. 16N, the main application program then reveals a list of possible To Do Lists 1685 in the Browser mode list window 310 for the user to choose to move the next activity/task. For this example, the user selects the "My urgent To Do Task" To Do List 1685.

Figure 16O:
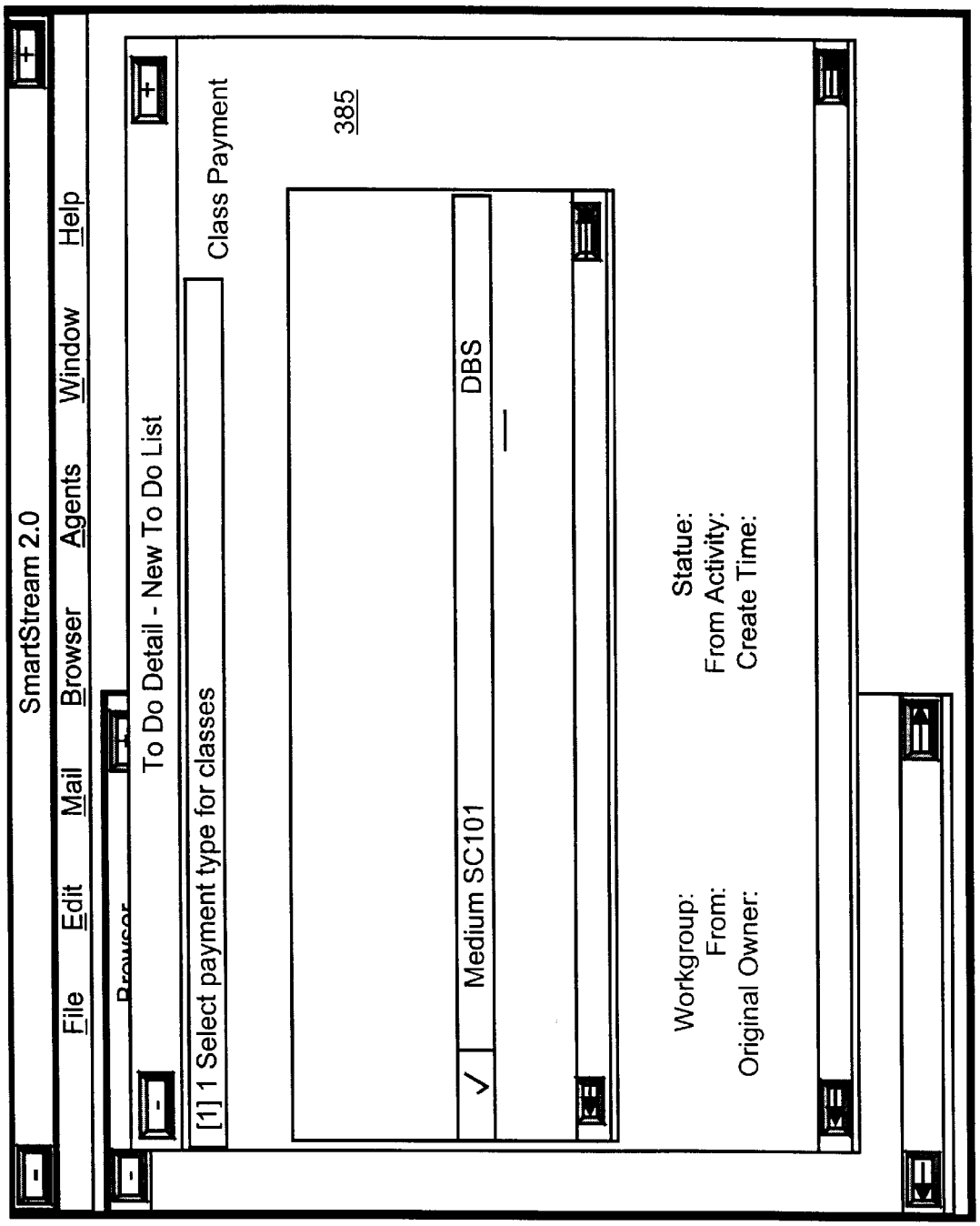
FIG. 16O depicts a computer screen, according to a preferred embodiment of the present invention, displaying a To Do List after an individual next activity has been moved to another To Do List.
Figure 16P:
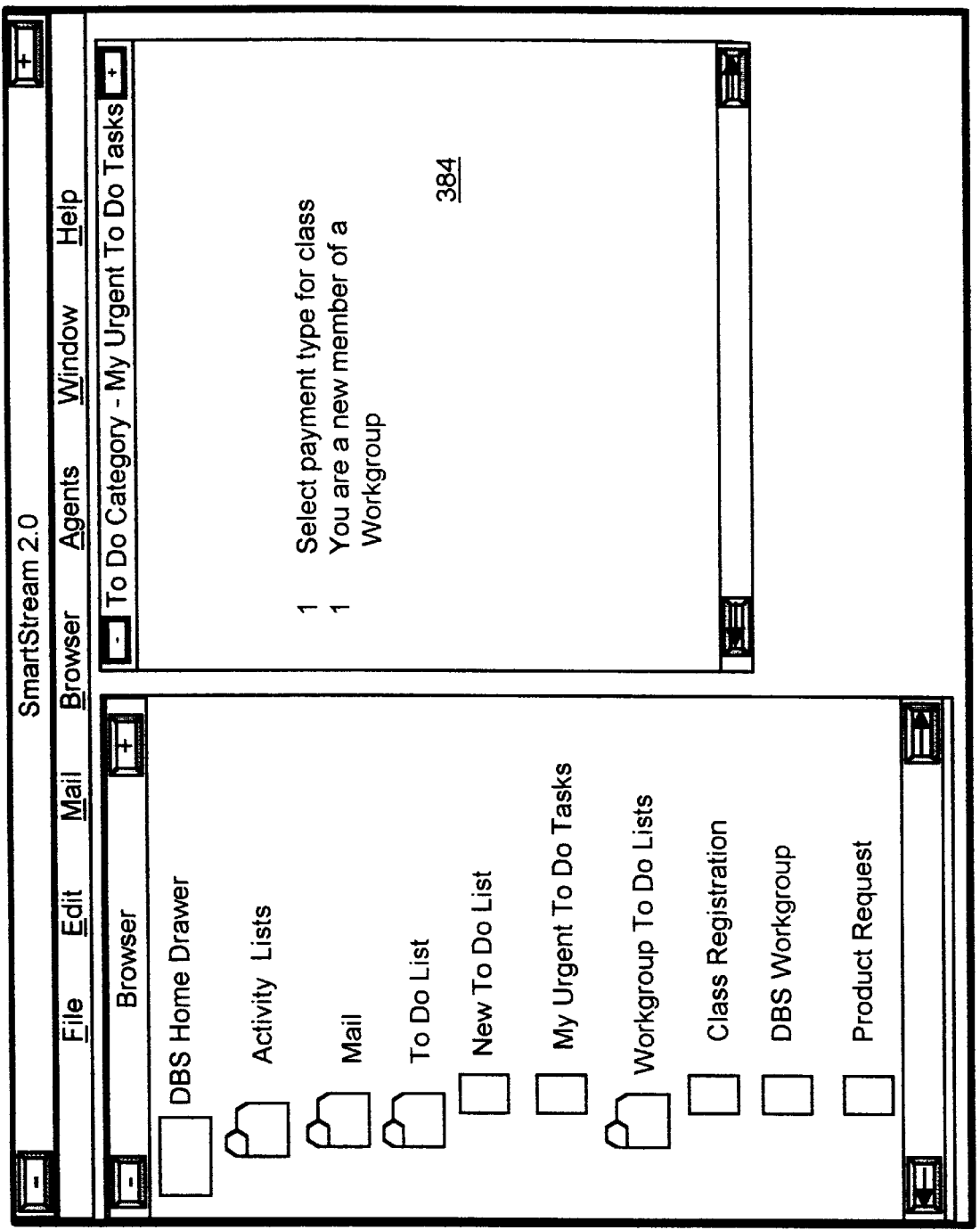
FIG. 16P depicts a computer screen, according to a preferred embodiment of the present invention, displaying a To Do List containing an individual next activity which has been moved to the To Do List from another To Do List.

Therefore, as shown in FIG. 16O, when the user access the "New To Do List" in the Detail To Do Category window 385, the ET201 class payment next activity/task no longer exists. Moreover, as shown in FIG. 16P, when the user accesses the Summary To Do Category window 384 for the "My urgent To Do Tasks," the "Select payment type for class" next activity/task category is revealed. The window 384 discloses that the "Select payment type for class" next activity/task contains one uncompleted next activity/task, which is the class payment for the ET201 class.

In another aspect of the invention, the user may create a customized folder in which to store activity lists. For example, a user may create a Class Registration folder for storing different lists of activities pertaining to registering for classes. The user accesses the File mode and chooses the New (Ctrl+N) selection from the File list window 380 (see FIG. 16A). The "New Browser Objects" window is then displayed. (see FIG. 16B). The user then selects the "Folder" as the new object type and enters the new folder name in the bottom left hand corner of the window. Finally, the user chooses the drawer in which to put the folder.

The following is an illustrative example of how the application programs at the client side and the stored procedures and tables at the server side interact to facilitate the flow of information in a work flow environment. For this example, a user registers for two classes.

In order to register for the classes, the user logs onto the system. In a preferred embodiment, after the user logs on, he or she selects the Browser mode from a list of possible modes displayed across the screen (not shown). Upon selecting the Browser mode, the main application program sends the user's USER_ID to a stored procedure at the server. The stored procedure then accesses the WIJ_DRAWERS table 1245 (see FIG. 12) to obtain information on the drawer number (DRAWERNO) and the description (DESCR) of the user's drawer.

The stored procedure then accesses the WIJ_FOLDERS table 1255 (see FIG. 12) to obtain information on all folders and lists, which are stored as folder numbers (FOLDERNOs), associated with the DRAWERNO. This information includes a description (DESCR) of the folder or list; a list indicator (CONTAINSIND), which reveals whether the FOLDERNO corresponds to a folder, an Activity List, a To Do List or some other list used in the system; and priority information (PARENTFOLDERNO), which is used to determine which folder each activity list and To Do List belongs in.

Figure 17A:
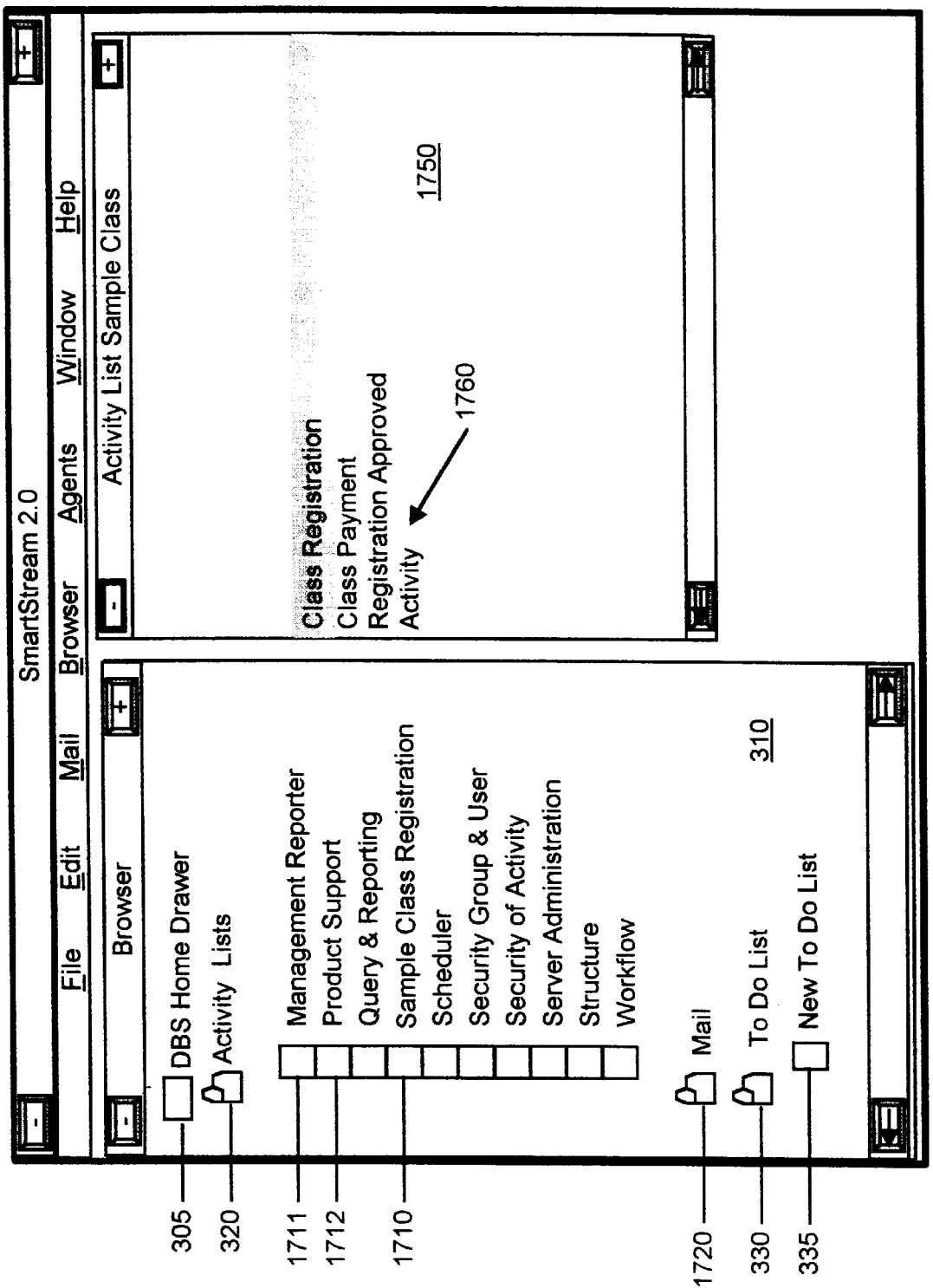
FIG. 17A depicts a computer screen, according to a preferred embodiment of the present invention, displaying the Browser mode which reveals all folders and lists for a user's drawer, where a user may select to access a list, where the Sample Class Registration list has been selected and revealed, and where the Class Registration activity has been selected.

The main application program, as shown in FIG. 16C, uses the information sent to it by the stored procedure to display the folders 1670 and lists 1680 for the user's drawer 305 in the Browser mode list window 310. As shown in FIG. 17A, to illustrate, the user's drawer 305 is described as DBS Home Drawer in the Browser mode list window 310. Moreover, the user's Drawer 305 contains an Activity Lists folder 320, a To Do Lists folder 330 and a Mail folder 1720. The Activity Lists folder 320 contains a "Sample Class Registration" list 1710, as well as other lists such as a "Management Reporter" list 1711 and a "Product Support" list 1712. The To Do Lists folder 330, for this example, contains only the user's personalized To Do List, referred to as the "New To Do List" 335.

For this example, to register for classes, the user selects the "Sample Class Registration" list 1710 and, in response, the system displays the user's customized "Sample Class Registration" list window 1750, with pre-selected activities.

The computer system of the present invention obtains the activities for the customized activity list window 1750 (e.g., "Sample Class Registration" list window) by having the main application program send the USER_ID and FOLDERNO for the activity list selected by the user to the stored procedure at the server. In one embodiment, the name of the stored procedure is psp_sel_user_cando_list_1. This stored procedure then accesses the USER_ACT_LIST table 1135 (see FIG. 11) to obtain each activity, via its ACTIVITY_ID, that is associated with the USER_ID and FOLDERNO, as well as any SEQ_NBR information pertaining to the prioritizing of these activities set up by the user for displaying each activity in the activity list window 1750. The stored procedure also accesses the ACTIVITY_MASTER table 1210 (see FIG. 12) to obtain information on the type of activity (ACTIVITY_TYPE) (e.g., a PowerBuilder type window or an executable file type) and the command line (EXEC_NAME) for the activity window application program (e.g., Class Registration activity window) or executable application program which is used to execute the activity. The stored procedure then returns this information to the main application program so that the activity list window 1750 may be displayed with the activities listed in sequence specific or alphabetical order where no sequence specific information for an activity is indicated.

For this example, the user has selected the Class Registration, Class Payment, Registration Approval, and Activity activities 1760 for his or her "Sample Class Registration" list 1750. Moreover, the user has chosen to sequentially list the activities such that the Class Registration Activity has the highest SEQ_NBR, with Class Payment and Registration Approval having lower SEQ_NBRs and Activity having the lowest or no SEQ_NBR.

From the "Sample Class Registration" list window 1750, the user then selects the Class Registration activity from the list of activities in order to register for a class. As shown in FIG. 17B, the main application program then calls the activity window application program represented by its EXEC_NAME by issuing an "open" command (a PowerBuilder command). The main application program then reveals the Class Registration activity in a Class Registration activity window 1700. If the user had selected to run an executable file, then the main application program would have called the executable file represented under its EXEC_NAME by sending it a "run" command (a PowerBuilder command).

The computer system reveals the activity window 1700 by having the main application program access a Class Registration application program responsible for the Class Registration activity. The Class Registration application program contains information on the structure of the window and the headings 420 (e.g., Student, Class, Class Description, and Credit Status for the Class Registration activity). The Class Registration application program then executes a stored procedure. In one embodiment, the name of the stored procedure is psp_sel_sam1_1.

The server then requests this stored procedure to send it back information on available classes for the user. The stored procedure then accesses the SAMPLE_CLASS table 1360 (See FIG. 13) to obtain information on each class (CLASS) and a description (DESCRIPTION) of the class. The stored procedure then sends this information, also referred to as values, back to the Class Registration application program.

After the Class Registration application program receives the headings 420 and their associated values 430, this information is displayed in the Class Registration activity window 1700. For this example, one class at a time is listed as a value 430 next to the Class heading 420 with the corresponding information for the class filling portions of the rest of the activity window 1700. The user may then scroll (e.g. with the arrow keys on the keyboard) through all possible classes that the user has access to register.

After the user has selected a class in which to register (e.g., ET201—Ethics in the Workplace) along with the credit status (e.g., graduate), the user saves the information. The user may save the information by clicking over the "save file" icon, represented as a floppy disk (not shown), with the mouse or simply pressing the Control and S keys simultaneously on the keyboard.

Figure 17C:
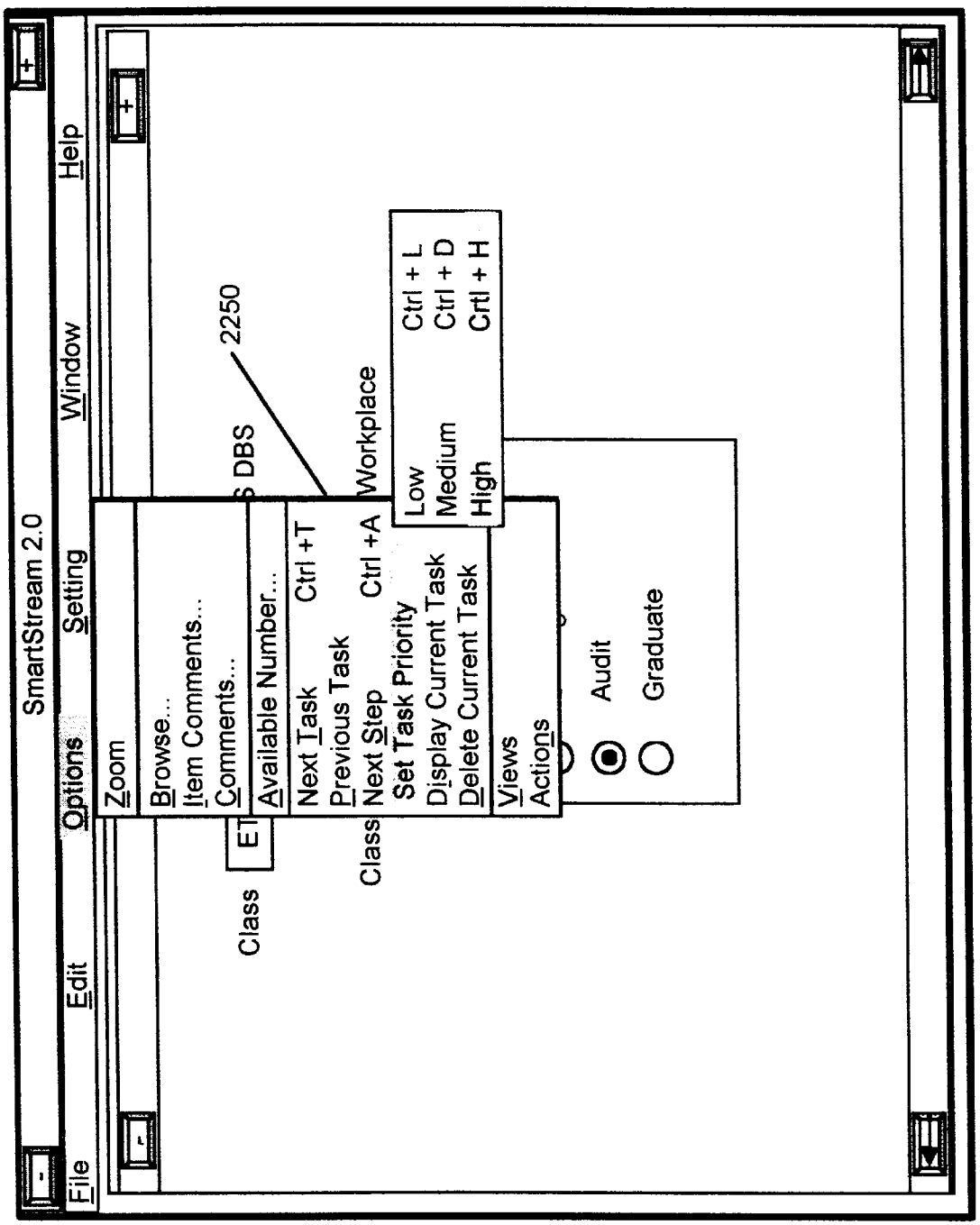
FIG. 17C depicts a computer screen, according to a preferred embodiment of the present invention, displaying the Set Task Priority option in the Options mode, where the user creating a task may set the priority of the task as low, medium or high.
Figure 17D:
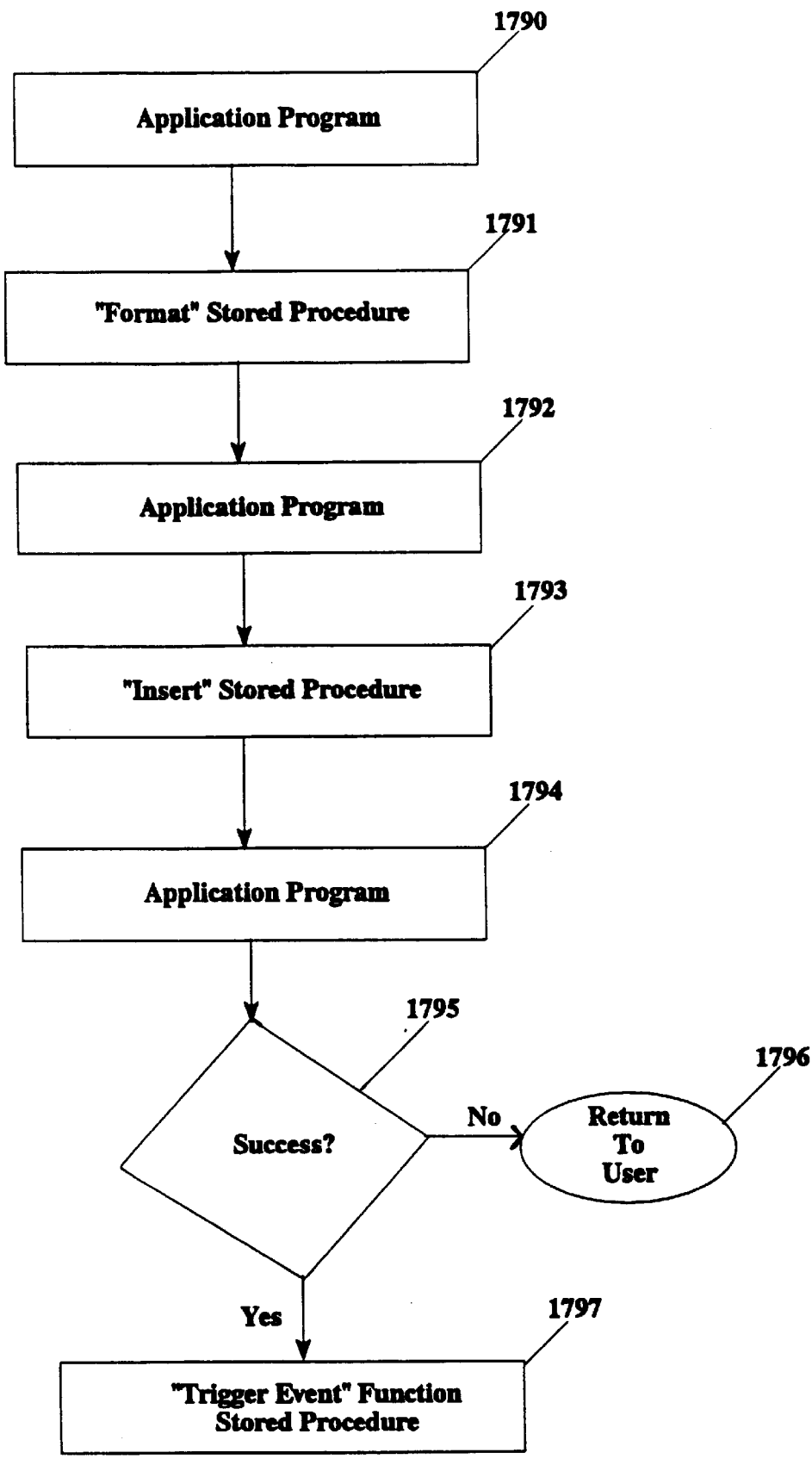
FIG. 17D depicts a flow diagram of a preferred embodiment for saving information in connection with an activity, determining the event associated with the activity, and accessing the Trigger Event function stored procedure.

The Class Registration application program saves the Class Registration activity information (e.g., ET201 for class and graduate for credit status) in the following fashion. As shown in FIG. 17D, at step 1790, the Class Registration application program (written in PowerBuilder) calls a stored procedure, at step 1791, to format the information for certain columns in the associated table at the server. For this example, the information is formatted for the class, student, and credit columns in the SAMPLE_REG table 1365 (see FIG. 13). At step 1792, the formatted information is returned to the Class Registration application program, which, at step 1793, then sends the formatted information to a stored procedure at the server. In one embodiment, the name of this stored procedure is psp_ins_sam2_1. This stored procedure then stores each piece of information (each value) in its corresponding class, student and credit column in the SAMPLE_REG table 1365. Finally, at step 1794, the stored procedure returns a message to the Class Registration application program that indicates that the information has been saved.

At step 1795, the Class Registration application program then determines whether the information was successfully saved. If not, the application program proceeds to step 1796 and returns control to the user. However, if the information was saved successfully, then the Class Registration application program determines which event to trigger. For this example, possible events associated with the Class Registration activity are "Add Class" and "Change Class". To illustrate, the user has added a new class. Therefore, the "Add Class" event is selected, along with the corresponding stored procedure for this event. In one embodiment, the name of the "Add Class" stored procedure is pamsam2ins. At step 1797, the Class Registration application program then executes the Trigger Event function stored procedure to determine the next activities/tasks and users/workgroups responsible for completing the next activities/tasks associated with the Class Registration activity. In one embodiment, the name of the Trigger Event stored procedure is called pam0011_trig_am_event. In executing the Trigger Event stored procedure, the Class Registration application program sends information to the Trigger Event stored procedure at the server.

The information sent to the Trigger Event stored procedure includes an event identifier (EVENT_ID) for the corresponding stored procedure (e.g., pamsam2ins), the entity value (NEXT_STEP_ENT_VAL) (e.g., plant, site, organization, etc.) responsible for performing the next activity/task, the USER_ID for the user who completed the activity, the ACTIVITY_ID for the activity just completed (e.g., Class Registration), and the priority of the subsequent next activity/task (MSG_PRIORITY) set by the user who has just completed the activity. As shown in FIG. 17C, the user who just completed the activity may set the priority of the subsequent next activity/task by selecting the Set Task Priority option in the Options Mode. Other information may include whether a user or a work group (OWNER_TYPE) is responsible for the next activity/task and the identification for the user or work-group (USER_ID or MSG GROUP_ID).

Figure 18:
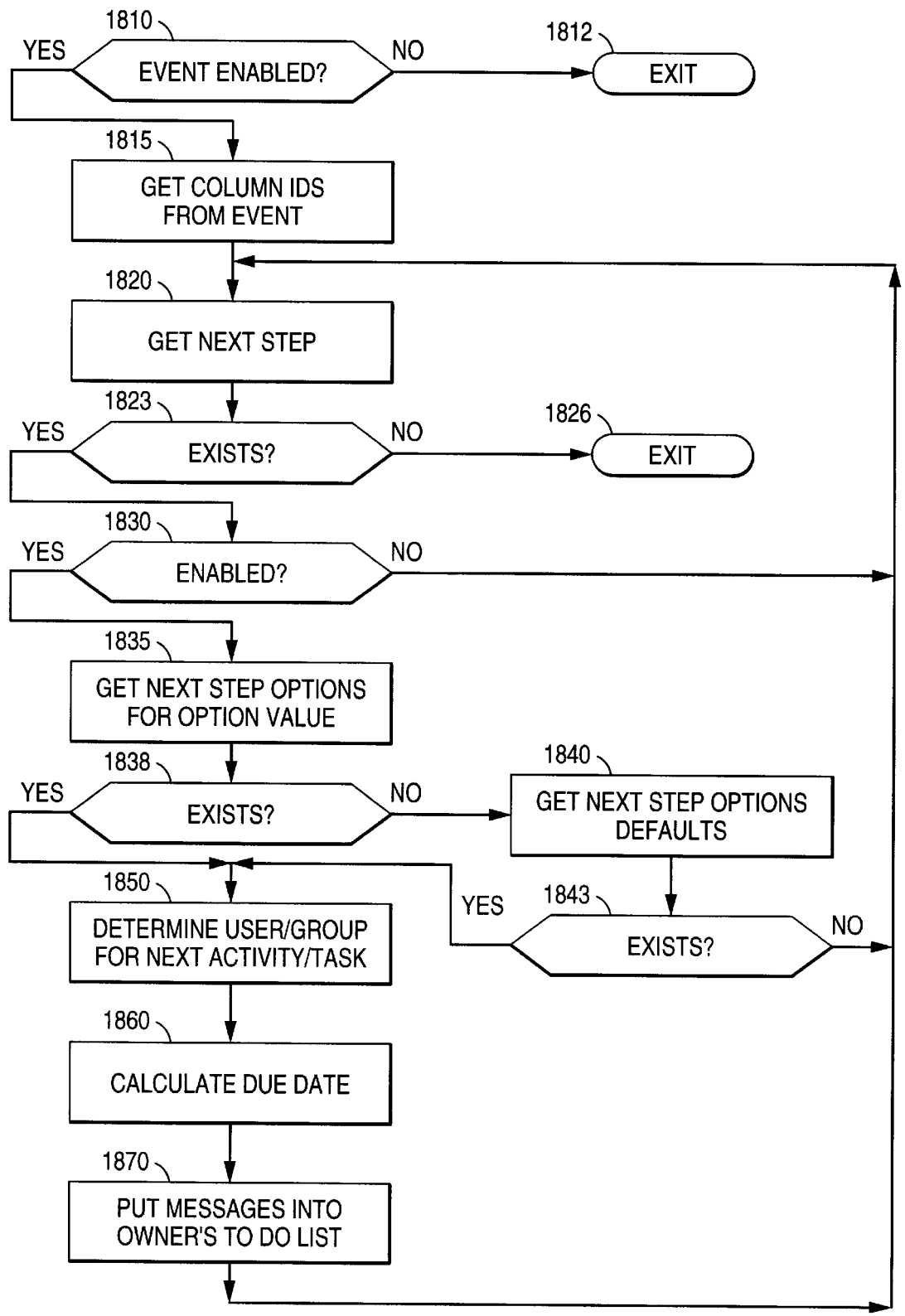
FIG. 18 depicts a flow diagram of a preferred embodiment of the Trigger Event function stored procedure which determines the next steps for the flow of information process, in particular next activity(s) and user(s) responsible for performing the next activity(s).

Referring to FIG. 18, a flow diagram is provided, for a preferred embodiment of the Trigger Event function stored procedure. This flow chart illustrates a process for determining the next activity/task(s), user/work group responsible for performing the next activity/task(s), and the like, and creating the next activity/task(s).

First, at step 1810, the Trigger Event function stored procedure determines whether the event (e.g., pamsam2ins for the "Add Class" event) is enabled. This is accomplished by accessing the EVENT_MASTER table 1220 (see FIG. 12) to determine if the ENABLED column for the EVENT_ID (e.g., pamsam2ins) contains a one or a zero. In a preferred embodiment, if the ENABLED column contains a zero, then the event is disabled, the Trigger Event function stored procedure is exited at step 1812, and control is returned to the Class Registration application program.

However, if the ENABLED column contains a one, then the event is enabled and the Trigger Event function stored procedure proceeds to step 1815. At step 1815, column identifiers (COL_Ids) are obtained from the EVENT_MASTER table 1220 for the corresponding EVENT_ID. Thus, the Trigger Event function stored procedure is able to determine which COL_Ids for the given event will be used to pass the values pertaining to the event. For this example, possible COL_Ids for the pamsam2ins EVENT_ID could be 1060 for COL_ID_1 representative of the Class heading, 1061 for COL_ID_2 representative of the Student heading, and 1062 for COL_ID_3 representative of the Credit heading.

The Trigger Event function stored procedure then proceeds to step 1820 to obtain the first of all possible next steps which are associated with the event. In doing so, at step 1823, the Trigger Event function stored procedure accesses the Next Step table 1225 (see FIG. 12) to determine if any next steps exists for the EVENT_ID. This is accomplished by determining if any rows (records) exists for the particular EVENT_ID in the Next Step table 1225. If there are no rows for the EVENT_ID in the Next Step table 1225, then the Trigger Event function stored procedure is exited at step 1826.

However, if rows for the EVENT_ID do exist in the Next Step table 1225, then, at step 1830, the Trigger Event function stored procedure determines whether the first row, which represents a particular next activity/task (ACTIVITY_ID), is enabled (ENABLED). If the ENABLED column is disabled (e.g., zero), then the Trigger Event function stored procedure returns to step 1820 to obtain the next step, if there are any. This loop continues until an enabled next step for a next activity/task corresponding to the EVENT_ID is encountered. If there are no rows enabled for the EVENT_ID, then, after the last one is encountered, the Trigger Event stored procedure will return to the Class Registration application program.

On the other hand, if a first row encountered for an EVENT_ID is enabled (e.g., one), then the Trigger Event function stored procedure obtains the message identifier (MSG_ID) representing the next activity/task category and the next activity/task identifier (ACTIVITY_ID) and proceeds to step 1835. At step 1835, the Trigger Event function stored procedure accesses the Next Step Options table 1230 (see FIG. 12) for the entity (NEXT_STEP_ENT_VAL) responsible for the next activity/task, and the stored procedure proceeds to step 1838

At step 1838, if rows exist for the NEXT_STEP_ENT_VAL, then the Trigger Event stored procedure proceeds to step 1850. However, if no rows exists for the NEXT_STEP_ENT_VAL, then the Trigger Event stored procedure proceeds to step 1840 to obtain any default values sent from the Class Registration application program which define the entity responsible for the next activity/task. This information is stored in the Next Step Options table 1230 in the NEXT_STEP_ENT_VAL column (see FIG. 12). In one embodiment, specific entities may be delineated with an identifier or an asterisk (*) may be used to indicate that every user (enterprise wide) may have access to the next activity/task. The Trigger Event function stored procedure then proceeds to step 1843 to determine if any default values are available. If no default values are available, then the Trigger Event function stored procedure returns to step 1820 to determine if there are any other next steps to be evaluated and acted upon as described above. However, at step 1843, if default values do exist, then the Trigger Event stored procedure proceeds to step 1850.

At step 1850, the Trigger Event stored procedure accesses the Next Step Options table 1230 to determine the user (USER_ID) or work group (MSG_GROUP_ID) responsible for the next activity/task. In doing so, it checks the IGNORE_OVERRIDE column for the row to determine whether the USER_ID or MSG_GROUP_ID values should be used. If the IGNORE_OVERRIDE is enabled, then the values identified in the column are used. However, if the IGNORE_OVERRIDE is disabled, then the values sent from the Class Registration application program are used. On the other hand, if the Class Registration application program did not send any values, then the values from the Next Step Options table 1230 are used. Next, the Trigger Event function stored procedure proceeds to step 1860 to calculate the date and time the information for the new next activity/task is created.

Finally, the Trigger Event stored procedure proceeds to step 1870 where information pertaining to the next activity/task is added to the MESSAGE_QUEUE table 1140 (see FIG. 11) by creating a row for the next activity/task. The information in the row may then be used later for the responsible user's or work group's To Do List. This information includes the OWNER_ID which is the USER_ID; MSG_GROUP_ID (for a work group) or override value; the OWNER_TYPE, which indicates whether the OWNER_ID belongs to a user or a work group; the ACTIVITY_ID for the next activity/task; the MSG_ID pertaining to the next activity/task category; and CREATE_TIME, which indicates the date and time the next activity/task was created.

Other information that may be stored in the new next activity/task row includes the MSG_SEQ_NBR, which indicates the priority associated with the message representative of the new activity/task category, where the priority is assigned to the next activity/task category by the user or work group to perform the next activity/task in the Detail To Do Category window (see FIG. 16L); the FOLDERNO, which indicates the user's or work group users'list associated with the next activity/task; and the NEXT_STEP_ENT_VAL, which indicates the plant, site, organization or the like ultimately responsible for the next activity/task.

Finally, particular information relating to the class in which the user has registered is stored in a COL_VAL associated with a specific COL_ID. For example, COL_ID_1 which is 1060 and represents the Class heading correlates with COL_VAL_1 which stores the class value, ET201; COL_ID_2 which is 1061 and represents the student heading correlates with COL_VAL_2 which stores the student value, DBS; and COL_ID_3 which is 1062 and represents the credit heading correlates with COL_VAL_3 which stores the credit value, graduate.

After the Trigger Event stored procedure has completed step 1870 by adding the pertinent information to the new next activity/task row of the MESSAGE_QUEUE table 1140, then the stored procedure returns to step 1820 to determine if there are any other next steps to be evaluated and acted upon as described above. After the Trigger Event stored procedure has acted upon all the next steps, as described above, the stored procedure proceeds from step 1820 to step 1826. At step 1826, the Trigger Event stored procedure is exited and control is returned to the Class Registration application program.

Figure 19:
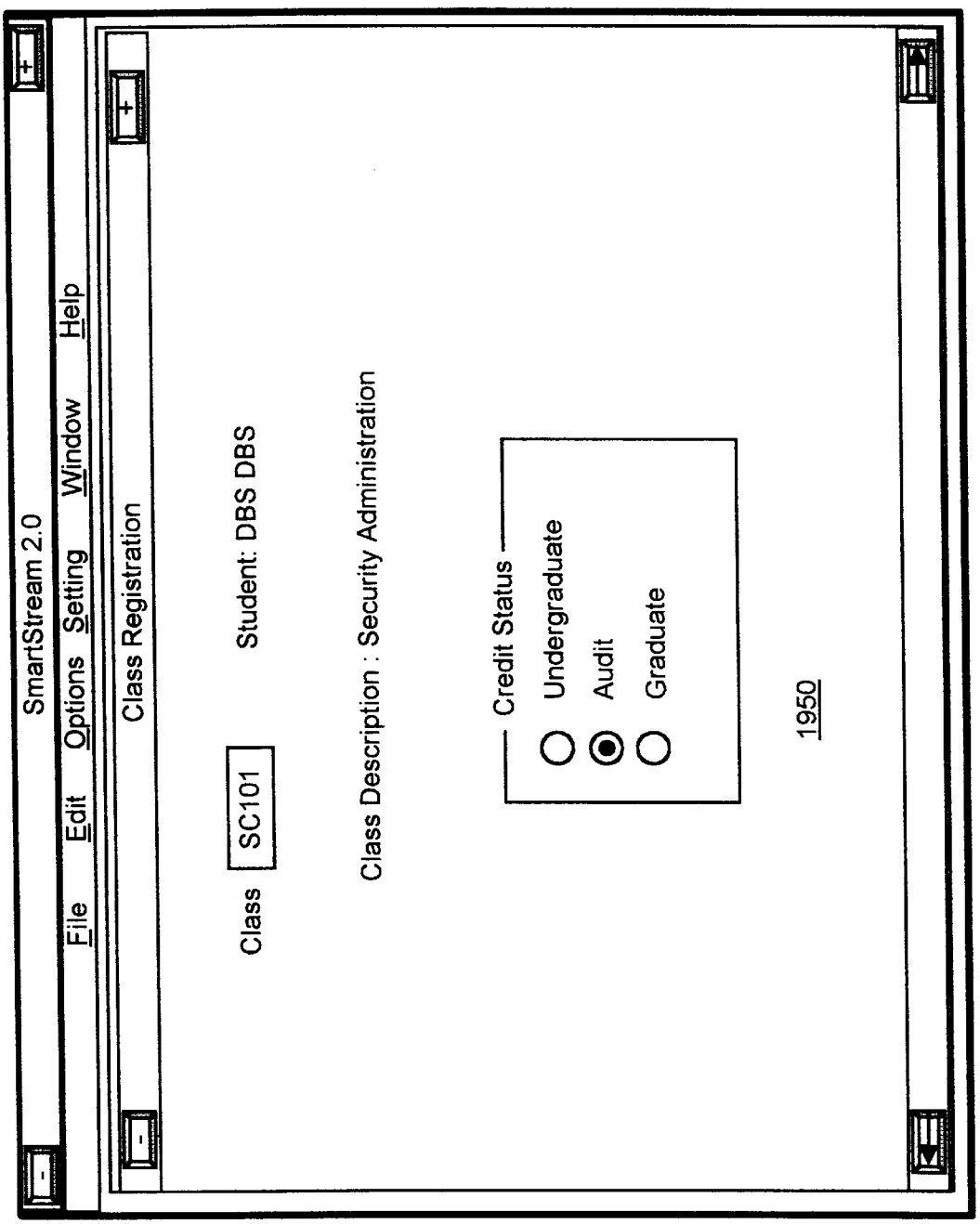
FIG. 19 depicts a computer screen, according to a preferred embodiment of the present invention, displaying an illustrative example of a second Class Registration activity window.

The Class Registration application program then displays a blank Class Registration activity window (not shown) and waits for the user to either register for another class or exit the Class Registration activity. For this example, as shown in FIG. 19, the user registers for a second class, SC101 (Security Administration) with an audit credit status. Therefore, the user executes the save command to save the class. Next, the procedure described above is repeated as the Class Registration application program formats the information entered by the user, and sends this information to be saved by the stored procedure. In one embodiment, the name of the stored procedures is psp_ins_sam1_1. After the information has been stored, the Class Registration application program determines which event to trigger and triggers the event, via the Trigger Event stored procedure, to determine the next activities/tasks and users/work groups responsible for completing the next activities/tasks.

Figure 20:
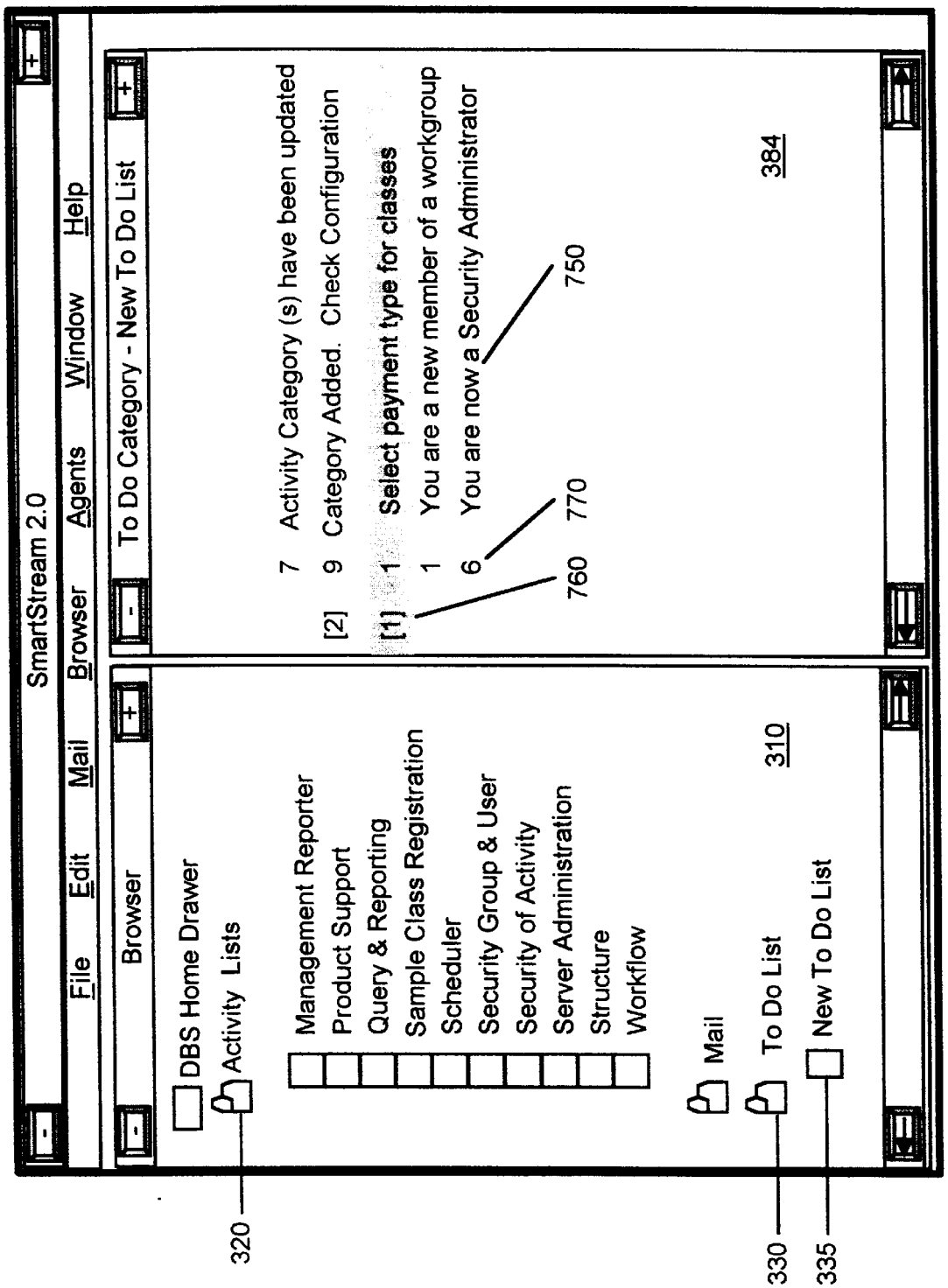
FIG. 20 depicts a computer screen, according to a preferred embodiment of the present invention, displaying the Browser mode list window where the user may access a To Do List, where the "New To Do List" To Do List has been accessed, and where a list of next activity categories for the To Do List is revealed in the Summary To Do Category window.

After the Class Registration application program receives a message from the Trigger Event stored procedure that all next activities/tasks have been added to user's/work group's To Do List, the Class Registration application program again waits for the user to either register for another class or exit the Class Registration activity. For this example, as shown in FIG. 20, the user decides to leave the Class Registration activity window and return to the Browser mode list window 310. In a preferred embodiment, the user may press the F11 key to return the user to the Browser mode list window 310.

From the Browser mode list window 310, the user may then decide whether to access another list in the Activity List Folder 320 to begin another activity or to access the user's personalized To Do List ("New To Do List") 335 in the To Do Lists folder 330. In this example, the user selects the "New To Do List" 335, and a list of next activities/tasks is displayed in the Summary To Do Category window 384.

The computer system obtains the next activities/tasks for the Summary To Do Category window 384 (e.g., "New To Do List" window) by having the main application program send the USER_ID and FOLDERNO selected for the To Do List by the user to the stored procedure. In one embodiment, the name of the stored procedure is psp_sel_mque_detail. For this example, the FOLDERNO corresponds to the user's personalized To Do List (e.g., "New To Do List").

The stored procedure then accesses the MESSAGE_QUEUE table 1140 (see FIG. 11) to obtain the message via the message identifier (MSG_ID) for each next activity/task category corresponding to the user's USER_ID (identified as the OWNER_ID) and FOLDERNO. The stored procedure also obtains any priority information regarding the message and the next activities/tasks represented by the message from the MSG_SEQ_NBR and MSG_PRIORITY columns, respectively. The status of each individual next activity/task, as to whether it has previously been completed, is also obtained by the stored procedure from the MSG_STATUS column. Moreover, the stored procedure obtains the ACTIVITY_ID, COL_Ids, and COL_VALs associated with each MSG_ID for all its corresponding next activities/tasks. The stored procedure also accesses the ACTIVITY_MASTER table 1210 (see FIG. 12) to obtain information on the type of activity (ACTIVITY_TYPE) (e.g., PowerBuilder type window or executable file type) and the command line (EXEC_NAME) for the activity window application program or executable application program which is used to execute the next activity/task. The stored procedure then sends this information back to the main application program, which organizes the messages based on priority, calculates the number of completed and uncompleted next activities/tasks for each message, and reveals the messages 750 and completed (done) 760 and uncompleted (new) 770 information in the Summary To Do Category window 384.

For the "New To Do List" Summary To Do Category window 384, there are five messages 750. These messages 750 are "Activity Category[s] have been updated", "Category Added, Check Configuration", "Select payment type for class", "You are a new member of a Workgroup", and "You are now a Security Administrator". To the left of each message 2080 is the "Done" column 760 and the "New" column 770, which represent the number of next activities/tasks completed and uncompleted for the particular message 750. To illustrate, the "Category Added, Check Configuration," message 750 has two Done (completed) 760 and nine New (uncompleted) 770 next activities/tasks associated with the message 750.

Figure 21:
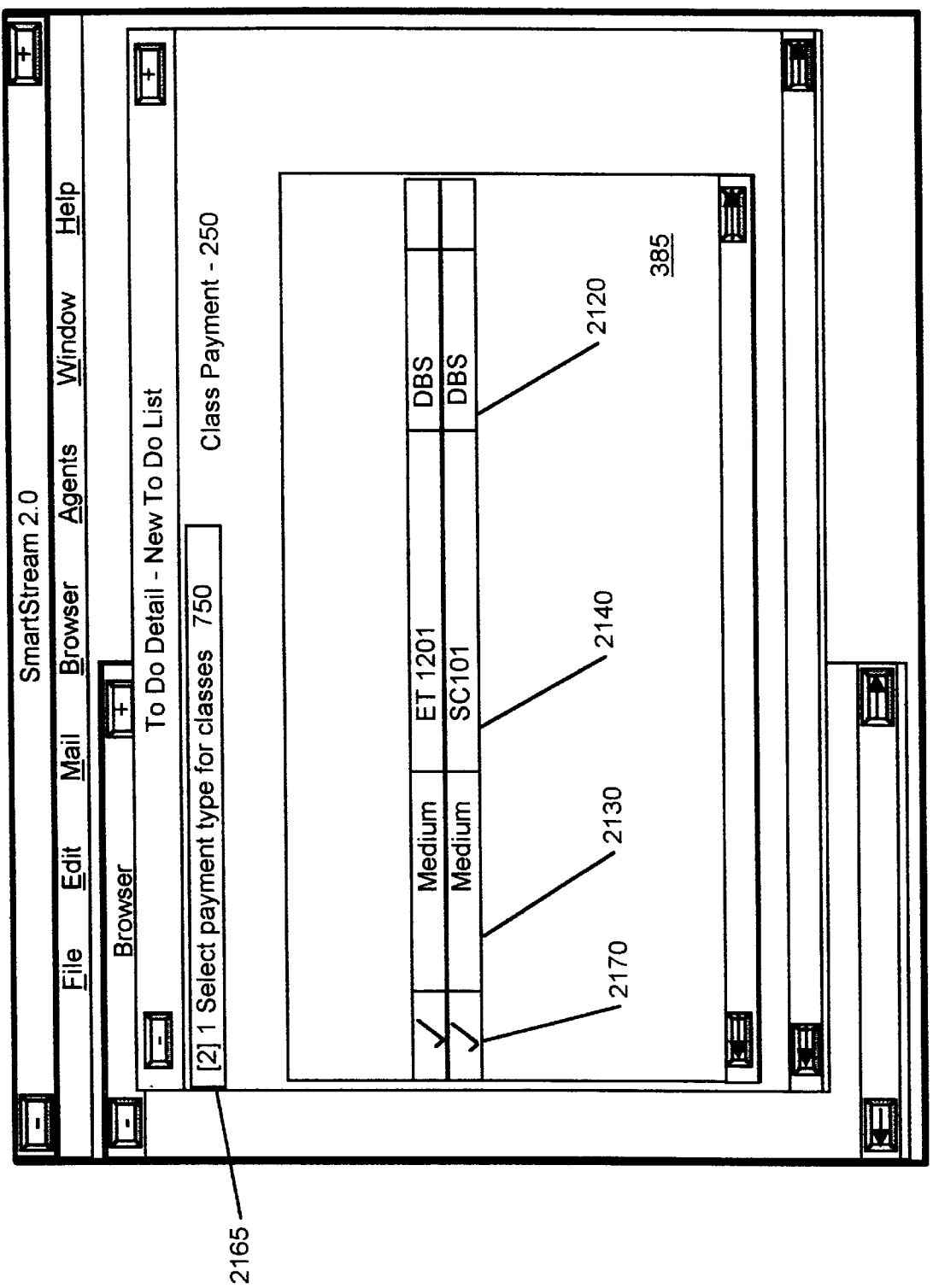
FIG. 21 depicts a computer screen, according to a preferred embodiment of the present invention, displaying the Browser mode list window where the user may access a To Do List, where the "New To Do List" To Do List has been accessed, and where a list of next activities for the To Do List is revealed in the Detailed To Do Category window.

As shown in FIG. 21, the user may also access a Detailed To Do Category window 385. In this window 385, when the user accesses the To Do List, one message 750 is revealed at a time. For this example, the main application program is displaying the "Select payment type for class" message 750. The main application program reveals, to the left of the message 750, the number of next activities/tasks 2165 that exist, and discloses, to the right of the message 750, the next activity/task 250 associated with this message 750. The main application program also lists, below the message 750, key information relating to each next activity/task 250. From left to right, this includes whether the next activity/task 250 has been completed 2170, the priority 2130 associated with each next activity/task 250, and, for this example, the class heading 2140 and student headings 2120.

To illustrate, the number of existing next activities/tasks 250 associated with the "Select payment type for class" message 750 are two, and the next activity/task 250 associated with this message 750 is Class Payment. Further, the next activities/tasks 250 relate to two classes 2140, ET201 and S2101, sought to be registered by a user/student 2120, DBS. For this example, DBS, the one originally registered for both of these classes, is also responsible for selecting a payment type for each class. The window 385 also reveals that both of these next activities/tasks 250 are uncompleted 2170 and have medium priority status 2130.

Figure 22A:
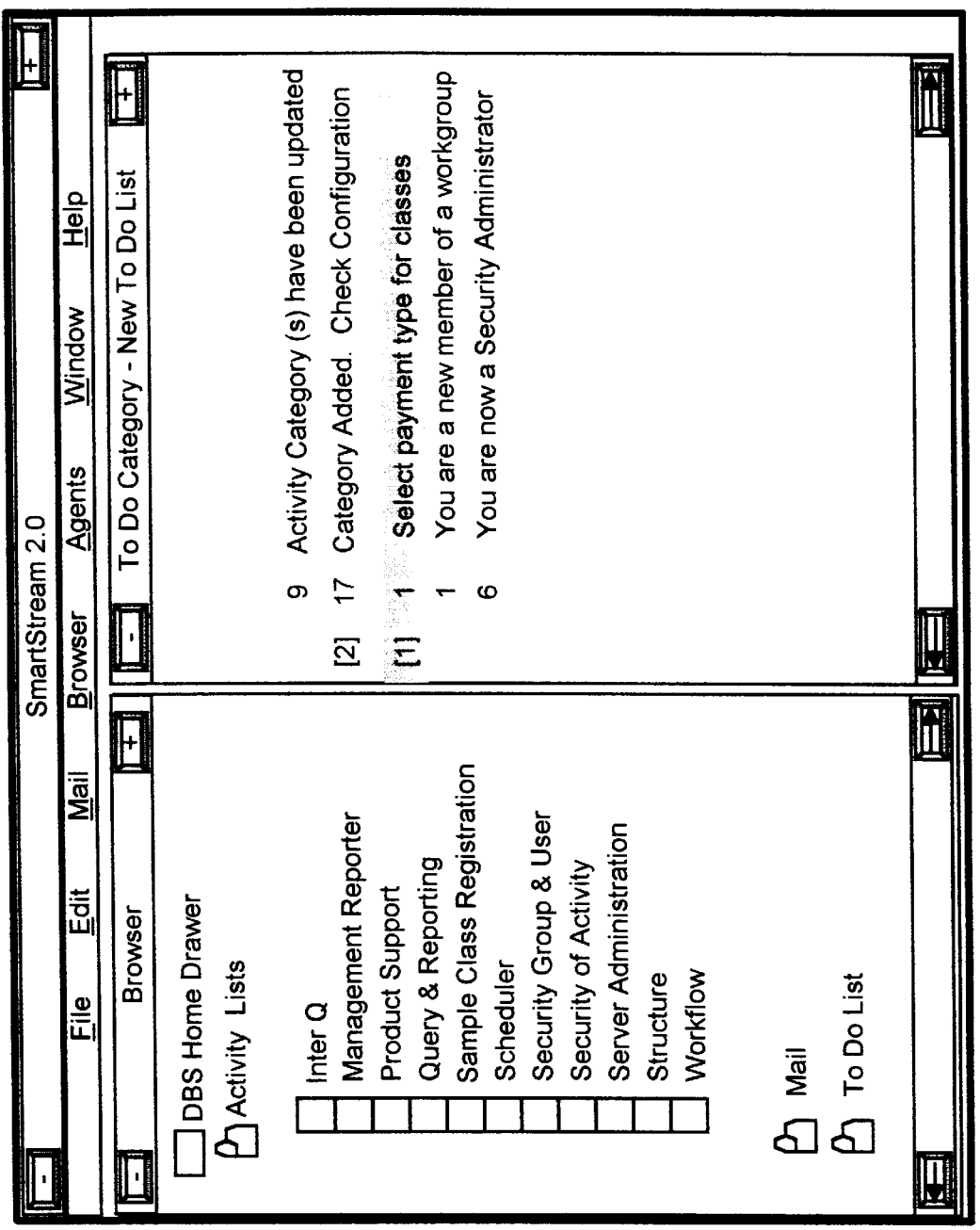
FIG. 22A depicts a computer screen, according to a preferred embodiment of the present invention, displaying the Summary To Do Category window where the "Select Payment Type for Class"next activity has been elected.

The user may select a category for a next activity/task to act upon from either the Summary To Do Category window 384 or the Detailed To Do Category window 385. For this example, the user selects the Class Payment next activity/task category, represented by the "Select payment type for class" message, from the Summary To Do Category window 384, as shown in FIG. 22A. The main application program then sends the FOLDERNO for the To Do List and the MSG_ID for the category selected to the next activity/task application program. For this example, the FOLDERNO and MSG_ID would be sent to the Class Payment application program represented by its EXEC_NAME. In one embodiment, the EXEC_NAME of the Class Payment application program is pam0510_payment.

Figure 26A:
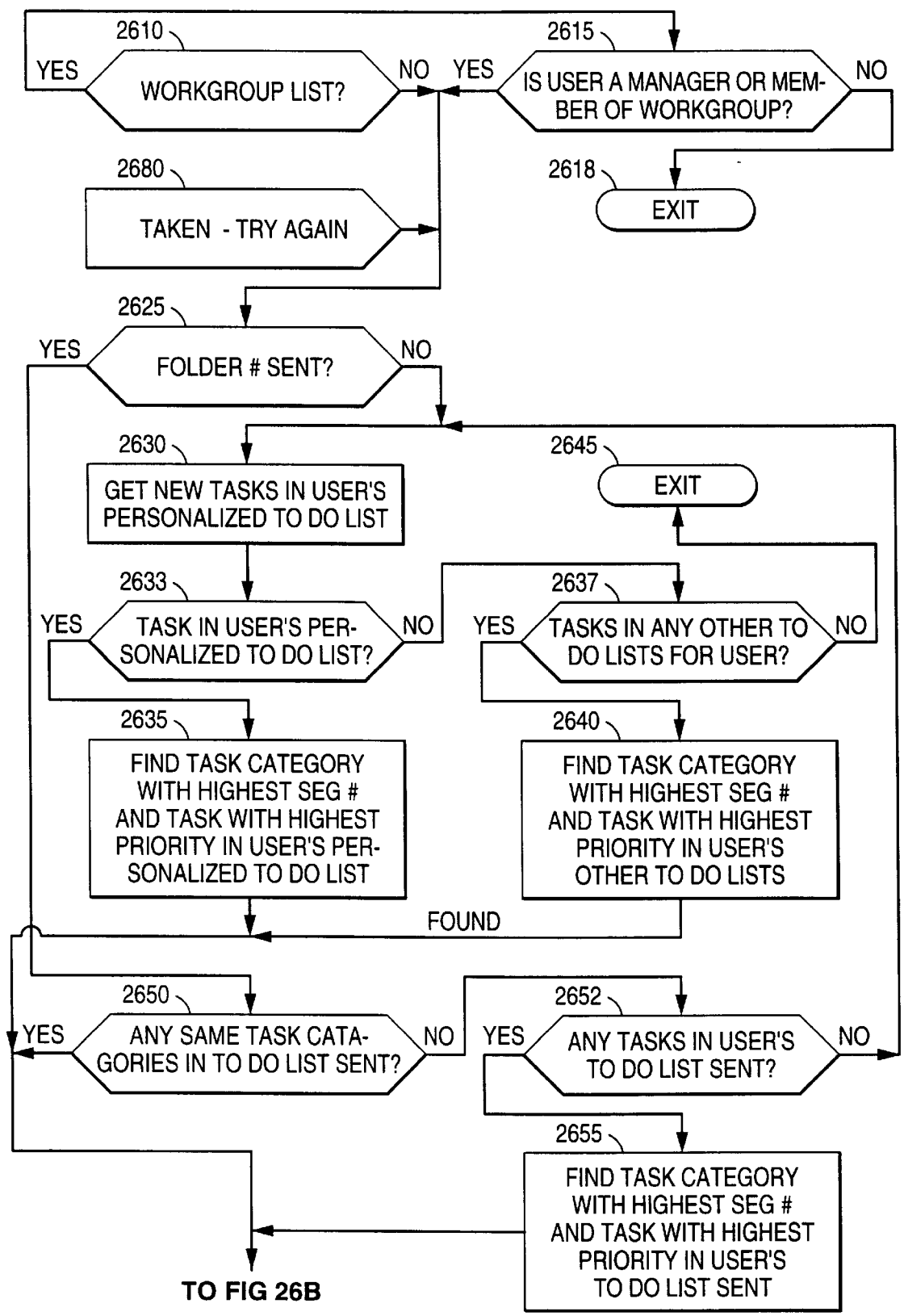
FIG. 26 depicts a flow diagram of a preferred embodiment of the Next Task procedure which determines a next activity to display on the computer screen based on priority settings.
Figure 26B:
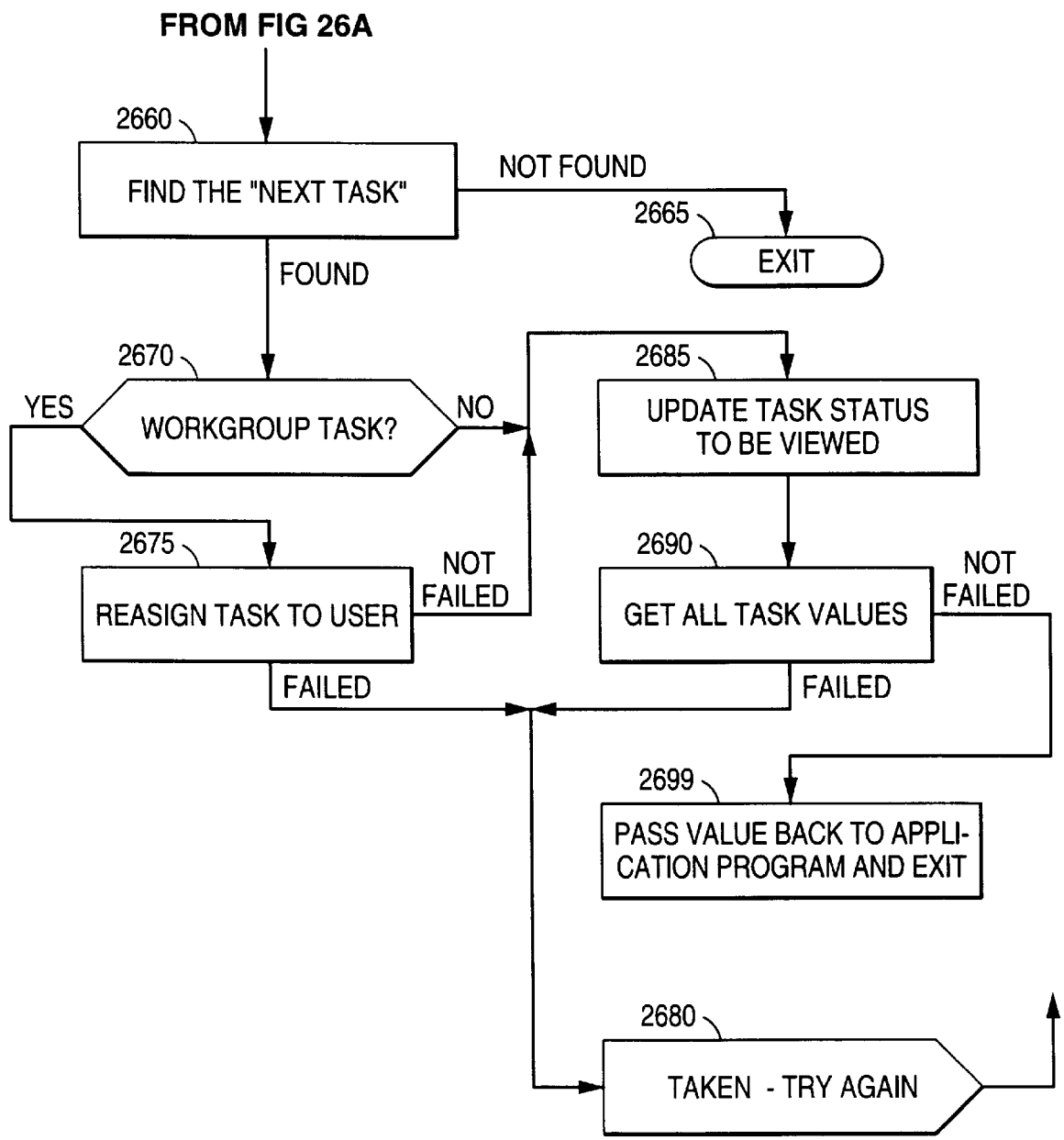

The next activity/task application program then sends the FOLDERNO and MSG_ID to a stored procedure which determines the most prioritized next activity/task for the next activity/task category. In one embodiment, the name of the stored procedure is the Next Task stored procedure, which is discussed in further detail below and is illustrated in FIG. 26. After determining the most prioritized next activity/task, the Next Task stored procedure sends information on this next activity/task (class payment), represented by its ACTIVITY_ID, to the next activity/task application program or executable application program.

Figure 22B:
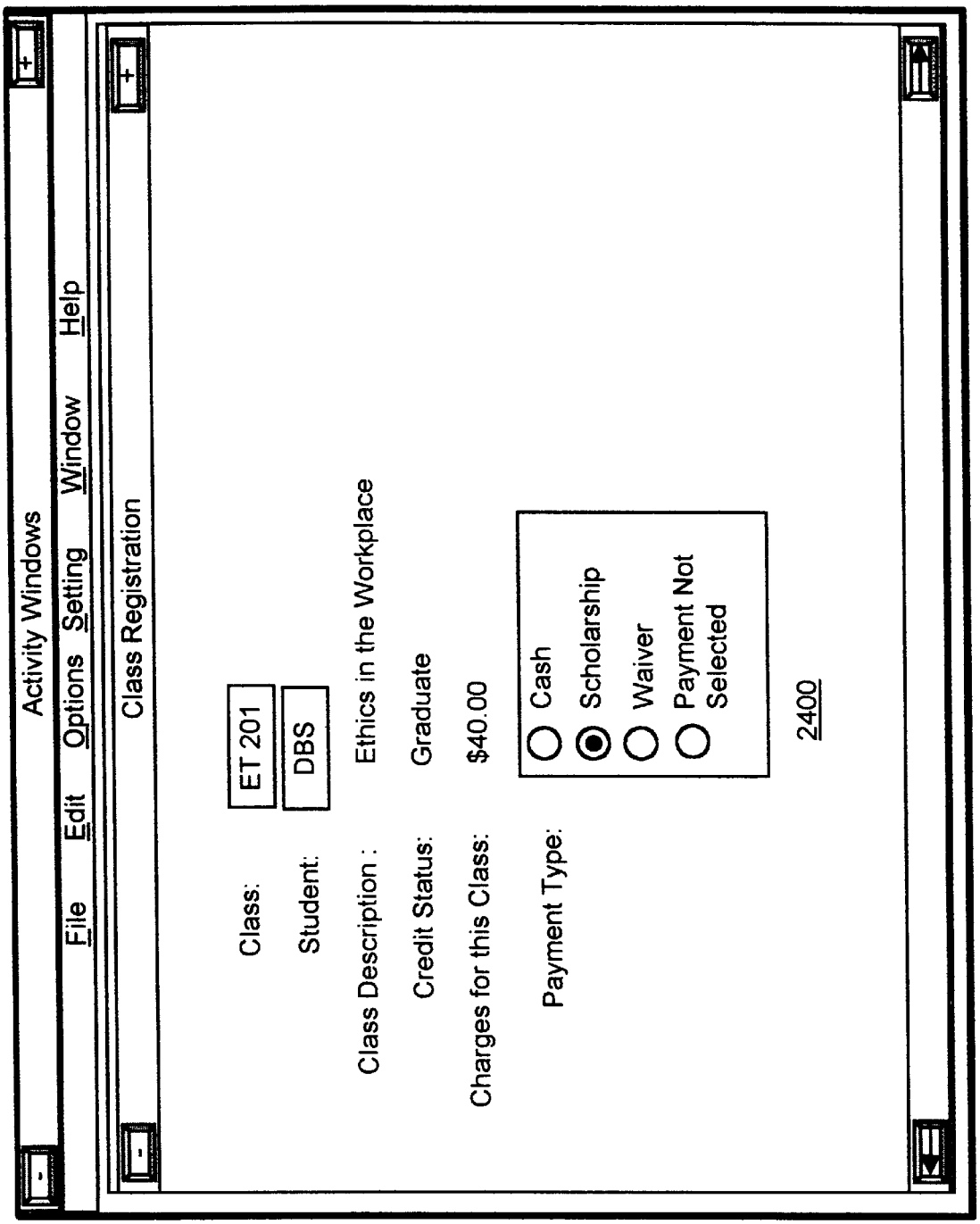
FIG. 22B depicts a computer screen, according to a preferred embodiment of the present invention, displaying an illustrative example of a Class Payment next activity window.

In this example, the class payment next activity/task category only contains one next activity/task. Therefore, the Next Task stored procedure selects the next activity/task, and the Next Task stored procedure send the Class Payment activity application program the next activity/task. The Next Task stored procedure also sends the Class Payment application program other information regarding this next activity/task. As shown in FIG. 22B, the Class Payment application program then reveals the Class Payment next activity/task in a Class Payment activity window 2400, as described above, for the Class Registration activity.

The user may also access next activities/tasks via, the Options mode. To illustrate, if the same user is responsible for an activity and corresponding next activity/task or next activity/task and corresponding next activity/task that occur sequentially, then the user may access the next activity/task from the activity or next activity/task window via the Options mode. For example, since the user (DBS) is responsible for both the Class Payment next activity/task and the just completed Class Registration activity, then DBS may access the Class Payment next activity/task from the Class Registration window via the Options mode.

Figure 22C:
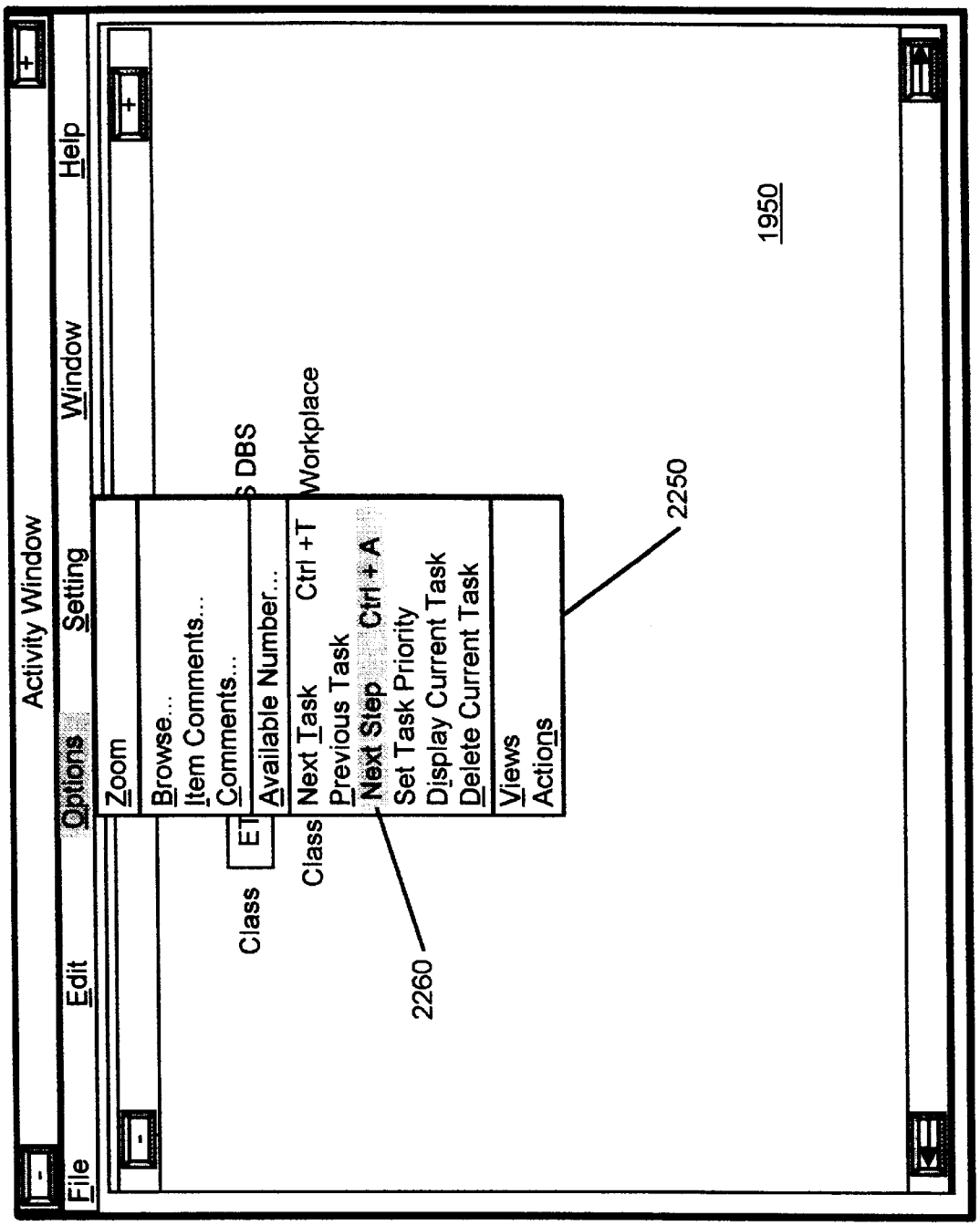
FIG. 22C depicts a computer screen, according to a preferred embodiment of the present invention, displaying an Options mode list accessed from the Class Registration activity window, where the user may select the Next Step command to access the next activity that occurs sequentially after the Class Registration activity and which the user is responsible for performing.

To illustrate, as shown in FIG. 22C, after DBS had completed registering for the SC101 class in the Class Registration activity window 1950, DBS accesses the Options mode. In doing so, the Class Registration application program calls the Options application program, which reveals a list of options 2250 for the user to select from. Next, in order to access the sequential next activity/task in connection with the Class Registration activity, the user selects the Next Step option 2260 from the Options mode list 2250.

Upon accessing the Next Step option 2260, the Option application program calls the Class Registration application program to obtain information to be sent to a Next Step application program. The information obtained is the USER_ID, ACTIVITY_ID, and a key value, which, for this example, is SC101 for the class value (COL_VAL_1) as well as its corresponding column identifier (COL_ID_2). The Options application program then calls the Next Step application program and sends the USER_ID formatted as the OWNER_ID and FROM_USER_ID for DBS, the ACTIVITY_ID formatted as the FROM_ACT_ID for the Class Registration activity, the COL_VAL_1 for SC101, and the COL_ID_1 for the class heading to the Next Step stored procedure.

Figure 23:
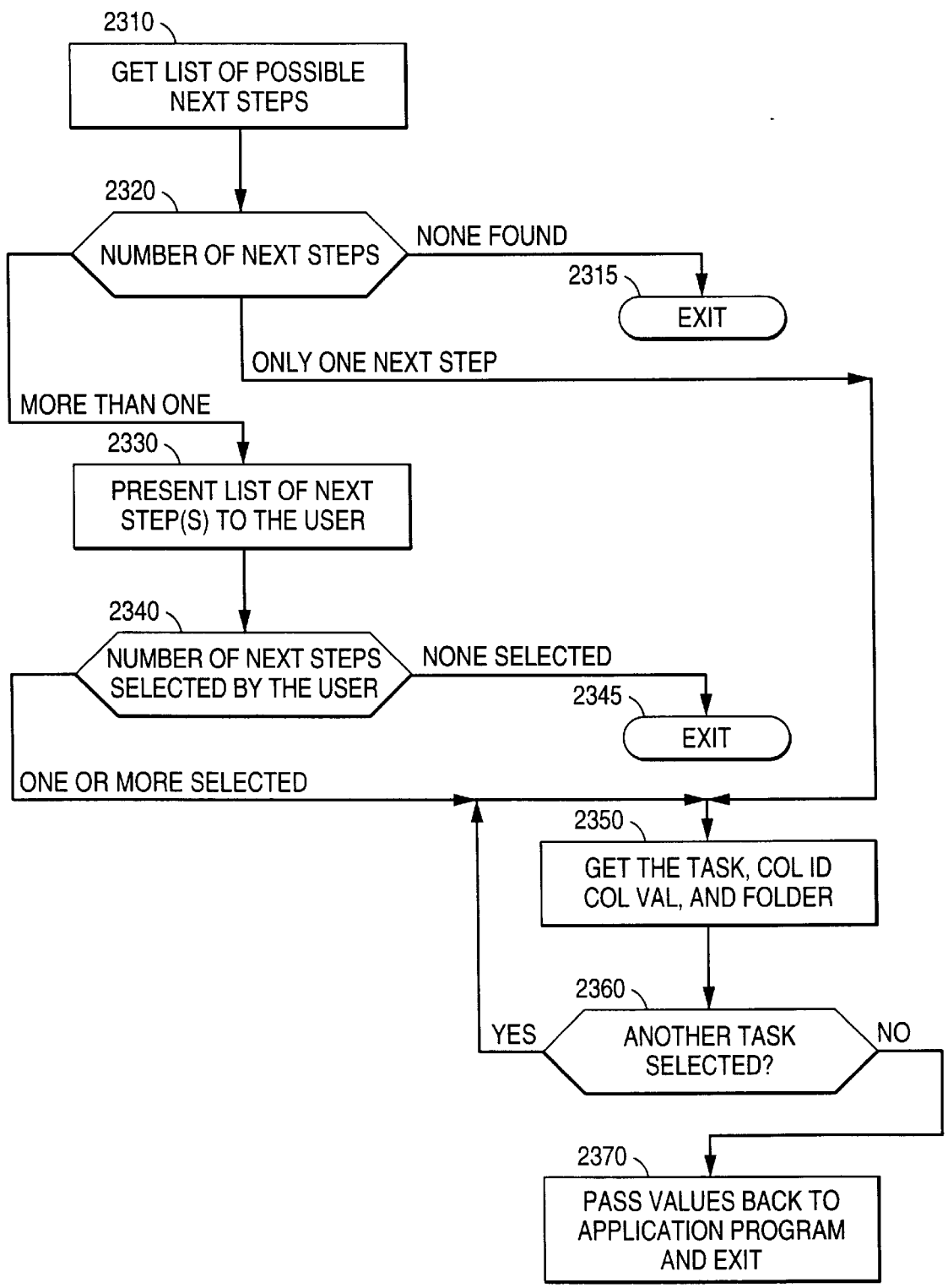
FIG. 23 depicts a flow diagram of a preferred embodiment of the Next Step procedure which determines the next activity that occurs sequentially after the just completed activity or next activity and which the user is responsible for performing.

The Next Step stored procedure is illustrated in FIG. 23. In one embodiment, the Next Step stored procedure is called psp_mque_next_step_1. At step 2310, the Next Step stored procedure obtains a list of all possible next steps in connection with the just completed activity for that user. In doing so, the Next Step stored procedure accesses the MESSAGE_QUEUE table 1140 (see FIG. 11) to obtain all next activities/tasks (represented as ACTIVITY_Ids) and their message identifiers (MSG_Ids) for the OWNER_ID and FROM_USER_ID corresponding to DBS, the FROM_ACT_ID for the Class Registration activity, and the key value corresponding to SC101 (COL_VAL_1) for the class heading (COL_ID_1). The Next Step stored procedure then proceeds to step 2320.

At step 2320, the Next Step stored procedure calculates the number of next steps encountered. If the number of next steps encountered equals zero, then the Next Step stored procedure is exited at step 2315 and a message to this effect is sent back to the Next Step application program which reveals this to the user. If there is only one Next Step, then the stored procedure proceeds to step 2350. However, if the number of next steps equals one or more, then the Next Step stored procedure proceeds to step 2330.

At step 2330, the Next Step stored procedure sends the ACTIVITY_Ids and MSG_Ids to the Next Step application program, which lists each next activity/task in a window (not shown) that corresponds to the just completed Class Registration activity for the SC101 class. The user may then select which next activities/tasks he or she would like to act upon. The Next Step application program then sends the ACTIVITY_Ids for these next activities/tasks selected back to the Next Step stored procedure. The Next Step stored procedure then proceeds to step 2340.

At step 2340, the Next Step stored procedure calculates the number of next steps selected by the user. If the number of next steps selected equals zero, then the Next Step stored procedure is exited at step 2345 and a message to this effect is sent back to the Next Step application program which exits the Options window 1950 (see FIG. 22C) accordingly. However, if the number of next steps selected equals one or more, then the Next Step stored procedure proceeds to step 2350.

At step 2350, the Next Step stored procedure accesses the MESSAGE_QUEUE table 1140 (see FIG. 11) and obtains the ACTIVITY_ID, FOLDERNO, and information contained in the COL_Ids and COL_VALs for the first next activity/task selected. The Next Step stored procedure then proceeds to step 2360, where it determines whether there are any other next activities/tasks which need to be accessed from the MESSAGE_QUEUE table 1140. If not, then the Next Step stored procedure proceeds to step 2370.

However, if there are other next activities/tasks to be accessed from the MESSAGE_QUEUE table 1140, then the Next Step stored procedure returns to step 2350 and the above-mentioned information is obtained for the second next activity/task. This cycle continues until the pertinent information for each next activity/task selected by the user has been obtained by the Next Step stored procedure. The Next Step stored procedure then proceeds to step 2370.

At step 2370, the information related to each next activity/task selected by the user is sent back to the Next Step application program. This includes all ACTIVITY_Ids, FOLDERNOs, COL_Ids, and COL_VALs. The Next Step stored procedure also sends a message as to the sequence that each next activity/task should be executed.

The Next Step application program then calls the application program responsible for performing the first next activity/task. If there are other next activities/tasks that need to be executed after the first (or current) next activity/task, then a message is sent to the application program indicating that it should call the Next Step application program upon completion of the first (current) next activity/task.

Figure 24:
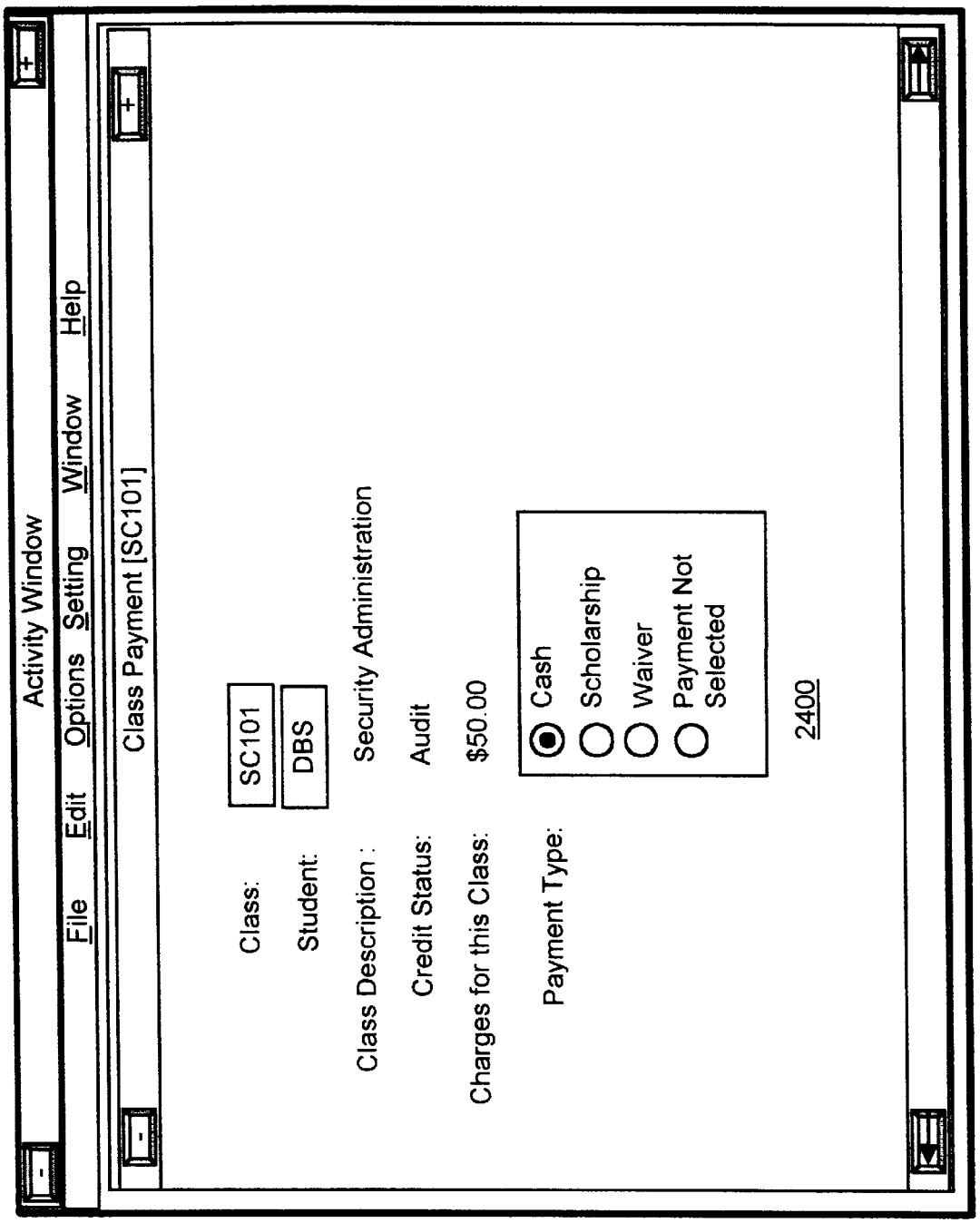
FIG. 24 depicts a computer screen, according to a preferred embodiment of the present invention, displaying an illustrative example of a Class Payment next activity window which is the sequentially subsequent next activity after the just completed Class Registration activity and which the user is also responsible for performing.

For this example, the Class Payment application program is called up. Therefore, referring to FIG. 24, the Class Payment application program reveals a Class Payment activity window 2400. As described in the foregoing, the user (DBS) may then complete the next activity/task by selecting the payment type (e.g., cash), and events and next steps will be triggered accordingly.

In another aspect of the present invention, the user may utilize the Options mode from a just completed activity or a just completed next activity/task window to simply call some next activity/task to the screen. The next activity/task chosen is selected, based on the following criteria. First, the highest priority next activity/task for the same next activity/task category. If no next activities/tasks exist for the preceding next activity/ task category or the user has just completed an activity, then the highest priority next activity/task from the user's personalized To Do List is selected. If no next activities/tasks exist in the user's personalized To Do List, then the highest priority next activity/task contained in any other To Do List in which the user has access is selected.

Figure 25:
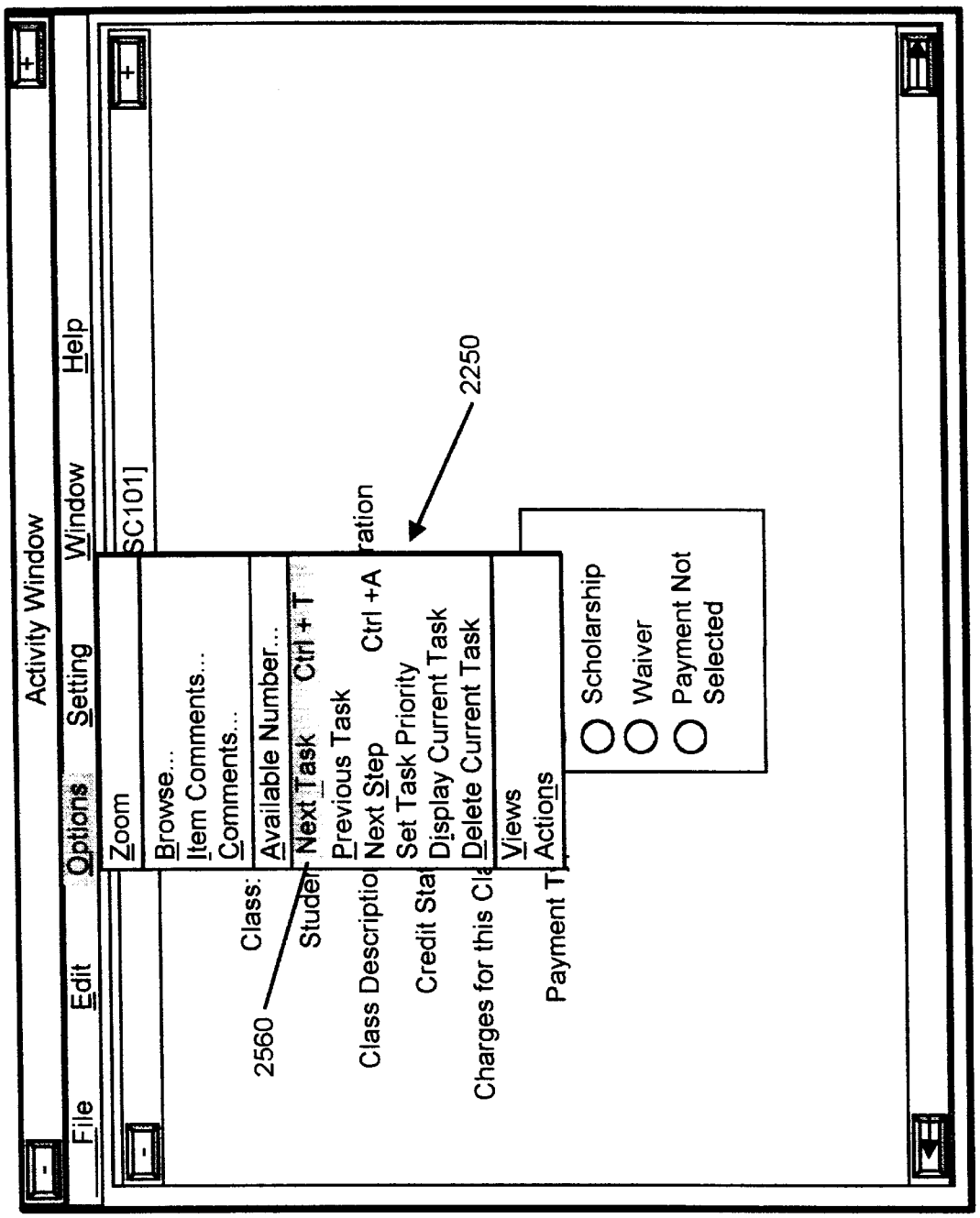
FIG. 25 depicts a computer screen, according to a preferred embodiment of the present invention, displaying an Options mode list accessed from the Class Registration activity window, where the user may select the Next Task command to access a next activity to the computer screen based on priority settings.

To illustrate, as shown in FIG. 25, after a user has completed registering for the SC101 class in the Class Registration activity window, the user (DBS) accesses the Options mode. In doing so the Class Registration application program then calls up the Options application program, which reveals a list of options 2250 for the user to select from. Next, the user selects the Next Task option 2560 from the Options mode list 2250.

Upon accessing the Next Task option, the Option application program calls the Class Registration application program to obtain information to be sent to the Next Task application program. The information obtained is the USER_ID, OWNER_type (user or work group), and ACTIVITY_ID. If the Options mode had been accessed from an application program associated with a next activity/task, then the MSG_ID and the FOLDERNO for the To Do List associated with the next activity/task would also have been obtained. The Option application program then calls the Next Task application program and sends it the USER_ID formatted as an OWNER_ID, the OWNER_TYPE and the ACTIVITY_ID. The Next Task application program then sends this information to the Next Task stored procedure.

In one embodiment, the Options application program calls the pam0015_next_msg (Next Task) application program, which sends the OWNER_ID, OWNER_TYPE, and ACTIVITY_ID to the psp_sel_mque_next_msg_1 (Next Task) stored procedure. If the Options mode had been accessed from an application program associated with a next activity/task, then the MSG_ID and FOLDERNO corresponding to the next activity/task would also have been sent to the Next Task stored procedure.

Referring to FIG. 26, the Next Task stored procedure is illustrated. At step 2610, the Next Task stored procedure checks the OWNER_TYPE to determine if the user has accessed the Next Task option from a user or work group list. If the user has accessed the Next Task option from a user list, then the Next Task stored procedure proceeds to step 2625. However, if the user has accessed the Next Task option from a work group list, then the Next Task stored procedure proceeds to step 2615.

At step 2615, the Next Task stored procedure determines if the user is currently a manager or member of the work group, in case the user's access privileges have been revoked since the time the user accessed the current work group list. If the user no longer has access privileges, then the Next Task stored procedure is exited at step 2618 and a message to this effect is sent back to the Next Task application program which reveals this to the user. If the user still has access privileges to the work group list, then the Next Task stored procedure proceeds to step 2625.

At step 2625, the Next Task stored procedure determines whether a folder number (FOLDERNO) for a To Do List was sent from the Next Task application program. If so, then the Next Task stored procedure understands that the Next Task option was called from either an individual user's or work group user's To Do List, and the stored procedure proceeds to step 2650.

At step 2650, the Next Task stored procedure determines if the To Do List represented by the FOLDERNO contains any of the same next activities/tasks categories represented as the MGS_Ids from the just completed next activity/task. If the FOLDERNO for the To Do List sent contains at least one same next activity/task category, then the Next Task stored procedure proceeds to step 2660. However, if the To Do List does not contain at least one same next activity/task category, the stored procedure proceeds to step 2652.

At step 2652, the Next Task stored procedure determines if the FOLDERNO for the To Do List sent contains at least one next activity/task. If the To Do List sent contains at least one next activity/task, then the Next Task stored procedure proceeds to step 2655.

At step 2655, the stored procedure evaluates each next activity/task in the user's To Do List sent to determine which next activity/task category (MSG_ID) has the highest sequence number and priority next activity/task. The sequence number is assigned to a next activity/task category by the user who will act upon the next activity/task, and the priority is assigned to the next activity/task by the user who is responsible for initiating the next activity/task. The Next Task stored procedure then proceeds to step 2660. On the other hand, at step 2652, if the Next Task stored procedure determines that the FOLDERNO for the To Do List sent does not contain at least one next activity/task, then the stored procedure proceeds to step 2630.

At step 2625, if a folder number was not sent to the Next Task stored procedure, then the stored procedure interprets this to mean that the activity is not currently in the context of a To Do List. An example of this occurs when the user selects the Next Task option from one of the user's activity lists. In this case, the stored procedure proceeds to step 2630.

Figure 11A:
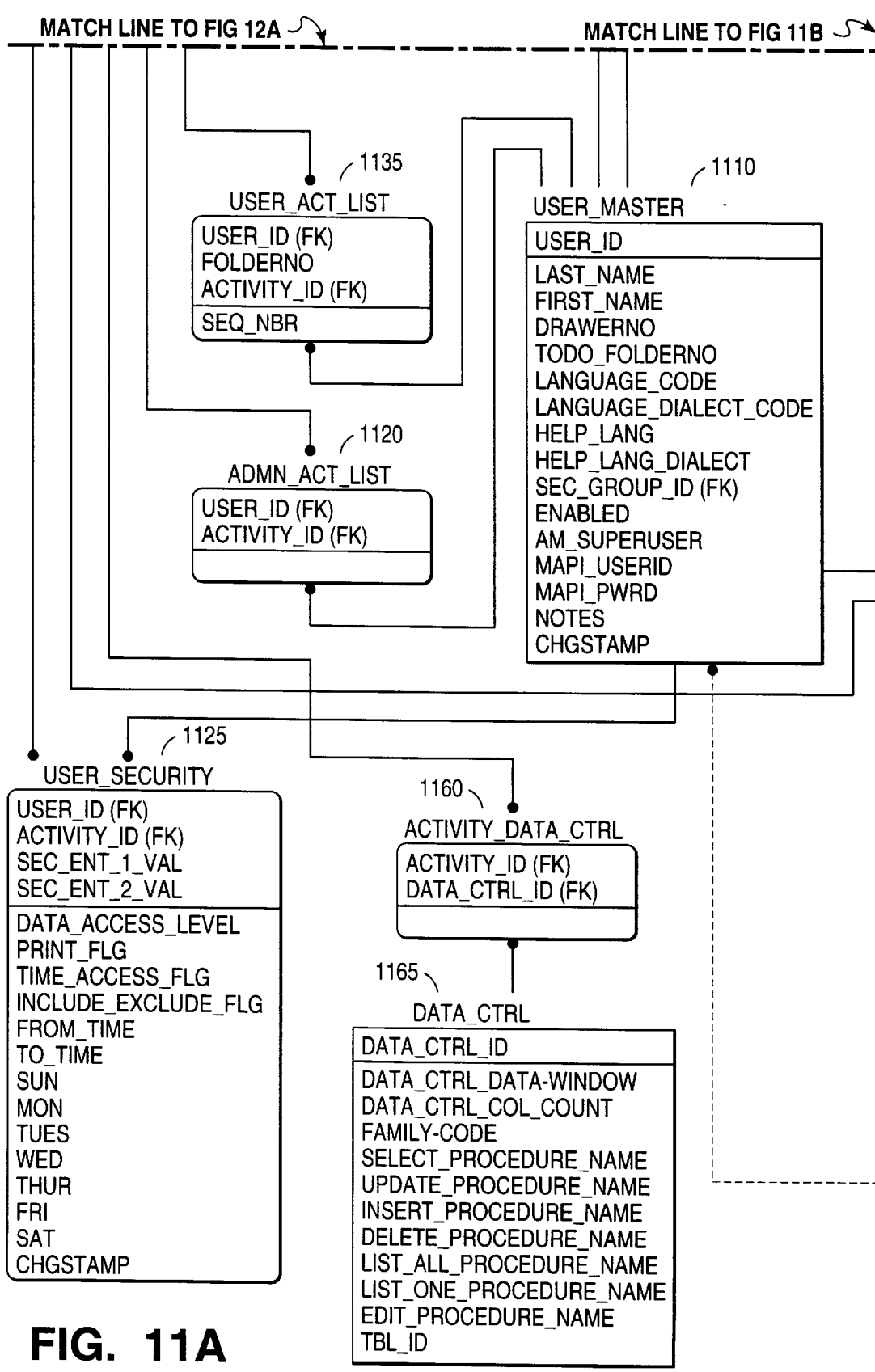
FIGS. 11–15 depict illustrative examples of tables used in a preferred embodiment of the present invention, including the tables relationships.
Figure 11B:
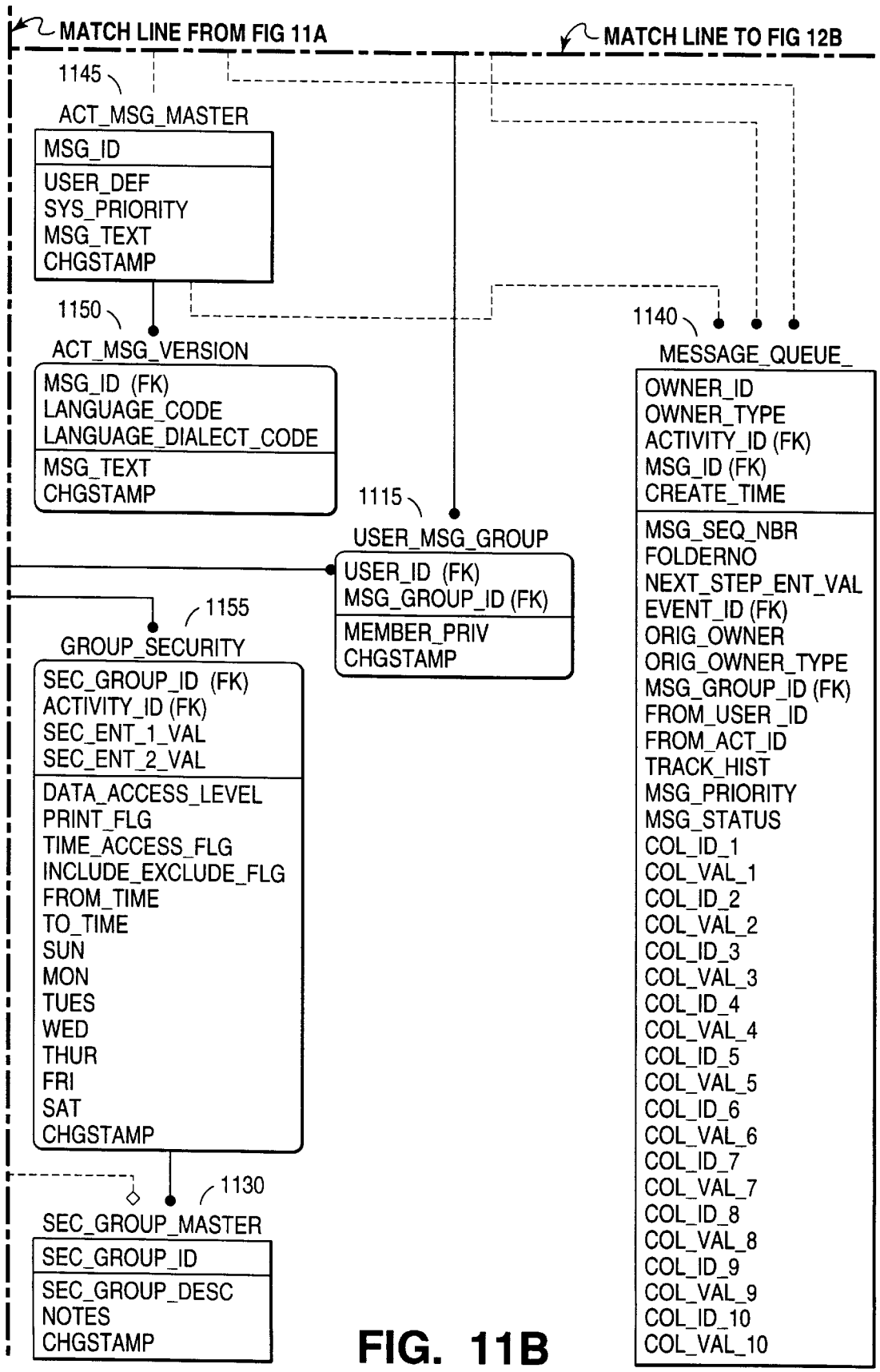
Figure 12A:
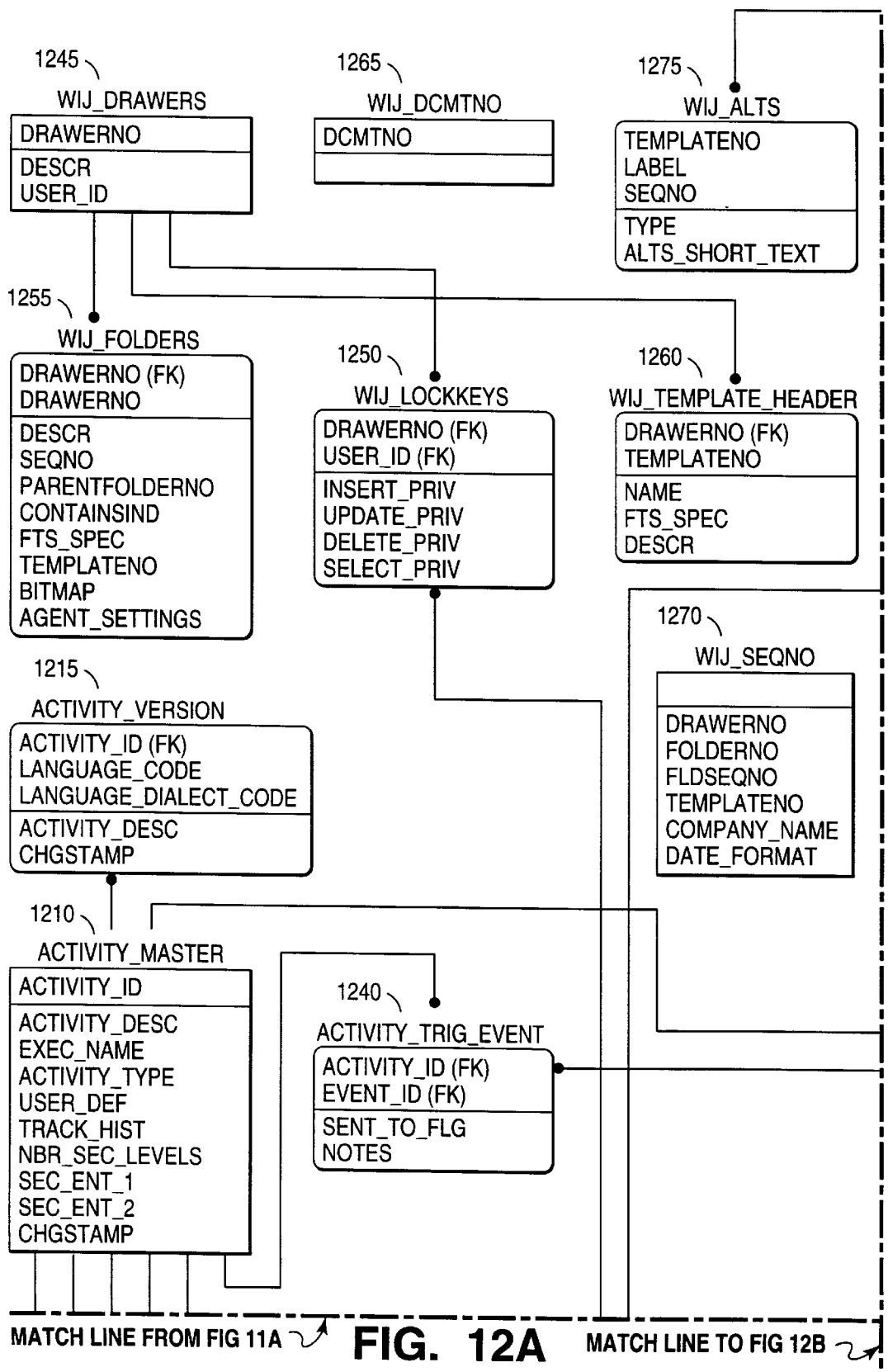
Figure 12B:
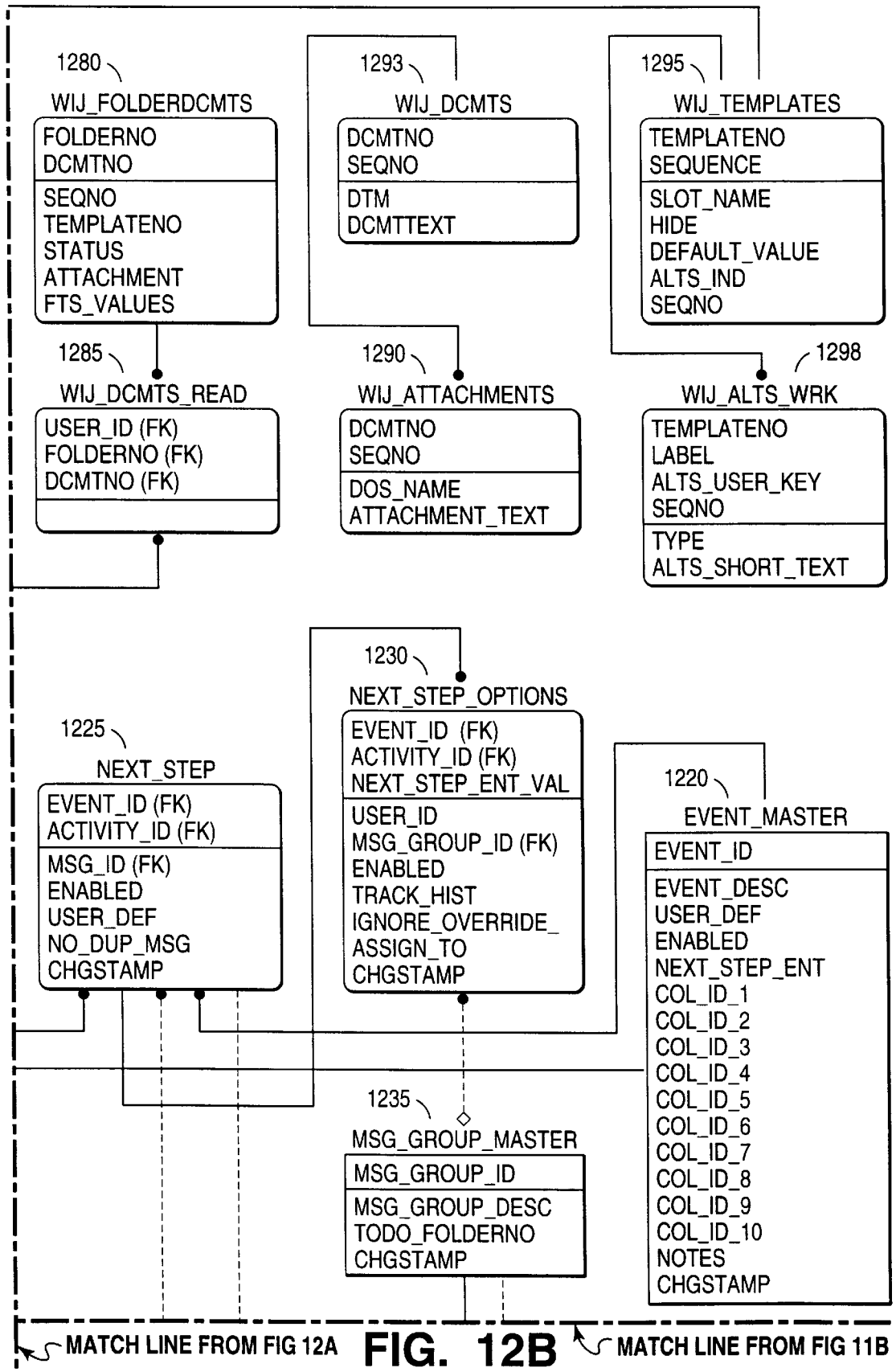
Figure 13:
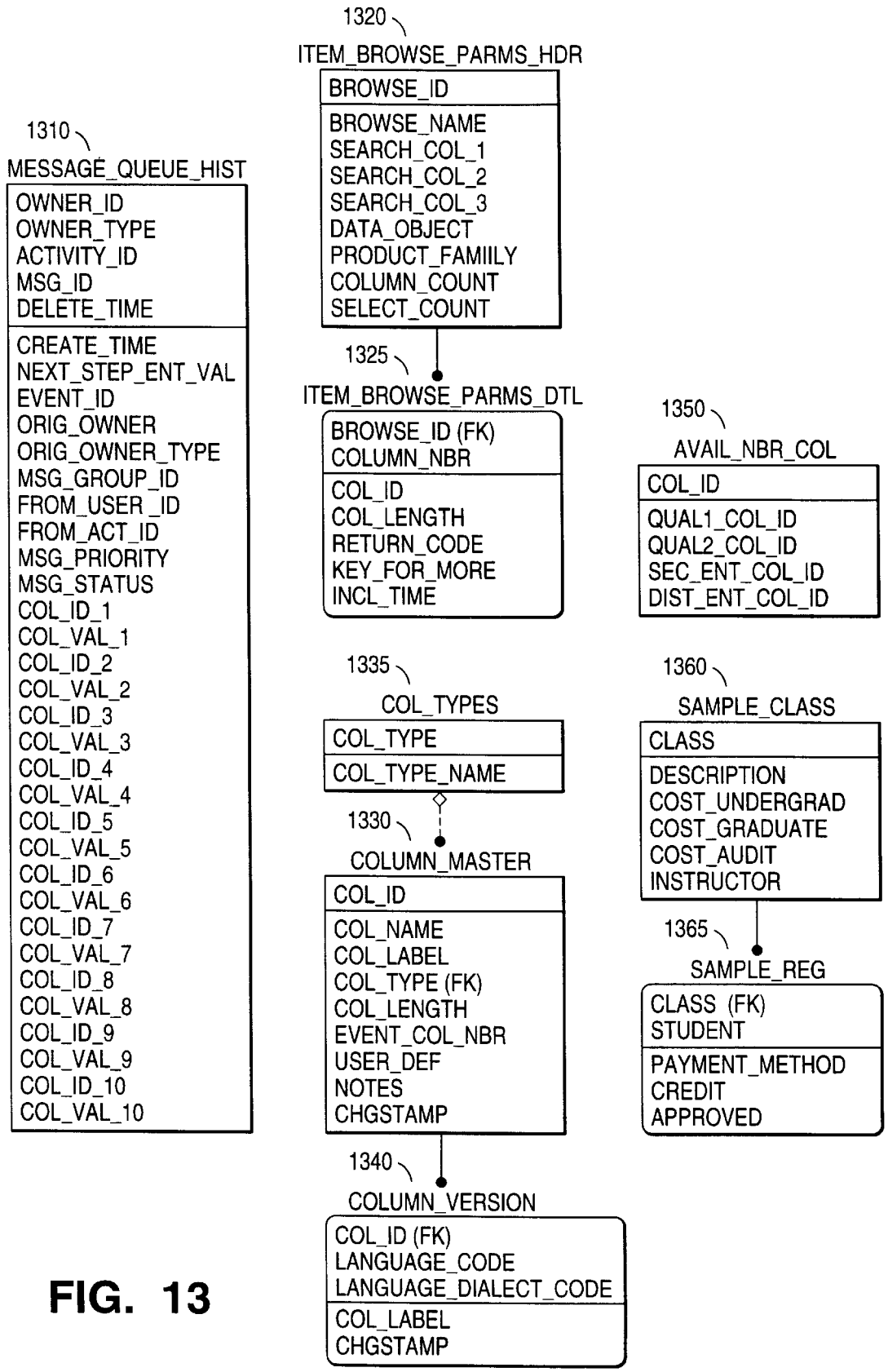
Figure 14:
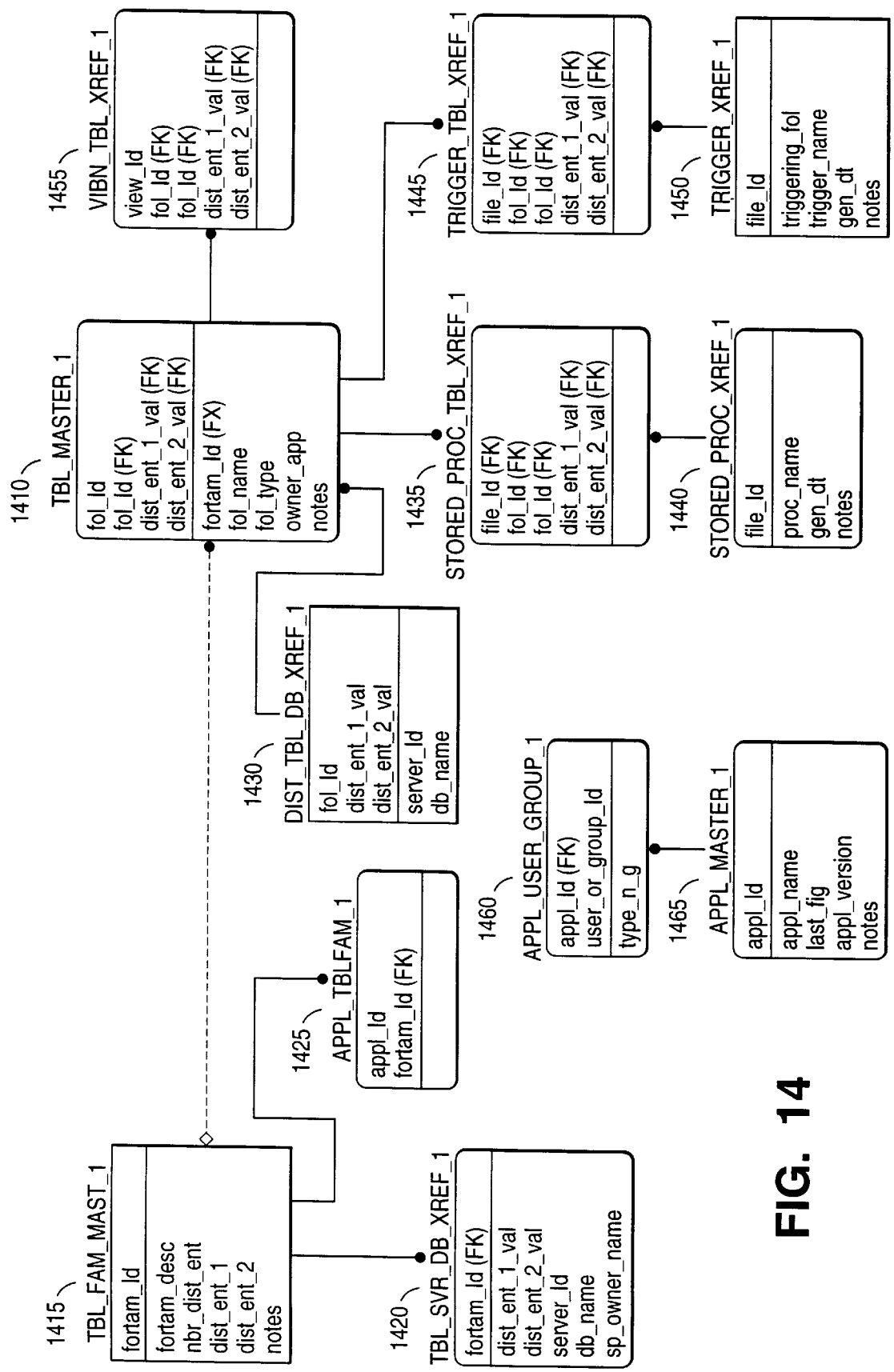

At step 2630, the Next Task stored procedure obtains the folder number for the user's personalized To Do List, represented as the TO DO_FOLDERNO, from the USER_MASTER table 1110 (see FIG. 11). Next, the Next Task stored procedure proceeds to step 2633 to determine if there is at least one next activity/ task in the user's personalized To Do List.

If there is at least one next activity/task in the user's personalized To Do List, then the Next Task stored procedure proceeds to step 2635 to determine which next activity/task category, represented in the MSG_ID column, in the user's personalized To Do List has the highest sequence number and priority task. The Next Task stored procedure then proceeds to step 2660.

If the Next Task stored procedure does not find a next activity/task in the user's personalized To Do List at step 2633, then the stored procedure proceeds to step 2637. At step 2637, the Next Task stored procedure, scans all the user's other To Do Lists by FOLDERNO in the MESSAGE_QUEUE table 1140 (see FIG. 11) to determine if any other To Do Lists for the user contain next activities/tasks. If the Next Task stored procedure does not find a next activity/task in any of the user's other To Do Lists, then the stored procedure is exited at step 2645 and a message to this effect is sent back to the Next Task application program which reveals this to the user.

However, if one or more of the user's To Do Lists contain at least one next activity/task, then the Next Task stored procedure proceeds to step 2640. At step 2640, the Next Task stored procedure then evaluates each next activity/task in each of the user's To Do Lists to determine which next activity/task has the highest sequence number and priority task. The Next Task stored procedure then proceeds to step 2660.

At step 2660, the Next Task stored procedure selects a next activity/task based on the following hierarchy. First, the highest sequence number (MSG_SEQ_NBR) in the MESSAGE_QUEUE table 1140 for the task category, unless the stored procedure has proceeded from step 2650 such that the next activity/task category (MSG_ID) is already chosen. Second, the highest priority (MSG_PRIORITY) in the MESSAGE_QUEUE table 1140, where the priority may be high, medium, and low, for each next activity/task for the selected next activity task category. Third, the oldest create time (CREATE_TIME) in the MESSAGE_QUEUE table 1140 for the selected next activity/tasks with the highest priority in the selected next activity/task category.

If for some reason there are not any next activities/tasks encountered by the Next Task stored procedure in step 2660 (e.g., the user's access privilege to a To Do List was removed during the steps of the Next Task stored procedure as discussed above), then the stored procedure is exited at step 2665 and a message to this effect is sent back to the Next Task application program which reveals this to the user. However, if a next activity/task is selected at step 2660, then the Next Task stored procedure proceeds to step 2670. At step 2670, the Next Task stored procedures determines if the next activity/task selected is a work group next activity/task. If the next activity/task is not a work group next activity/task, then the stored procedure proceeds to step 2685.

However, at step 2670, if the next activity/task is a work group next activity/task, then the Next Task stored procedure proceeds to step 2675. At step 2675, the stored procedure determines whether the work group next activity/task still needs to be acted upon (e.g., has not already been assigned to another user within the work group or simply no longer needs to be acted upon). If the work group next activity/task still needs to be acted upon, then the stored procedure proceeds to step 2685. However, if the work group next activity/task no longer needs to be acted upon, the Next Task stored procedure proceeds to step 2680 where the stored procedure is instructed to "Try Again" by proceeding to step 2625 in order to locate another next activity/task as discussed above.

At step 2685, the Next Task stored procedure updates the message status (MSG_STATUS) column for the next activity/task (ACTIVITY_ID) selected to a "viewed" status. This status indicates that user is about to view the next activity/task. This status is one of several possible statuses. Other possible statuses include the "new" status, which indicates the next activity has recently been created and there have not been any users notified of its existence; the "notified" status which indicates that at least one user has been notified that the next activity/task exists; and the "complete" status which indicates that the next activity/task has been viewed, acted upon, and completed by a user.

Next, the Next Task stored procedure proceeds to step 2690, where, as long as the next activity/task still needs to be acted upon, pertinent next activity/task values are obtained from the MESSAGE_QUEUE table 1140 (see FIG. 11) to be sent to the activity application program which will perform this next activity/task. However, if for some reason the next activity/task no longer needs to be acted upon for whatever reason, then the Next Task stored procedure proceeds to step 2680 where the stored procedure is instructed to "Try Again" by proceeding to step 2625 in order to locate another next activity/task as discussed above.

Finally, if the pertinent values are obtained by the Next Task stored procedure at step 2690, then the stored procedure is exited at step 2699. At step 2699, the pertinent values are then sent back to the Next Task application program, which forwards them to the appropriate activity application program to perform the next activity/task.

Figure 27:
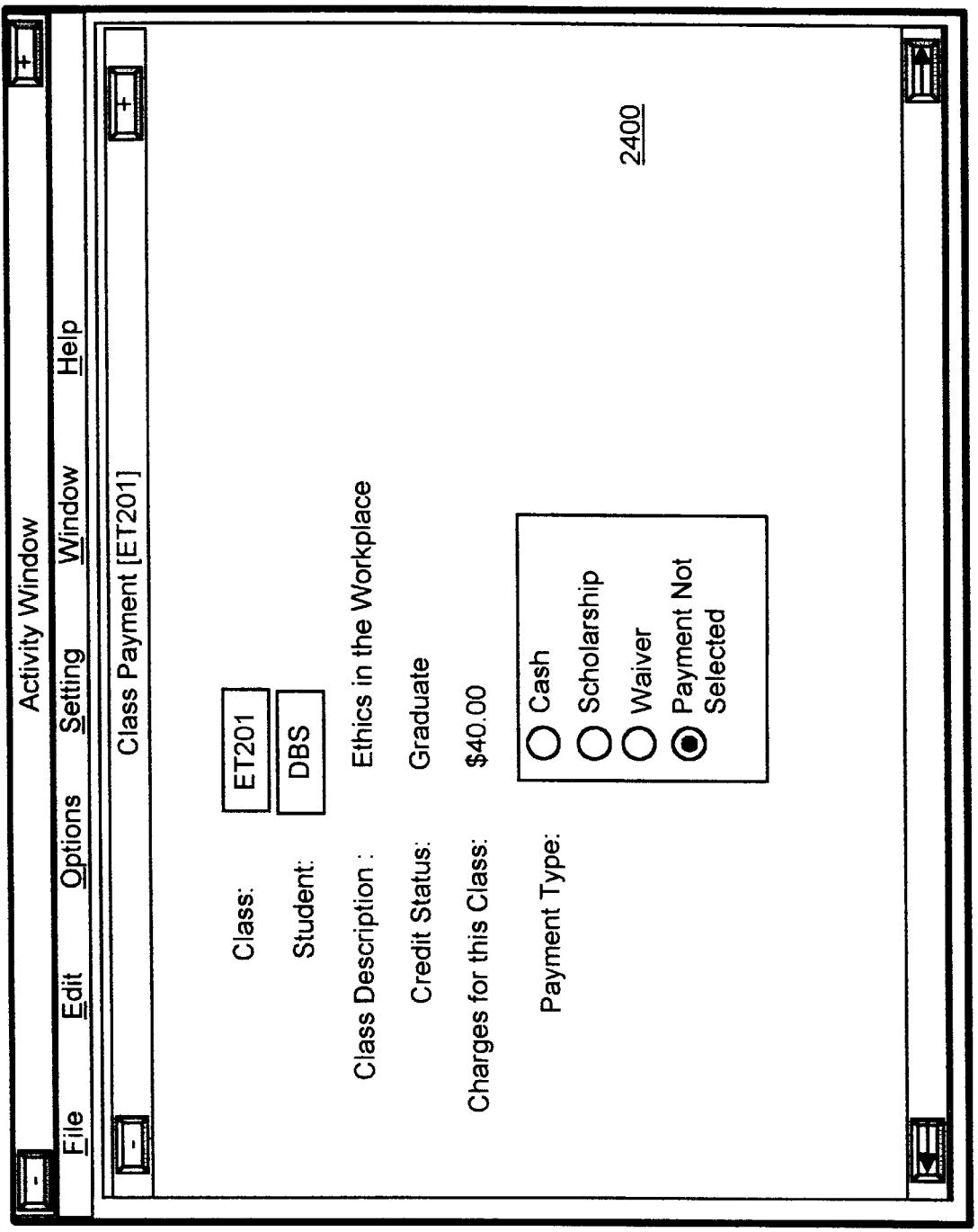
FIG. 27 depicts a computer screen, according to a preferred embodiment of the present invention, displaying an illustrative example of a Class Payment next activity which was selected by the Next Task procedure as a next activity that the user is responsible for performing.
Figure 28:
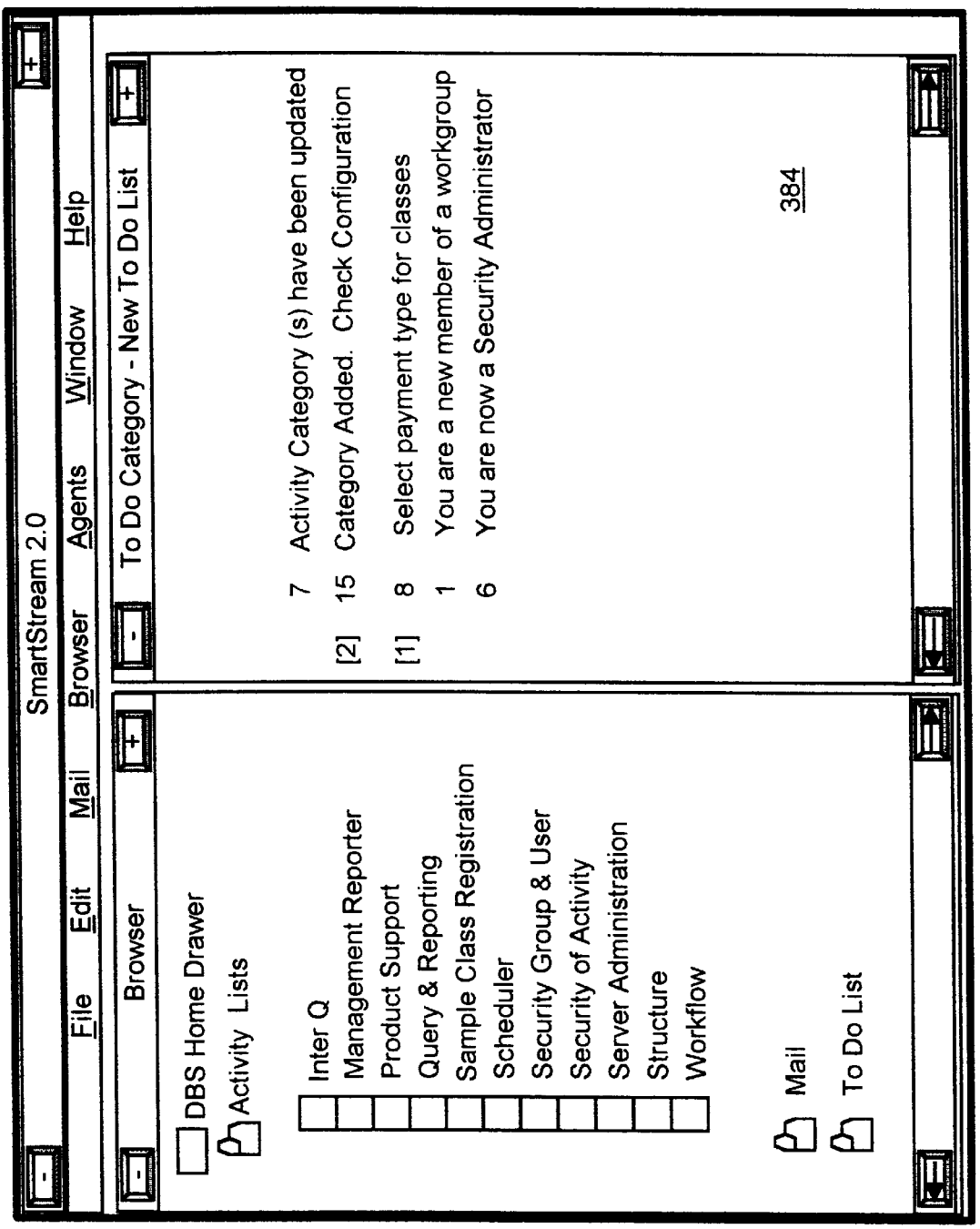
FIG. 28 depicts a computer screen, according to a preferred embodiment of the present invention, displaying an illustrative example of a "New To Do List" To Do List containing two class payment activities, represented by the "Select payment type for Class" Category, which have been completed (done).

For this example, referring to FIG. 27, the next activity/task category selected was class payment. Therefore, the activity application program is the Class Payment application program. Thus, the Class Payment application program reveals the Class Payment activity window 2400. For this example, the next activity/task selected is the class ET201 for student DBS for the Class Payment activity. Referring to FIG. 28, after the user has completed the two next activities/tasks for the Class Payment activity, the summary To Do Category window 384 reveals that two Class Payment next activities/tasks exist and have both been completed (done).

Among other responsibilities, the administrator of the computer system of the present invention is responsible for the following. He or she defines entities (e.g., plants, sites, etc.); assigns USER_Ids to new users of the computer system of the present invention; assigns users to work groups; defines and maintains the security privileges of the users and work groups (e.g., which activities and next activities/tasks a user may access); disables and defines new next steps to comply with an organization's procedures; defines users and work groups responsible for performing next steps; changes the text of messages and other window text for each activity and next activity/task; and enters translated versions of messages and other window text for non-English speaking users.

The following illustrates how an administrator may define a new next step. As described above, for each activity, an event will be triggered. When an event is triggered, one or more next steps will be selected which will result in a new next activity/task being added to a user's or work group's To Do List.

Figure 29:
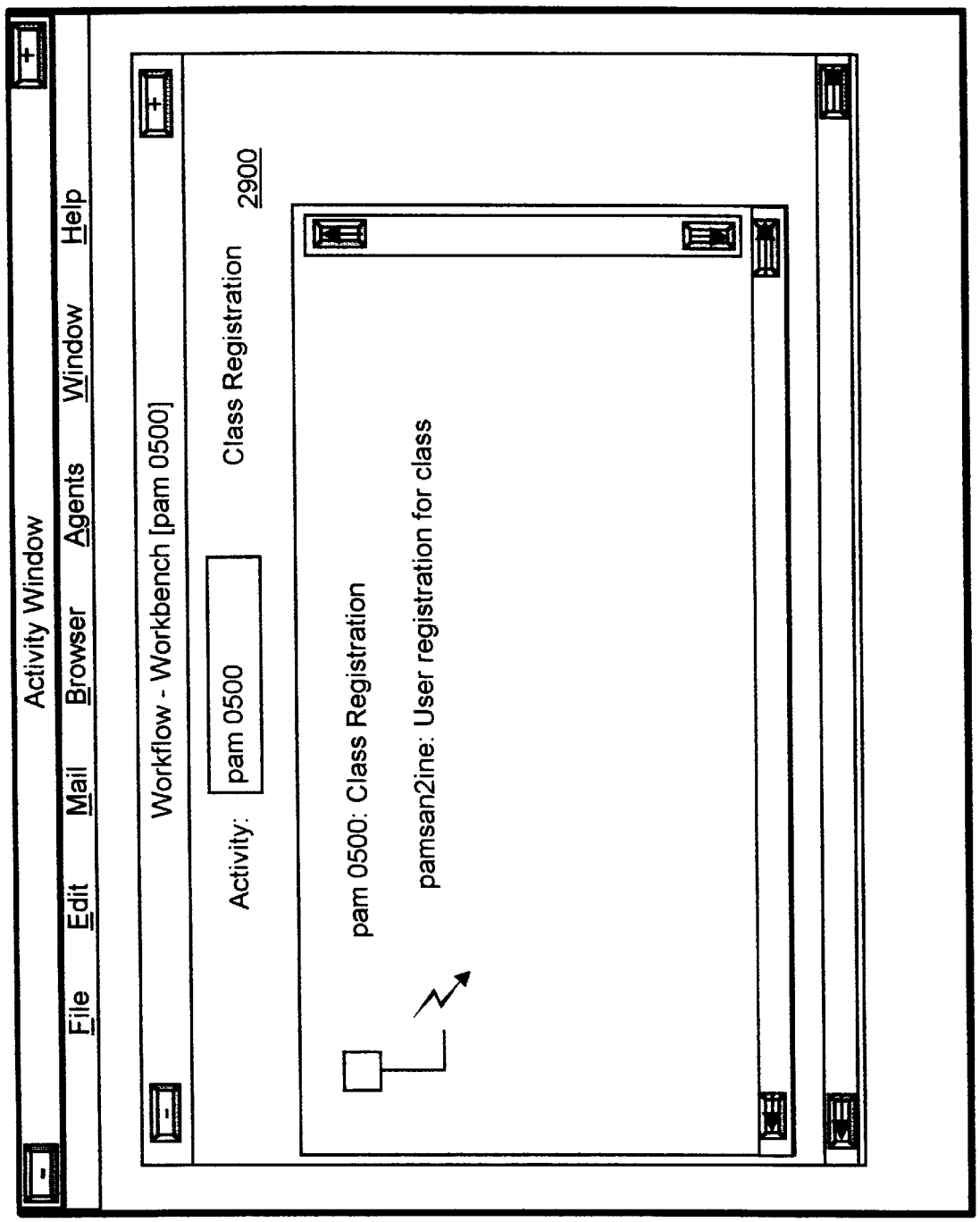
FIG. 29 depicts a computer screen, according to a preferred embodiment of the present invention, displaying the Workflow Workbench mode accessed by an administrator of the computer system of the present invention which displays an activity or corresponding event so that the administrator may define information flow procedures.

Referring to FIG. 29, the administrator accesses the Workflow Workbench activity from the administrator's list of activities (not shown). The Workflow Workbench activity window then displays an activity selected by the administrator, the activity application program name for that activity, all possible events for that activity, and the stored procedure name for each event in the WorkFlow Workbench window 2900. For this example, the Class Registration activity with its pam0500 activity application program name is displayed. For this activity, only one event exists. This event is "User registers for Class" (e.g. user adds a class) and the event identifier for the event is pamsam2ins.

Figure 30:
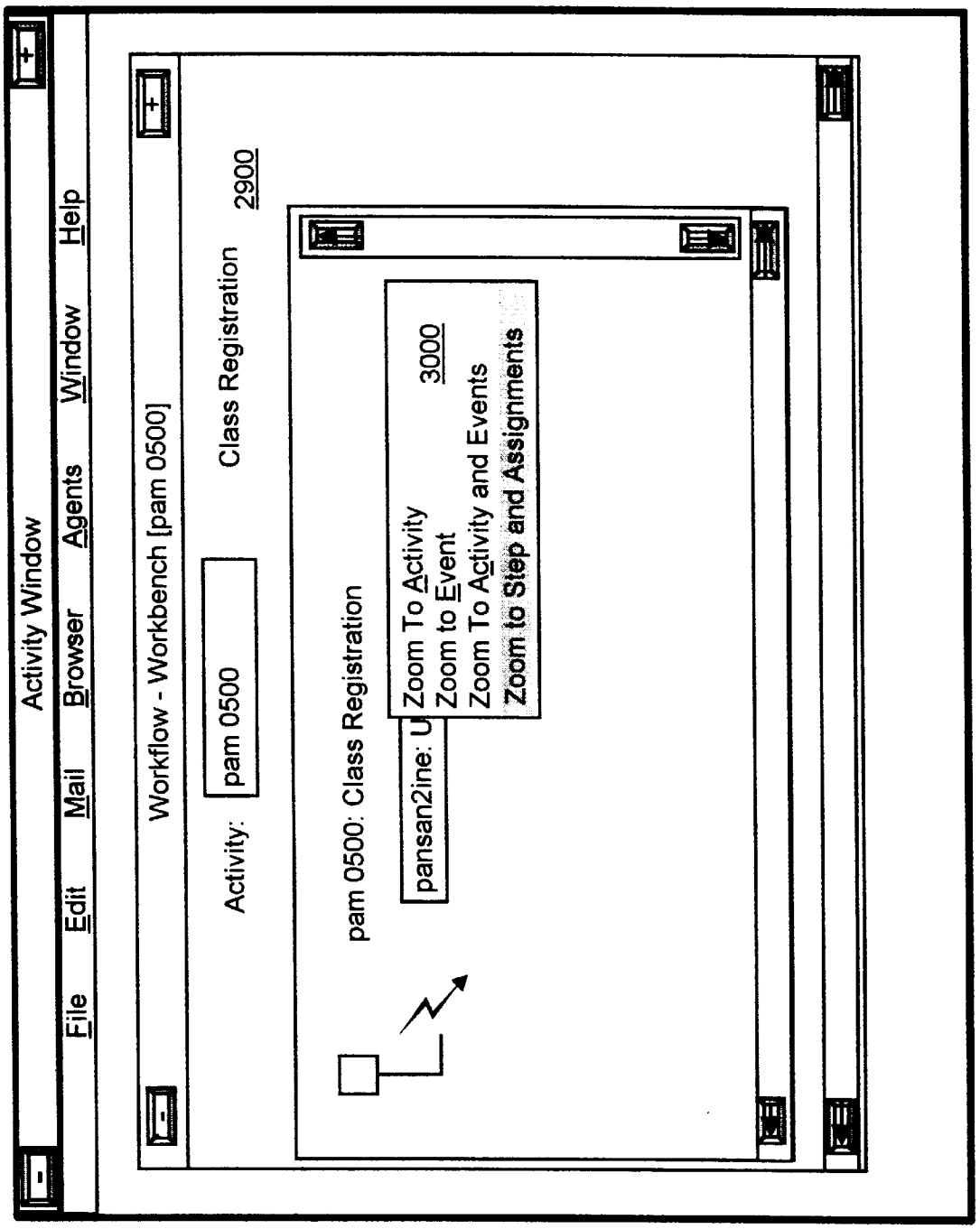
FIG. 30 depicts a computer screen, according to a preferred embodiment of the present invention, displaying the Zoom options list window, where the administrator may select an option to set up next steps in defining an information flow procedure.
Figure 31:
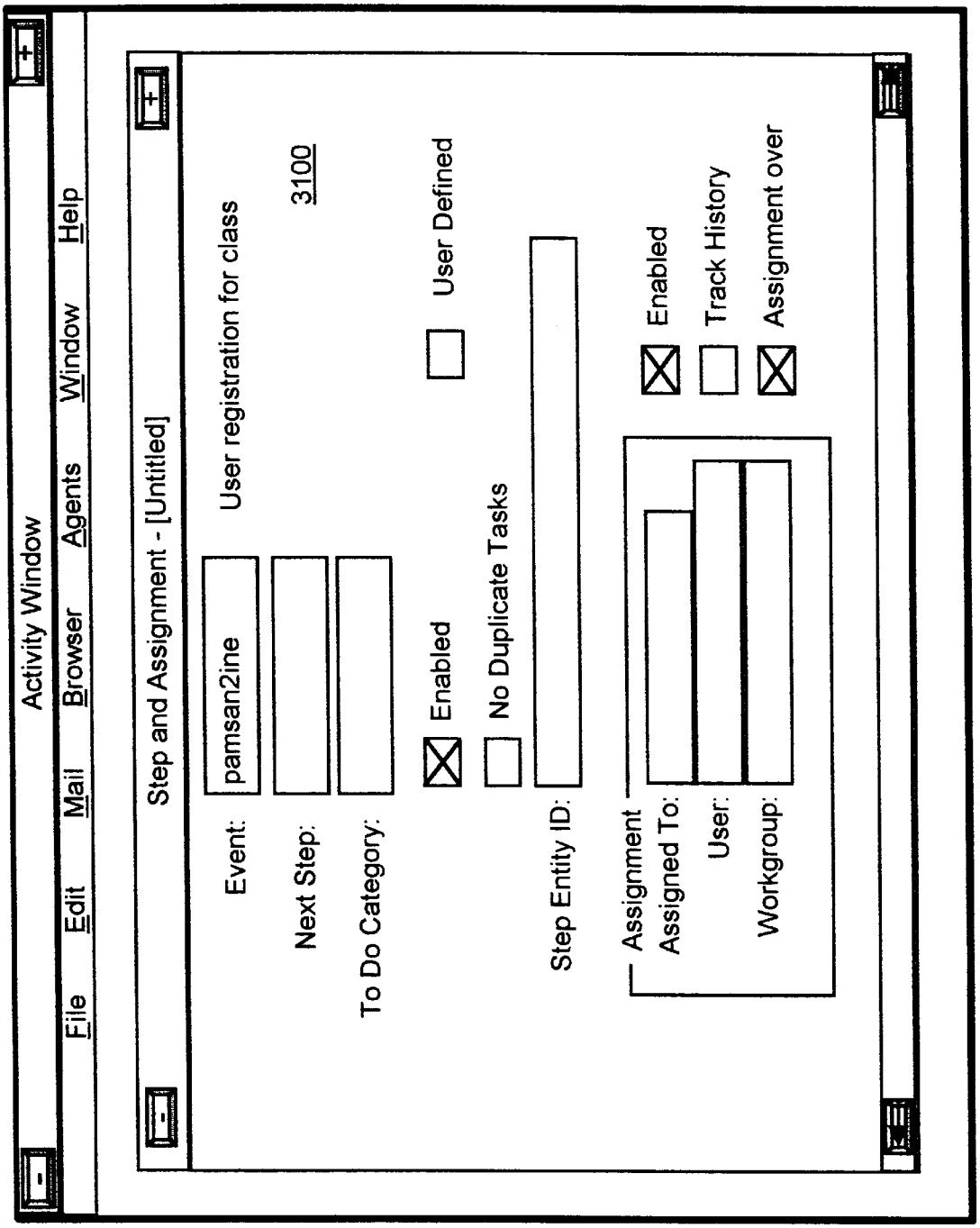
FIG. 31 depicts a computer screen, according to a preferred embodiment of the present invention, displaying the Step Assignments window which was selected from the Zoom options list window, where next steps may be assigned by the administrator.

Referring to FIG. 30, to add a new next step, the administrator may select, the "Zoom to Step and Assignments" option from a Zoom options list submenu (not shown). The user may access this option by selecting the Options mode and Zoom option from the Options mode list (not shown). The main application program then displays the Zoom mode list 3000 in which the "Zoom to Step and Assignments" may be selected. The Step and Assignments window 3100 is then displayed, as shown in FIG. 31, with the event selected.

Figure 32:
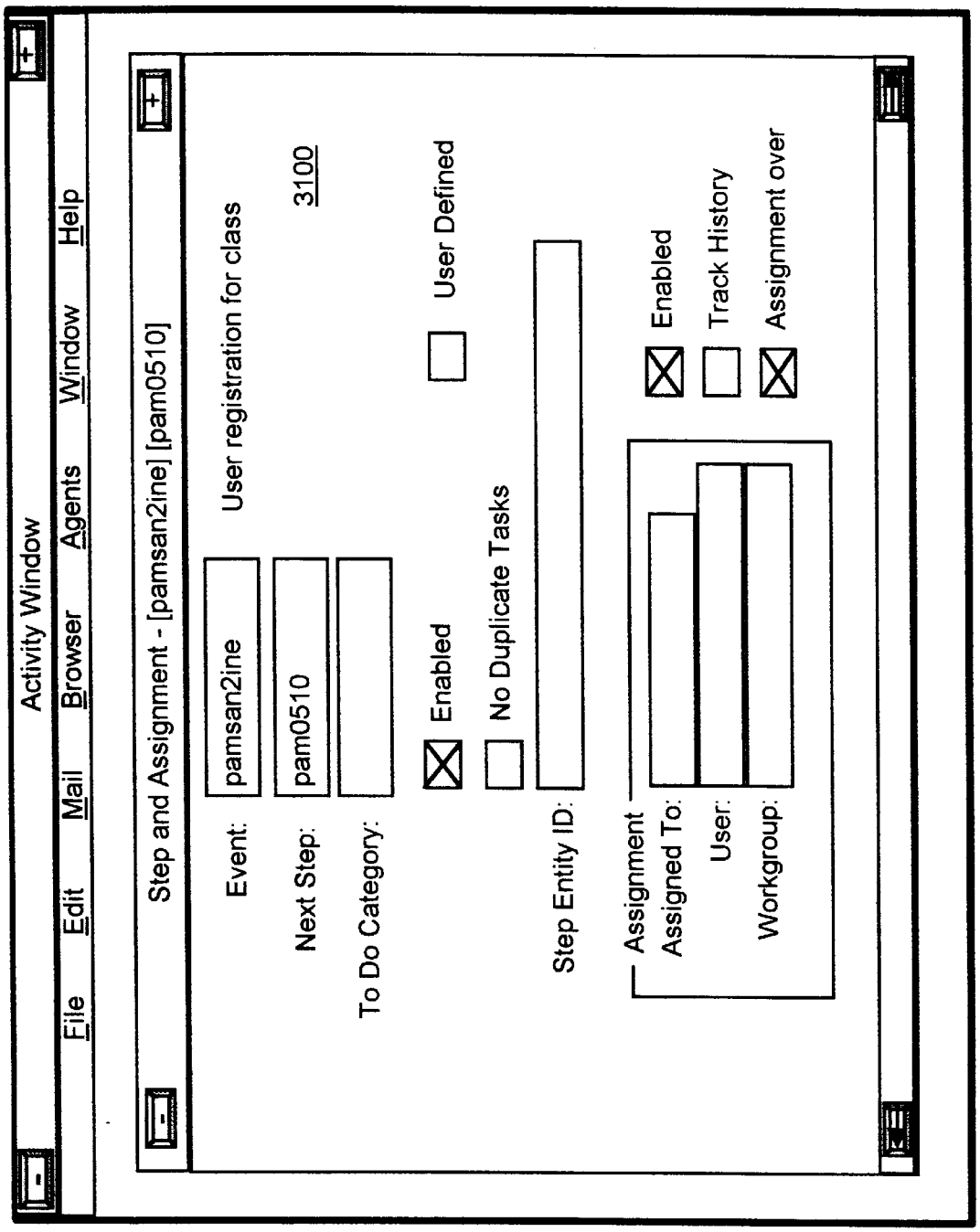
FIG. 32 depicts a computer screen, according to a preferred embodiment of the present invention, displaying the Step Assignments window of FIG. 31, where the administrator has partially selected next steps for the given activity.

Referring to FIG. 32, in the Step and Assignments window 3100, the administrator then selects an activity (next activity/task) application program from a list of next activities/tasks as the next step in the work flow process. For this example, the administrator has chosen pam0510, which represents the Class Payment application program. The administrator also selects the Enabled box to enable this new next step. Moreover, for this example, the Assignment Override box is selected by the administrator such that any user or workgroup information entered by the administrator will override any default values contained in the Class Payment application program. The main application program then sends the activity identifier for the next activity/task (ACTIVITY_ID) and event identifier (EVENT_ID) to a stored procedure. In one embodiment, the name of the stored procedure is psp_ins_nxtm. This stored procedure then creates a new row for the next step represented by its ACTIVITY_ID and EVENT_ID in the Next Step table 1225 (see FIG. 12). The stored procedure then sends a message to the main application program revealing that the row has been created.

Figure 33:
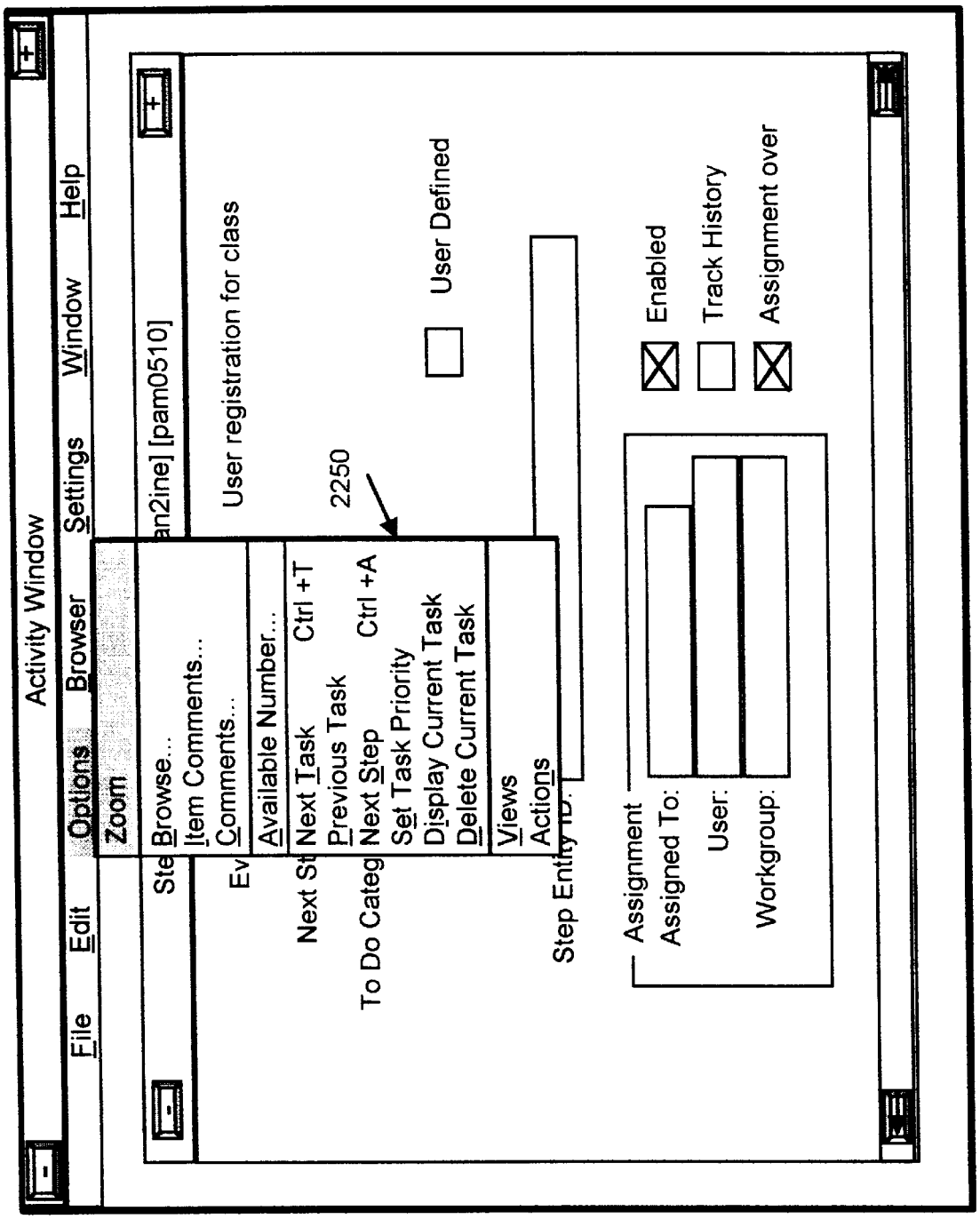
FIG. 33 depicts a computer screen, according to a preferred embodiment of the present invention, displaying the Options mode list, where the Zoom option has been selected so that a next activity may be selected.
Figure 34:
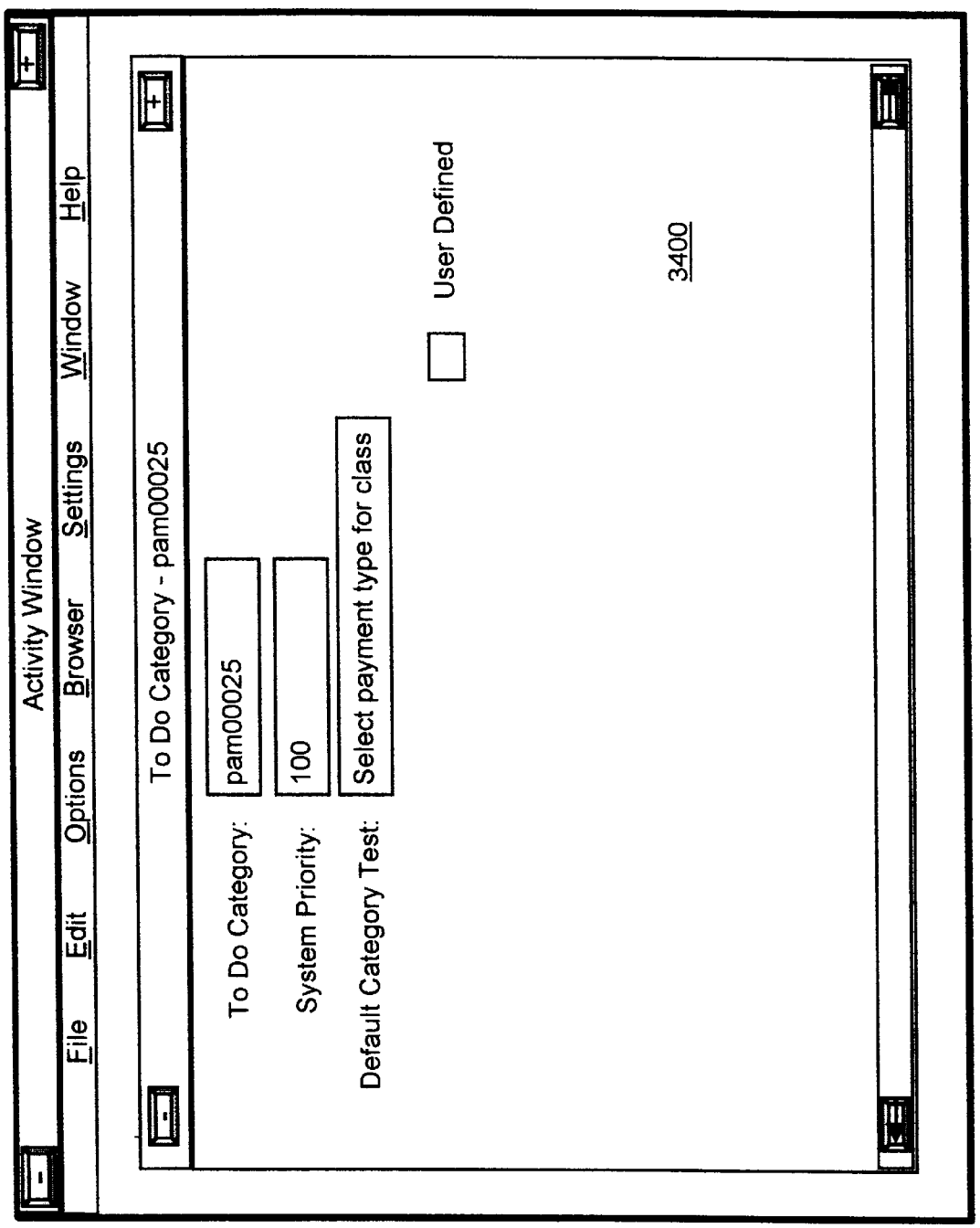
FIG. 34 depicts a computer screen, according to a preferred embodiment of the present invention, displaying a To Do Category window accessed from the Zoom option, where a next activity is selected by the administrator.

Next, the administrator selects a message representative of a next activity/task category in which to identify the next activity/task in a user or work group's To Do List. Referring to FIG. 33, the administrator accomplishes this by selecting the Options mode and Zoom option from the Options mode list 2250. As shown in FIG. 34, the main application program then reveals a To Do Category window 3400 which displays the default next activity/task category message, which the administrator may modify if he or she chooses. The To Do Category window 3400 also allows the administrator to assign a system priority to the next activity/task category, and to select if the next activity/task category will be user defined. The Main Application Program then sends the activity identifier (ACTIVITY_ID) for the next activity/task, the event identifier (EVENT_ID), the category message identifier (MSG_ID), the message text, the user defined (USER_DEF) information, and the system priority information to a stored procedure. This stored procedure then stores the MSG_ID and the USER_DEF for the ACTIVITY_ID and EVENT_ID in the NEXT_STEP table 1225 (see FIG. 12).

Figure 35:
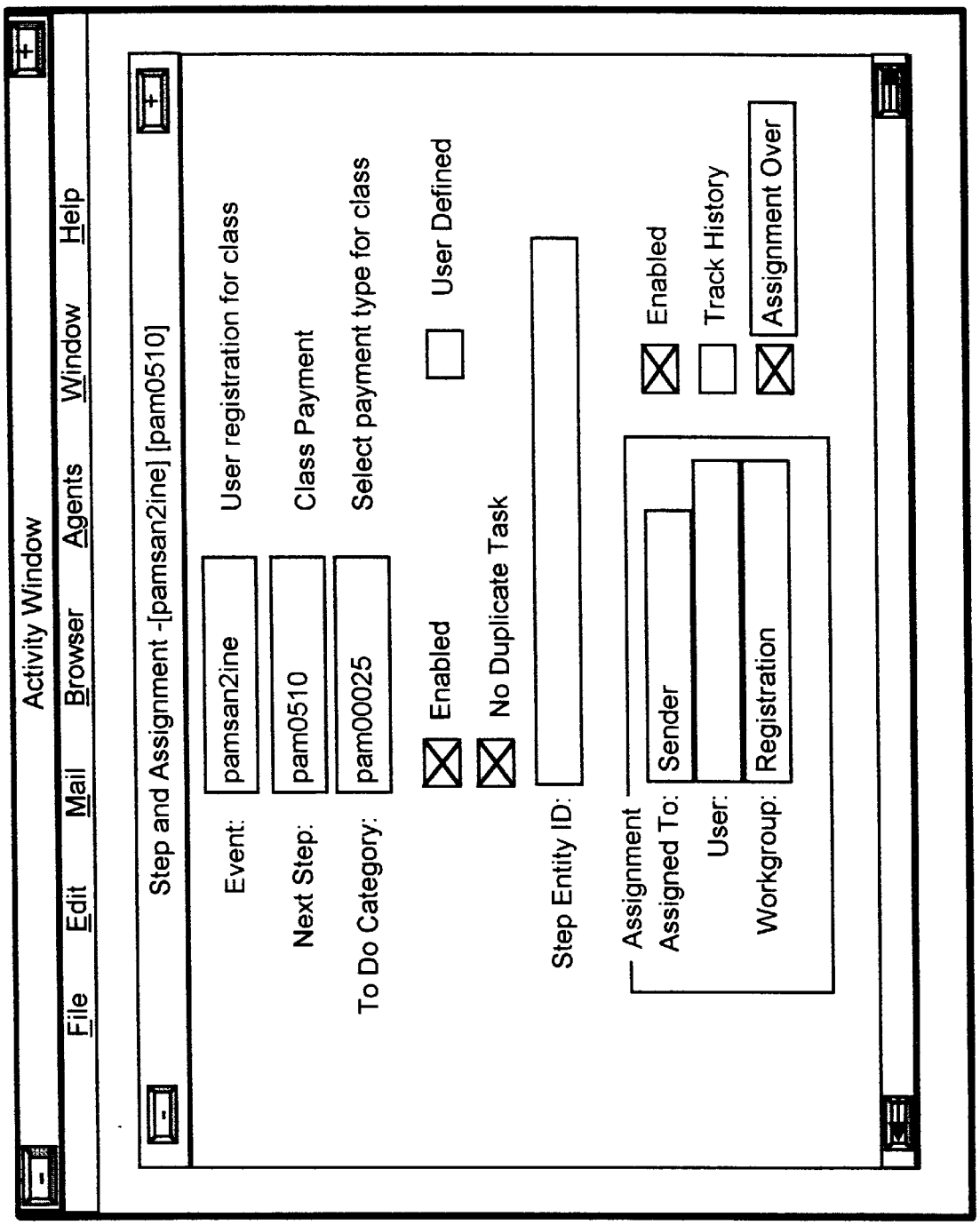
FIG. 35 depicts a computer screen, according to a preferred embodiment of the present invention, displaying the Step Assignments window of FIG. 31, where the users responsible for the next activity have been selected by the administrator.

Finally, the administrator may assign the next activity/task to an entity, and a user and/or workgroup. Referring to FIG. 35, for this example, the administrator selects to assign the next activity/task to the default entity, represented as an asterisk (*), and the sender (e.g., the creator of the next activity/task) who is in the Registration workgroup.

Figure 36:
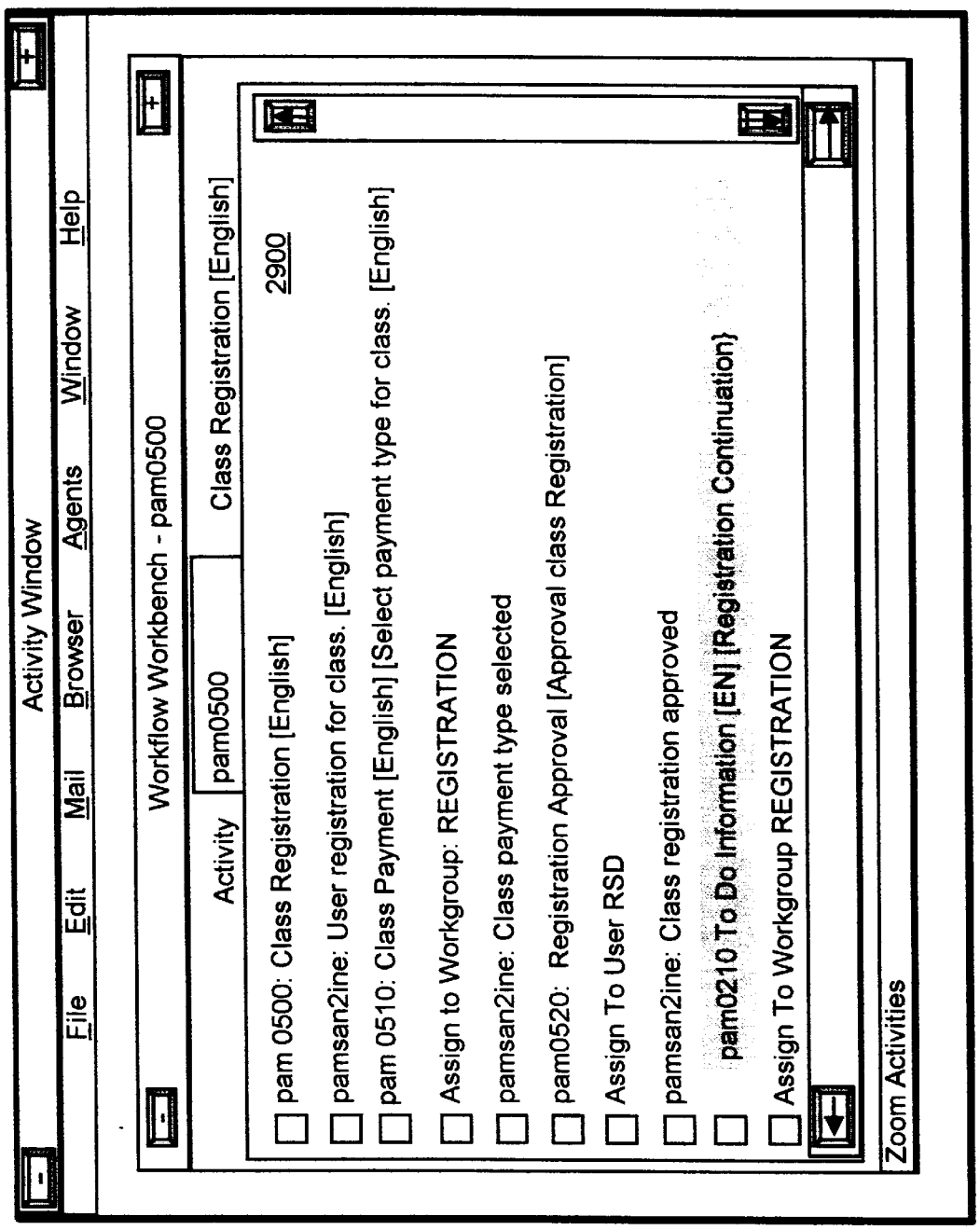
FIG. 36 depicts a computer screen, according to a preferred embodiment of the present invention, displaying an illustrative example of a Workflow Workbench window where next steps have been defined to complete an information flow procedure.

Referring to FIG. 36, as shown in the Workflow Workbench window 2900, the administrator may then add other next steps with corresponding assignments to a user or workgroup for the activity and each subsequent next activity/task. In this example, the administrator has assigned the Class Payment next activity/task to the Registration work group. Therefore, the work group identifier, represented as the MSG_GROUP_ID, is stored in the Next Step Options table 1230 (see FIG. 12). Other next steps selected by the administrator include the "Class payment type selected" (pamsam2up1) event with the next activity/task being "Registration Approval" (pam0520) which is assigned to user RSD.

The administrator may also activate the archiving feature of the computer system of the present invention. This feature may be used for backup and accountability purposes.

Figure 37:
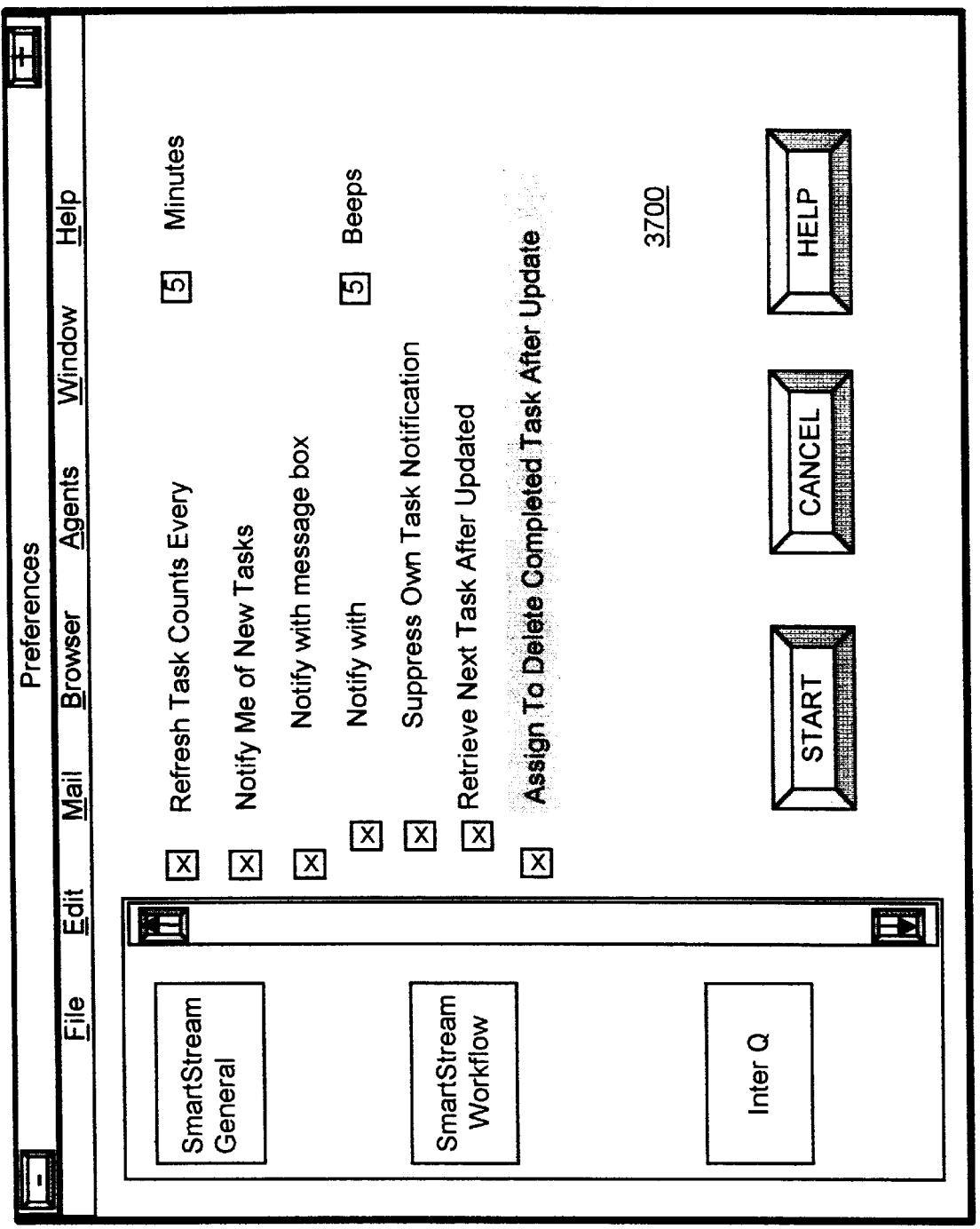
FIG. 37 depicts a computer screen, according to a preferred embodiment of the present invention, displaying the Preferences window which allows the user to select specific features relevant to his or her To Do List, including refresh task counts at certain time intervals and notify the user when a new next activity has been added to his or her To Do List.

As shown in FIG. 37, a user may access a variety of additional features included with the computer/system of the present invention in the Preferences window 3700. These features include selecting how often the user would like to have his or her number of uncompleted next activities/tasks recalculated. This feature is called the "Refresh Task Counts" feature. Further, the next activity/task counts are recalculated at the specified time intervals selected by the user as described above for the Summary To Do Category window (see FIG. 7).

The features a user may select from also include activating a notification feature which notifies the user of new next activities/tasks which have been added to one of his or her To Do Lists and need to be acted upon. This feature is called the "Notify Me of New Tasks" feature. The user may then select to be notified with a message box in any window the user is currently viewing or with a certain number of beeps. The user may also select the next activity/task notification feature to be suppressed when the next activity/task is created by the user.

When the "Notify Me of New Tasks" feature is activated, the main application program sends the user's USER_ID to a stored procedure at the time intervals specified by the user. In one embodiment, the name of the stored procedure is psp_sel_mque_list. This stored procedure then obtains the number for the user's personalized To Do List (TODO_FOLDERNO) from the USER_MASTER table 1110 (see FIG. 11) with the USER_ID. Next, the stored procedure accesses the MESSAGE_QUEUE table 1140 (see FIG. 11) and obtains the relevant information on the next activities/tasks in the user's personalized To Do List which have a MSG_STATUS equal to "new." Finally, information regarding these "new" next activities/tasks is sent back to the main application program, which notifies the user of them with the message box or the beep(s).

Further, the user may activate the "Retrieve Next Task After Update" feature. This feature performs relatively the same sequence of events as described for the Next Task feature of the present invention. However, by activating this feature, the Next Task application programs and stored procedures are automatically accessed after saving information for a next activity/task.

Figure 38A:
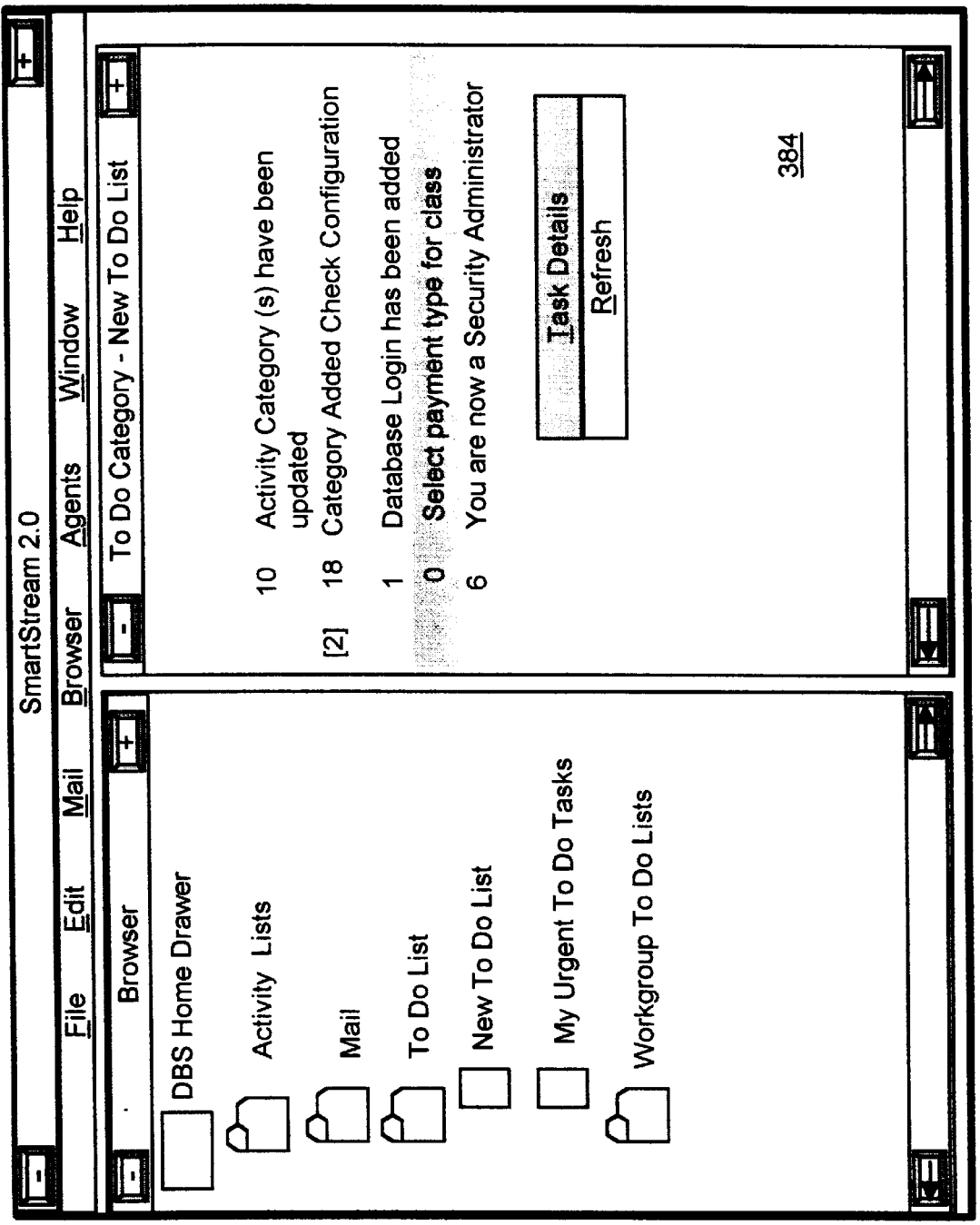
FIG. 38A depicts a computer screen, according to a preferred embodiment of the present invention, displaying a Summary To Do Category window, where completed next activities may be deleted manually.
Figure 38B:
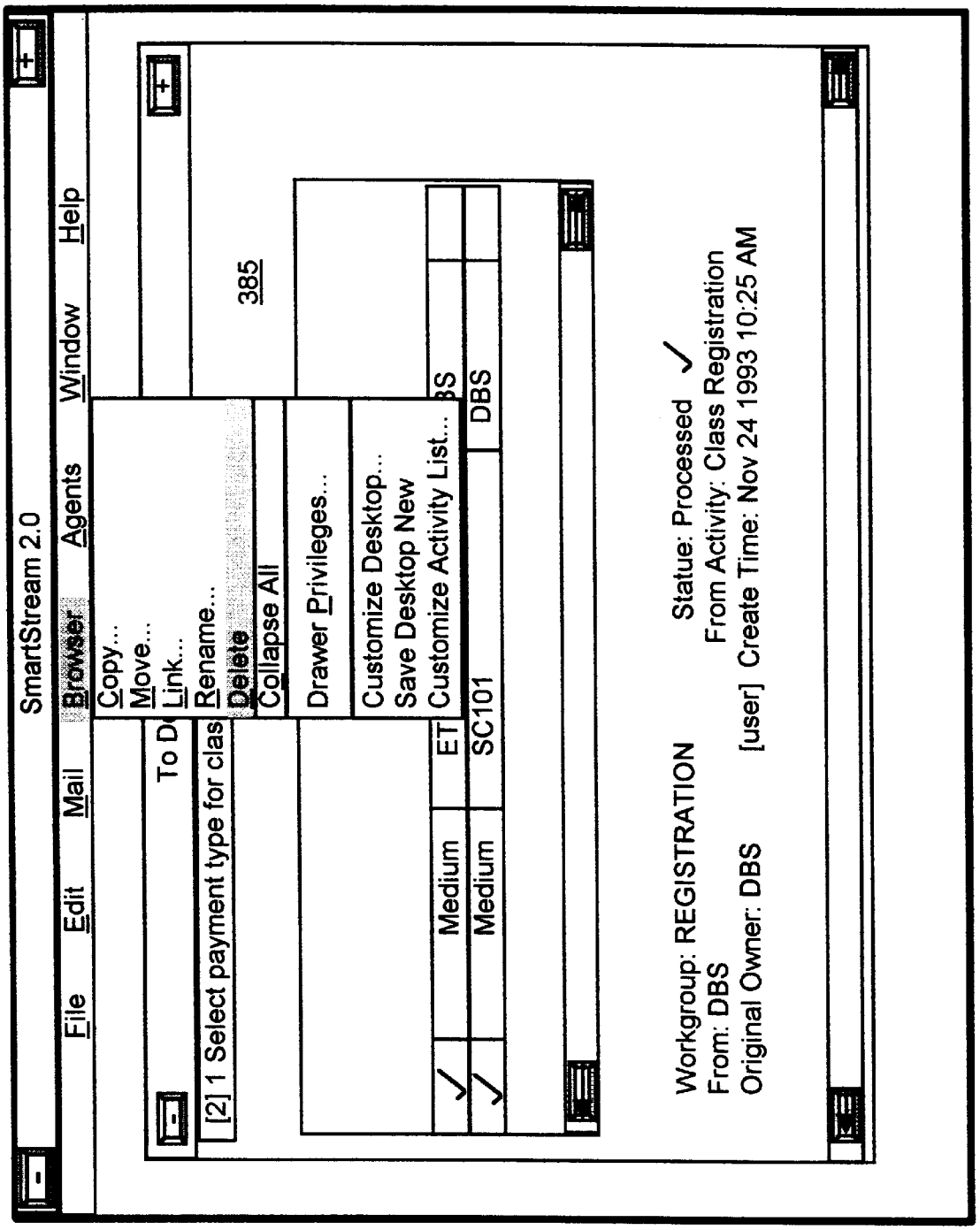
FIG. 38 depicts a computer screen, according to a preferred embodiment of the present invention, displaying a Detailed To Do Category window, where completed next activities may be deleted manually.

Moreover, the user may activate the "Delete Completed Tasks After Update" feature, which automatically deletes the next activity/task from the user's To Do List as shown in the Summary and Detailed To Do Category windows (see FIGS. 16H and 16L) when completed. When this feature is not selected, the Summary and Detailed To Do Category windows display the next activity/task as done or complete. As shown in FIG. 38A, the next activities/tasks may also be deleted manually by the user in the Summary To Do Category window 384 and Detailed To Do Category window 385 (see FIG. 38B).

Figure 39:
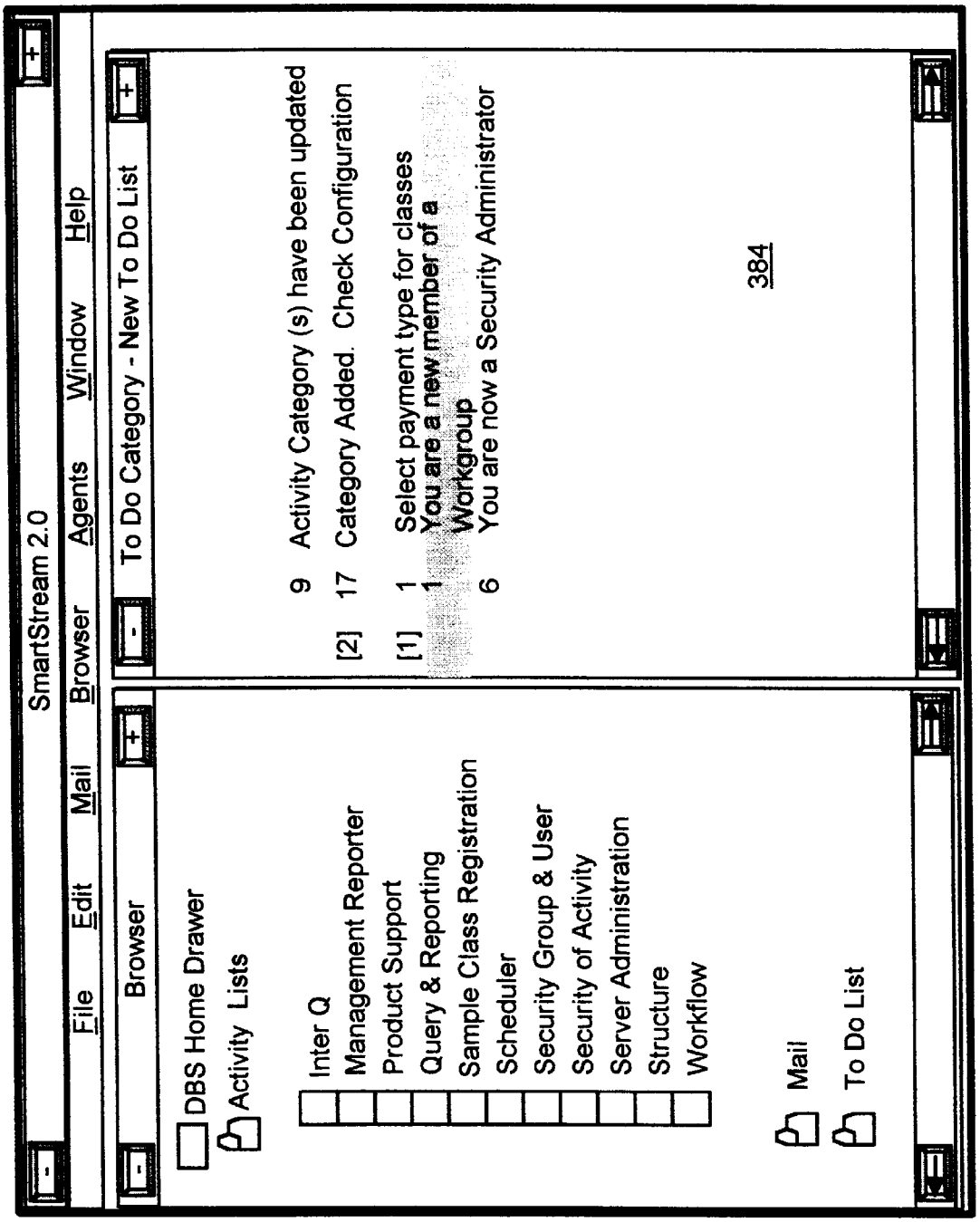
FIG. 39 depicts a computer screen, according to a preferred embodiment of the present invention, displaying a Summary To Do Category window, where the user may obtain detailed information on a particular next activity.

In another aspect of the computer system of the present invention, the user may obtain detailed information on a particular next activity/task. As shown in FIG. 39, the user may select a next activity/task category from the To Do Category window 384.

Figure 40:
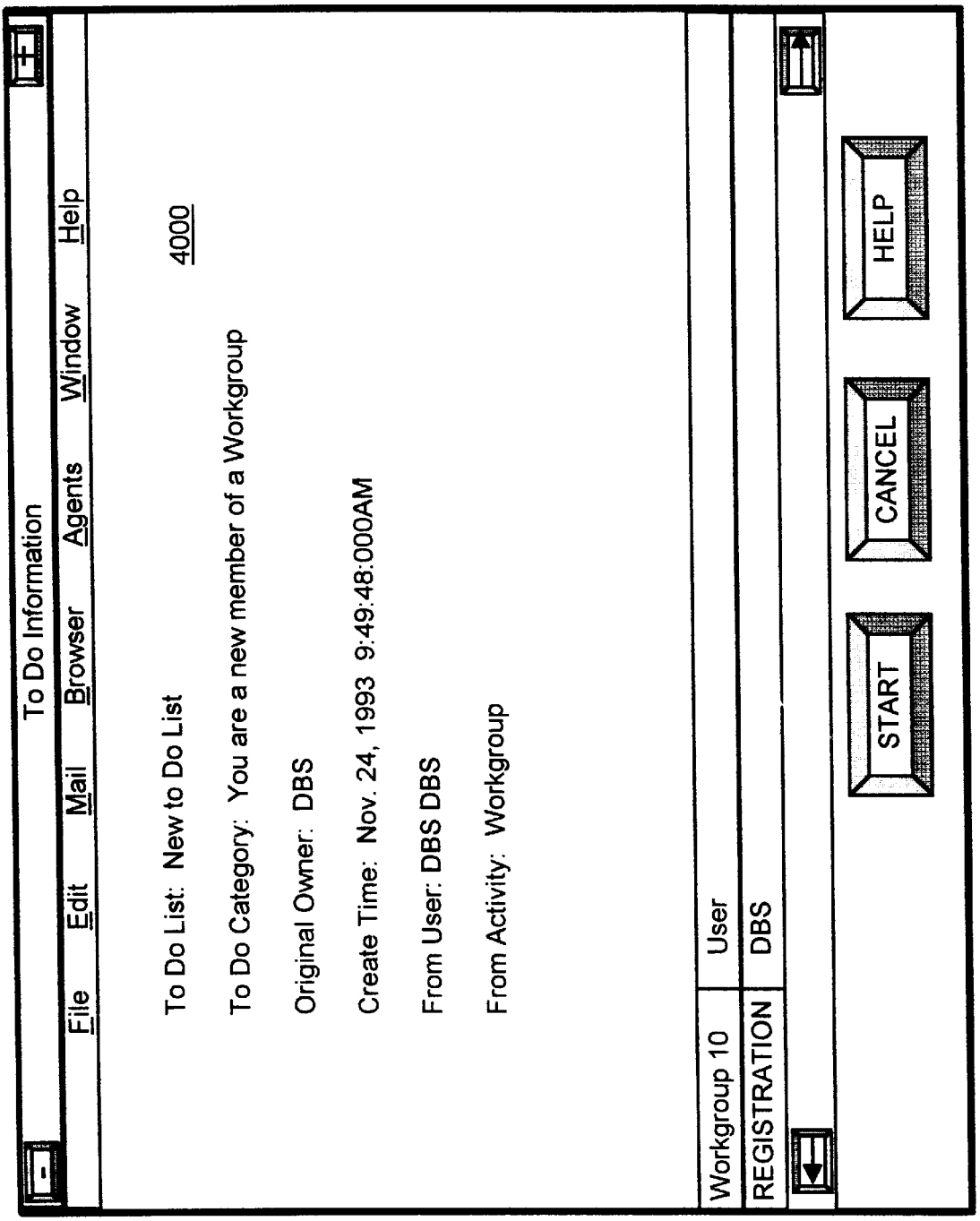
FIG. 40 depicts a computer screen, according to a preferred embodiment of the present invention, displaying a To Do Informational window which reveals detailed information on a particular next activity.

The main application program then sends the USER_ID formatted as the OWNER_ID, the OWNER_TYPE, and the FOLDERNO for the To Do List to a stored procedure. This stored procedure then calls the Next Task stored procedure, which accesses the MESSAGE_QUEUE table 1140 (see FIG. 11) with the OWNER_ID, OWNER_TYPE, MSG_ID, and FOLDERNO. This Next Task stored procedure then selects the highest prioritized next activity/task for the next activity/task category represented by its MSG_ID. Finally, the Next Task stored procedure sends the ACTIVITY_ID for the highest prioritized next activity/task from the next activity/task category back to a stored procedure. This stored procedure then accesses the MESSAGE_QUEUE table 1140 to obtain information on the user who initiated the next activity/task, also referred to as the original owner (ORIG_OWNER); the time the next activity/task was created (CREATE_TIME); the work group (MSG_GROUP_ID) responsible for the next activity/task; the user (FROM_USER_ID) who initiated the next activity/task; and the activity or next activity/task (FROM_ACT_ID) in which the next activity/task was initiated. This information is then sent back to the main application program which reveals it in the To Do Informational window 4000, as shown in FIG. 40.

According to a further aspect of the present invention, the computer system processes and prioritizes next activities/tasks for a user based on predefined conditions set by the user. These predefined conditions and actions resulting from the conditions in which the user may activate are referred to as agents.

According to another aspect of the present invention, the computer system includes a job scheduler feature which allows the user to create, schedule and submit jobs to run automatically. A job is typically an executable program, a DOS batch file or the like and an example of a job is a month-end departmental report.

According to yet a further aspect of the present invention, the computer system includes a mail feature. This feature allows the users to perform mail related activities including sending mail to and receiving mail from other users of the computer system of the present invention.

According to still another aspect of the present invention, the computer system includes a product request feature. This feature allows users of the computer system to communicate electronically with the administrator of the computer system so that the user may ask questions, receive system updates related to the computer system, and the like.

A more complete understanding of the aforementioned component aspects of the present invention may be obtained by reference to Section XII-I, infra.

According to another aspect of the present invention, the computer system includes components which may be used to support a variety of business-related activities. These components include a component which allows intelligent, high-speed access to data, and another component which provides decision-making analysis and support. Moreover, these components are designed for use in a variety of business functions including manufacturing, distribution, finance, and human resources.

It is believed that the above-described description of the present invention includes enough detail so as to enable a person having ordinary skill in the relevant art to implement the underlying subject matter of the invention. Additionally, the best known mode for implementing the invention has also been disclosed.

What has been described above are preferred embodiments of the present invention. It is of course not possible to describe every conceivable combination of components or methodologies for purposes of describing the present invention, but one of ordinary skill in the art will recognize that many further combinations and permutations of the present invention are possible. All such possible modifications are to be included within the scope of the claimed invention, as defined by the appended claims below.

We claim:

1. A method of operating a computer system for controlling the flow of work and the flow of data associated with that work between a plurality of users of the computer system in order to accomplish a work process performed by the plurality of users, said method comprising the steps of:
   a) providing a computer system having a data storage device;
   b) structuring a work process as a plurality of work steps for performance of the work steps by the plurality of users and by the computer system;
   c) associating an activity data object of a plurality of activity data objects with each work step of the plurality of work steps to define a relationship between the activity data object and a respective work step, wherein an activity data object comprises a data processing tool enabling performance by the computer system of a work step of the work process;
   d) associating at least one event data object of a plurality of event data objects with each activity data object of the plurality of activity data objects to define a relationship between the event data object and a respective activity data object, wherein an event data object comprises a data processing tool enabling detection of a condition occurring during operation of an activity data object on the computer system;
   e) associating at least one work step of the plurality of work steps with each event data object to define a relationship between the work step and a respective event data object, wherein the work step so associated is enabled for performance by the computer system upon detection of a condition by the respective event data object;
   f) storing in the data storage device of the computer system the activity data objects and the event data objects;
   g) storing in the data storage device of the computer system the relationships between activity data objects and work steps;
   h) storing in the data storage device of the computer system the relationships between event data objects and activity data objects;
   i) storing in the data storage device of the computer system the relationships between work steps and event data objects;
   j) in response to selection of an activity data object by a user of the computer system, activating the selected activity data object and accepting data relevant to the work process from the user as part of the work step associated with the selected activity data object by a relationship stored in the data storage device of the computer system;
   k) detecting a condition in an event data object associated with the selected activity data object by a relationship stored in the data storage device of the computer system;
   l) in response to detecting a condition in step (k) and based at least in part on a relationship stored in the data storage device between the event data object of step (k) and a subsequent work step of the work process, enabling performance of the related subsequent work step by a subsequent user of the computer system;
   m) in response to an input received by the computer system from the subsequent user which identifies selection of the related subsequent work step, performing the related subsequent work step on the computer system by activating the activity data object associated with the subsequent work step through a relationship stored in the data storage device of the computer system; and,
   n) performing steps (k), (l), and (m) until the work process is complete and as directed by the relationships between event data objects and activity data objects, the relationships between event data objects and subsequent work steps, and the relationships between activity data objects and subsequent work steps stored in the data storage device of the computer system.

2. The method of claim 1, further comprising prior to step (j), a step of accepting an initial input from the user, said initial input corresponding to a selection of a first activity data object from a list of activity data objects.

3. The method of claim 1, wherein step (j) further comprises a step of displaying a visual indicator to the user, the visual indicator corresponding to a type of data to be input by the user.

4. The method of claim 3, wherein the step of displaying further comprises displaying the visual indicator in a language of preference to the user.

5. The method of claim 1, wherein performance of a work step is enabled in step (l) only if a user has appropriate security clearance to perform the work step.

6. The method of claim 1, wherein step (j) comprises a step of accepting data relevant to the scheduling of a job, the job comprising an executable program adapted to operate independently of the performance of the selected activity data object.

7. The method of claim 6, wherein step (j) further comprises a step of running the job in accordance with the accepted data.

8. The method of claim 6, wherein the job comprises an executable program selected from the group consisting of:(i) a DOS Batch file, (ii) a DOS Command file, and (iii) a Unix Script file.

9. The method of claim 1, wherein step (j) comprises a step of accepting data relevant to scheduling an agent, the agent comprising an executable program which operates in response to the satisfaction of a condition selected by the user.

10. The method of claim 9, wherein the agent comprises an executable program adapted to perform a function selected from the group consisting of: (i) processing electronic mail, (ii) executing computer application programs, and (iii) processing reports corresponding to data accepted from the plurality of users.

11. The method of claim 1, wherein the work process comprises financial data processing and the step of accepting data includes accepting financial data relevant to the financial data processing.

12. The method of claim 1, wherein the work process comprises manufacturing of a product and the step of accepting data includes accepting manufacturing data relevant to the manufacturing of the product.

13. The method of claim 1, wherein the work process comprises distribution of an article and the step of accepting data includes accepting data relevant to the distribution of the article.

14. The method of claim 1, wherein the work process comprises a human resources process and the step of accepting data includes accepting data relevant to the human resources process.

15. A method of operating a computer system for controlling the flow of work and the flow of data associated with that work between a plurality of users of the computer system in order to accomplish a work process performed by the plurality of users, said method comprising the steps of:

a) providing a computer system having a data storage device;

b) structuring a work process as first and second work steps for performance of the work steps by respective first and second users of the plurality of users through interaction with the computer system;

c) storing in the data storage device an association between a first activity data object and the first work step of the work process, wherein the first activity data object comprises a data processing tool enabling performance by the computer system of the first work step of the work process;

d) storing in the data storage device an association between a second activity data object and the second work step of the work process, wherein the second activity data object comprises a data processing tool enabling performance by the computer system of the second work step of the work process;

e) storing in the data storage device an association between the first activity data object and a condition potentially occurring during operation of the first activity data object on the computer system;

f) storing in the data storage device an association between the condition of step (e) and data including: (i) an identifier identifying the second activity data object, (ii) a description describing the second work step requiring performance upon detection of the condition, and (iii) an identifier identifying the second user of the computer system as the user selected to perform the second work step through use of the computer system;

g) accepting a set of input data from the first user during operation of the first activity data object, acceptance of the set of input data at least partially establishing completion of the first work step;

h) detecting the condition of step (e) during operation of the first activity data object on the computer system;

i) in response to detecting the condition of step (e) enabling invocation of the second activity data object by the second user;

j) in response to input from the second user, invoking operation of the second activity data object;

k) displaying to the second user during operation of the second activity data object a portion of the set of input data from the first user; and, l) accepting a set of input data from the second user during operation of the second activity data object, acceptance of the set of input data from the second user at least partially establishing completion of the second work step and the work process.

16. The method of claim 15, wherein the method further comprises, prior to the step of accepting a set of input data from the first user, a step of invoking operation of the first activity data object from a list of activity data objects available for invocation by the first user.

17. The method of claim 15, wherein the step of enabling invocation of the second activity data object by the second user comprises a step of maintaining by the computer system a list including (i) descriptions of work steps requiring performance by the second user and (ii) identifiers of activity data objects associated with respective descriptions.

18. The method of claim 17, wherein the step of enabling invocation of the second activity data object by the second user further comprises a step of presenting to the the user selected to perform the second work step through use of the computer system, and inserting into the list the description of the second work step and the identifier of the second activity data object.

19. The method of claim 17, wherein the step of enabling invocation of the second activity data object by the second user comprises the steps of:

accessingthedata storage device to retrieve the association between the condition of step (e) and (i) the identifier identifying the second activity data object, (ii) the description descriving the second work step requiring performance upon detection of the condition, and (iii) the identifier identifying the second user of the computer system as the user selected to perform the second work step through use ofthe computer system, and inserting into the list the description of thesecond work step and the identifier of the second activity data object.

20. A method of operating a computer system for controlling the flow of work and the flow of data associated with that work between a plurality of users of the computer system in order to accomplish a work process performed by the plurality of users, said method comprising the steps of:

a) providing a computer system having a data storage device;

b) structuring a work process as a plurality of work steps for performance of the work steps by respective users of the plurality of users through interaction with the computer system;

c) storing in the data storage device a plurality of associations between the plurality of activity data objects and respective work steps of the plurality of work steps of the work process, wherein the activity data objects of the plurality of activity data objects comprise windows and programs enabling performance by the computer system of the work steps of the plurality of work steps;

d) storing in the data storage device a list of work steps for each user comprising work steps and corresponding activity data objects, each entry in the list of work steps being representative of the work steps requiring completion by a particular user;

e) accepting data of a first data type from a first user of the plurality of users during operation of a first activity data object of the plurality of activity data objects to accomplish a first work step of the plurality of work steps of the work process;

f) in response to detecting a condition occurring in the first activity data object, removing the first work step from the first user's list of work steps and inserting an entry corresponding to a second work step in a second user's list of work steps;

g) in response to invocation by the second user of a second activity data object associated with the second work step, accepting data of a second data type from the second user during operation of the second activity data object to accomplish the second work step of the plurality of work steps of the work process;

h) in response to detecting a condition occurring in the second activity data object, removing the second work step from the second user's list of work steps and inserting an entry corresponding to a third work step in a third user's list of work steps;

i) in response to invocation by the third user of a third activity data object associated with the third work step, displaying to the third user a portion of the data of the first data type input by the first user, displaying to the third user a portion of the data of the second data type input by the second user, accepting data of a third data type from the third user during operation of the third activity data object to accomplish the third work step of the plurality of work steps of the work process; and, i) in response to detecting a condition occurring in the third activity data object, removing the third work step from the third user's list of work steps.

21. The method of claim 20, wherein the method further comprises an initial step of accepting an initial signal from the first user, said initial signal corresponding to a selection of said first activity data object from a list of first user activity data objects.

22. The method of claim 20, wherein step (e) further comprises an initial step of prompting the first user to input data of the first data type.

23. The method of claim 20, wherein step (e) further comprises an initial step of displaying a visual indicator to the first user, said visual indicator identifying to the first user the first data type to be input by the first user.

24. The method of claim 23, wherein the step of displaying further comprises displaying the visual indicator in a language preferable to the first user.

25. The method of claim 20, wherein the step of inserting an entry corresponding to a second work step in a second user's list of work steps is performed only if the second user has security clearance to invoke the second activity data object.

26. The method of claim 20, wherein the work steps comprise a sequential sequence of work steps necessary for the completion of the work process.

27. The method of claim 20, wherein data of the first data type represents information processed by a workgroup of which the first user is a member, data of the second data type represents information processed by a workgroup of which the second user is a member, data of the third data type represents information processed by a workgroup of which the third user is a member, the first data type being different from the second and third data types.

28. The method of claim 27, wherein the first user has no access to data of the second data type input by the second user and the second user has no access to data of the first data type input by the first user.

29. The method of claim 27, wherein the portions of the data of the first data type and of the second data type input respectively by the first and second users include only data necessary for the third user to complete the third work step.

30. The method of claim 20, wherein the step of accepting data of a third data type comprises a step of accepting data associated with scheduling an agent, said agent comprising an executable program which operates in response to the satisfaction of a condition selected by the third user.

31. The method of claim 30, wherein said agent comprises an executable program adapted to perform a function selected from the group consisting of: (i) processing electronic mail, (ii) executing computer application programs, and (iii) processing reports corresponding to data between the plurality of users.

32. A data processing apparatus for controlling the flow of work and the flow of data associated with that work between a plurality of users of a computer system in order to accomplish a work process performed in concert by the plurality of users, said data processing apparatus comprising:

(a) means for accepting a first signal corresponding to a plurality of entries, wherein each of said plurality of entries associates a first activity data object with a second activity data object which may be performed in response to the performance of said first activity data object by a first user, and wherein said second activity data object is further associated with a second user;

(b) means for accepting a second signal from the first user, said second signal corresponding to a first set of data elements inputted by the first user in performing said first activity data object;

(c) means for locating said second activity data object and the second user associated with said first activity data object in said plurality of entries;

(d) means for transmitting a third signal corresponding to a second set of data elements comprised of a selected portion of said first set of data elements to the second user, wherein said second set of data elements is associated with the performance of said second activity data object; and (e) means for accepting a fourth signal from the second user, said fourth signal corresponding to a third set of data elements inputted by the second user in performing said second activity data object;

(f) wherein activity data objects are associated with discrete work steps of the work process, performance of an activity data object being necessary to complete a respective work step.

* * * * *